US008710950B2

(12) United States Patent
Lubbers et al.

(10) Patent No.: US 8,710,950 B2
(45) Date of Patent: Apr. 29, 2014

(54) WIRELESS CONTROL SYSTEM FOR A PATIENT SUPPORT APPARATUS

(75) Inventors: David P. Lubbers, Cincinnati, OH (US); Matthew C. Visca, Fairfield, OH (US); Brian Hoffman, Lawrenceburg, IN (US); James L. Walke, Batesville, IN (US); Robert M. Zerhusen, Cincinnati, OH (US); James K. Findlay, Fishers, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 1908 days.

(21) Appl. No.: 11/313,355

(22) Filed: Dec. 21, 2005

(65) Prior Publication Data

US 2006/0260054 A1 Nov. 23, 2006

Related U.S. Application Data

(60) Provisional application No. 60/638,591, filed on Dec. 23, 2004.

(51) Int. Cl.
*G05B 23/02* (2006.01)

(52) U.S. Cl.
USPC .................... 340/3.71; 340/573.1; 340/13.24; 5/88.1

(58) Field of Classification Search
USPC .......... 340/825.72, 13.24, 573.1, 3.71; 5/88.1
See application file for complete search history.

(56) References Cited

U.S. PATENT DOCUMENTS

| | | | |
|---|---|---|---|
| 3,137,773 | A | 6/1964 | Black |
| 3,644,946 | A | 2/1972 | Swatt |
| 3,711,664 | A | 1/1973 | Benoit et al. |
| 3,716,876 | A | 2/1973 | Petzon et al. |
| 3,781,927 | A | 1/1974 | Zakaras |
| 3,846,857 | A | 11/1974 | Weinstock |
| 3,865,430 | A | 2/1975 | Tanus |
| 3,872,526 | A | 3/1975 | Betts |
| 3,913,153 | A | 10/1975 | Adams et al. |
| 3,923,300 | A | 12/1975 | Tanus |
| 3,932,903 | A | 1/1976 | Adams et al. |
| 3,972,081 | A | 8/1976 | Stern et al. |
| 4,014,344 | A | 3/1977 | Gutierrez |
| 4,044,286 | A | 8/1977 | Adams et al. |
| 4,062,075 | A | 12/1977 | Stern et al. |
| 4,211,998 | A | 7/1980 | Junginger et al. |
| 4,218,681 | A | 8/1980 | Hörmann |
| 4,231,019 | A | 10/1980 | Junginger et al. |
| 4,232,901 | A | 11/1980 | Harrington et al. |

(Continued)

FOREIGN PATENT DOCUMENTS

| | | | |
|---|---|---|---|
| CH | 675936 | A5 | 11/1990 |
| DE | 26 30 334 | | 12/1978 |

(Continued)

*Primary Examiner* — George Bugg
*Assistant Examiner* — Naomi Small
(74) *Attorney, Agent, or Firm* — Barnes & Thornburg LLP

(57) ABSTRACT

A wireless control system includes a device for sending a wireless signal, a receiver for receiving the wireless signal, and circuitry for processing the wireless signal. The circuitry includes a learn mode in which a device is associated with the control signal to the exclusion of commands from other devices not associated with the circuitry. The device transmits a wireless signal redundantly over a plurality of frequencies. The control system may chooses a signal frequency and receiver combination to maintain a quality signal.

38 Claims, 49 Drawing Sheets

(56) References Cited

U.S. PATENT DOCUMENTS 4,294,048 A 10/1981 Sutter
4,371,815 A 2/1983 Jones, Jr. et al.
4,435,862 A 3/1984 King et al.
4,639,959 A 2/1987 Roca
4,680,790 A 7/1987 Packard et al.
4,712,105 A 12/1987 Köhler
4,745,647 A 5/1988 Goodwin
4,769,584 A 9/1988 Irigoyen et al.
4,787,104 A 11/1988 Grantham
4,798,197 A 1/1989 Nippoldt et al.
4,825,200 A 4/1989 Evans et al.
4,850,040 A 7/1989 Teich et al.
4,916,441 A 4/1990 Gombrich
4,955,000 A 9/1990 Nastrom
4,967,195 A 10/1990 Shipley
4,999,622 A 3/1991 Amano et al.
5,044,029 A 9/1991 Vrzalik
5,053,636 A 10/1991 Zelina
5,057,932 A 10/1991 Lang
5,058,871 A 10/1991 Congin et al.
5,062,167 A 11/1991 Thomas et al.
5,063,623 A 11/1991 Bathrick et al.
5,063,624 A 11/1991 Smith et al.
5,072,463 A 12/1991 Willis
5,073,999 A 12/1991 Thomas et al.
5,098,089 A 3/1992 Harrington et al.
5,107,554 A 4/1992 Garakani
5,235,258 A 8/1993 Schuerch
5,239,300 A 8/1993 Berger et al.
5,437,608 A 8/1995 Cutler
5,452,356 A 9/1995 Albert
5,481,255 A 1/1996 Albert et al.
5,509,154 A 4/1996 Shafer et al.
5,513,400 A 5/1996 Turner
5,540,651 A 7/1996 Risch et al.
5,542,138 A 8/1996 Williams et al.
5,544,376 A 8/1996 Fromson
5,561,412 A 10/1996 Novak et al.
5,600,214 A 2/1997 Fromson
5,611,096 A 3/1997 Bartlett et al.
5,627,531 A 5/1997 Posso et al.
5,627,584 A 5/1997 Nishikori et al.
5,652,484 A 7/1997 Shafer et al.
5,678,568 A 10/1997 Uchikubo et al.
5,682,631 A 11/1997 Weismiller et al.
5,694,654 A * 12/1997 Roy ................................ 5/83.1
5,699,038 A 12/1997 Ulrich et al.
5,735,285 A 4/1998 Albert et al.
5,737,781 A 4/1998 Votel
5,745,937 A 5/1998 Weismiller et al.
5,754,997 A 5/1998 Lüssi et al.
5,771,511 A 6/1998 Kummer et al.
5,838,223 A 11/1998 Gallant et al.
5,848,450 A 12/1998 Oexman et al.
5,890,238 A 4/1999 Votel
5,926,002 A 7/1999 Cavanaugh et al.
5,969,488 A 10/1999 Fromson
6,008,598 A 12/1999 Luff et al.
6,035,465 A 3/2000 Rogozinski
6,037,723 A 3/2000 Shafer et al.
6,048,310 A 4/2000 Yasushi et al.
6,072,404 A * 6/2000 Nolan et al. ............... 340/12.16
6,078,261 A 6/2000 Davsko
6,079,065 A 6/2000 Luff et al.
6,127,941 A 10/2000 Van Ryzin
6,131,868 A 10/2000 Welling et al.
6,135,949 A 10/2000 Russo et al.
6,341,393 B1 1/2002 Votel
6,351,678 B1 2/2002 Borders
6,378,148 B1 * 4/2002 Votel .......................... 5/81.1 HS
6,396,224 B1 5/2002 Luff et al.
6,424,820 B1 * 7/2002 Burdick et al. .............. 455/41.1
6,560,492 B2 5/2003 Borders
6,570,491 B1 5/2003 Bastholm
6,591,435 B1 * 7/2003 Hodgetts .......................... 5/88.1
6,658,680 B2 * 12/2003 Osborne et al. ................... 5/600
6,772,456 B2 * 8/2004 Votel ............................ 5/81.1 R
7,138,884 B2 * 11/2006 Cheung et al. .................. 333/26
7,293,303 B2 * 11/2007 Worrell ........................ 5/81.1 R
7,333,025 B2 * 2/2008 Oosugi .................... 340/825.72
2002/0014951 A1 2/2002 Kramer et al.
2002/0029418 A1 * 3/2002 Votel .......................... 5/81.1 RP
2002/0141479 A1 * 10/2002 Garcia-Luna-Aceves et al. ............................ 375/132
2003/0053002 A1 * 3/2003 Griesau et al. ................ 348/734
2004/0043802 A1 * 3/2004 Nagano ...................... 455/575.9
2005/0017871 A1 * 1/2005 Kagermeier et al. .... 340/825.72
2005/0066369 A1 * 3/2005 Chang ............................. 725/75
2005/0138727 A1 * 6/2005 Faux et al. ................... 5/81.1 R
2006/0028350 A1 * 2/2006 Bhai ............................. 340/666
2006/0041680 A1 * 2/2006 Proctor, Jr. et al. ........... 709/238
2006/0052124 A1 * 3/2006 Pottenger et al. ............. 455/515
2007/0210917 A1 * 9/2007 Collins et al. .............. 340/539.1
2008/0140158 A1 * 6/2008 Hamel et al. .................... 607/60

FOREIGN PATENT DOCUMENTS

DE 31 19 876 A1 12/1982
DE 31 09 166 A1 1/1983
EP 0 178 951 A2 4/1986
EP 0 220 708 A2 5/1987
EP 0 228 233 A2 7/1987
EP 0 261 830 A2 3/1988
EP 0 302 579 A1 2/1989
EP 0 316 643 A2 5/1989
EP 0 341 358 A1 11/1989
EP 0 341 570 A2 11/1989
EP 0 348 726 S2 1/1990
EP 0 373 912 A2 6/1990
EP 0 453 363 A1 10/1991
EP 0 455 852 A1 11/1991
EP 0 488 552 A2 6/1992
EP 0 505 312 A1 9/1992
EP 0 505 847 A1 9/1992
EP 0 999 533 A2 5/2000
GB 1 404 038 8/1975
GB 2 210 554 A 6/1989
JP 50-95978 7/1975
JP 54-45472 4/1979
JP 54-45473 4/1979
JP 59-186009 10/1984
JP 4-322611 11/1992
JP 10-337314 12/1998
JP 2001-494 1/2001
NL 8902202 3/1991
WO WO 90/06739 6/1990
WO WO 99/23990 5/1999
WO WO 99/52487 10/1999

* cited by examiner

| | | | | | |
|---|---|---|---|---|---|
| FIG. 22 | FIG. 23 | FIG. 24 | FIG. 25 | FIG. 26 | FIG. 27 |
| FIG. 28 | FIG. 29 | FIG. 30 | FIG. 31 | FIG. 32 | FIG. 33 |
| FIG. 34 | FIG. 35 | FIG. 36 | FIG. 37 | FIG. 38 | FIG. 39 |

Fig. 21

WIRELESS CONTROL SYSTEM FOR A PATIENT SUPPORT APPARATUS

RELATED APPLICATIONS

This application claims the benefit, under 35 U.S.C. §119 (e), of U.S. Provisional Patent Application Ser. No. 60/638,591 filed Dec. 23, 2004 which is hereby incorporated by reference herein in its entirety.

BACKGROUND OF THE INVENTION

The present system relates to the wireless control of functions of a patient support apparatus and to systems that assist with the movement of patients who are partially or completely incapacitated. More specifically, the present disclosure relates to a wirelessly controlled system coupled to a patient support apparatus and configured to reposition a patient relative to the longitudinal length of the patient support apparatus.

From time to time, patients on a patient support apparatus, such as a hospital bed, who are partially or completely incapacitated need to be moved or repositioned. For example, in some cases, a patient may have slid down, slumped, or otherwise moved toward a foot end of the patient support apparatus, for example. This may result from raising a head section of the patient support apparatus and the patient may need to be repositioned toward the head end after the head section is lowered back down. In other cases, a patient may need to be moved to a different bed.

In repositioning or moving a patient, a caregiver such as a nurse, for example, will grip the patient and pull, slide, or roll the patient to the new position. For larger patients, the caregiver may summon assistance from other nurses, assistants, orderlies, or the like. In some cases, a piece of fabric referred to as a draw-sheet may be positioned under the patient and used by the caregivers as an aid to repositioning the patient. The draw-sheet may be gripped by the caregiver(s) and used to lift and reposition the patient or the sheet may be pulled over the surface of the patient support apparatus to reposition the patient.

SUMMARY OF THE INVENTION

The present invention comprises one or more of the features recited in the appended claims or the following features or combinations thereof:

A patient support apparatus comprising a pull-up-in-bed system for repositioning a patient on the patient support apparatus is provided. The pull-up-in-bed system may comprise a retractor, a tether coupled to the retractor at a first end of the tether and configured to be retracted by the retractor. The pull-up-in-bed system may further comprise a sheet attachment device coupled to a second end of the tether, the sheet attachment device configured to engage a sheet under the patient being repositioned.

The sheet attachment device may comprise a release handle coupled to a U-shaped frame and moveable between a first position and a second position. The sheet attachment device may further comprise a roller coupled to the U-shaped frame between the two legs of the U-shaped frame, the roller being rotatable relative to the U-shaped frame. The sheet attachment device may include a ratchet mechanism which permits rotation of the roller relative to the U-shaped frame in a first rotational direction and impeding rotation of the roller in a second, and opposite direction. The ratchet mechanism may be releasable relative to the roller thereby permitting free rotation of the roller in both the first and second directions. A linkage may connect the release handle to the ratchet mechanism such that when the release handle is in a first position, the ratchet mechanism is engaged to prevent rotation of the roller in the second direction and when the release handle is in a second position, the ratchet mechanism is released to permit rotation of the roller in the second direction. The release mechanism may be biased toward the engaged position by a spring. In other embodiments, a wrap spring may be provided to lock the roller from rotating relative to the frame. In such embodiments, the handle may be moveable to release the wrap spring to allow the roller to rotate relative to the frame.

The sheet attachment device may further comprise a retracting pin moveably coupled to the U-shaped frame and moveable between a first position wherein the retracting pin extends into a cavity on the side the U-shaped frame and a second position wherein the retracting pin retracts into the U-shaped frame so that the retracting pin does not extend into the cavity. The retracting pin may be configured to engage an edge of a lug on a headboard of the patient support apparatus to retain the sheet attachment device onto the headboard until the retracting pin is retracted to allow the sheet attachment device to be removed from the headboard. The retracting pin may be coupled to the release handle such that when the release handle moves between the first and second positions, the retracting pin moves between the retracting pin's corresponding first and second positions. The retracting pin may be retracted independently of the release handle by exerting an external force along an axis of the retracting pin. Also, the retracting pin may cam against the lug as the sheet attachment device is placed into the storage space of the headboard thereby moving the retracting pin from the first position to the second position until the retracting pin clears the lug and is free to extend past a lower edge of the lug. The retracting pin may be biased to the first position by a spring.

A sheet on the patient support device may be wound around the roller as the roller is rotated in the first direction relative to the frame. After a single revolution, the sheet may wrap upon itself. The sheet may stay wrapped upon the roller until the ratchet mechanism is moved to the second position releasing the roller. The sheet may then be unwound from the roller to disengage the sheet from the roller. The roller may rotate in the second direction as the sheet is unwound. The roller may have a pliable external surface to provide improved gripping of the sheet to the roller during engagement of the sheet and roller. The external surface of the roller may comprise Santoprene® or a similar material.

The U-shaped frame may be a multi-piece construction including a front housing and a back housing coupled to the front housing. The front housing and back housing may be a compression molded, glass-filled polyester material. In some embodiments, the front and back housing may be machined from aluminum or other metal. It should be understood that there are any of a number of materials and processes that may be used to construct pieces of the U-shaped frame. The release handle, ratchet mechanism, springs, and linkage may be retained between the front and back housings when the front and back housings are coupled together.

The tether may be coupled to the sheet attachment device by a bracket that is retained between the housings. The tether may comprise a woven nylon belt. The tether may comprise a coating or other protective covering such as urethane. The coating may provide a smooth outer surface and thereby reduce soiling or contamination. The tether may further comprise instructions related to the use of the pull-up-in-bed system. In some embodiments, the instructions may be on a label that is adhered to the belt prior to applying the urethane coating. In other embodiments, the instructions may be silk-screened on the belt. The tether may pass over the headboard. A headboard configured to withstand the forces applied by the retraction of the tether and having an integrated roller may be used. For example, the headboard of a copending related U.S. patent application titled "HEADBOARD FOR A PULL-UP-IN-BED SYSTEM," with a Ser. No. 11/314426 , filed concurrently herewith on Dec. 21, 2005, and hereby incorporated herein by reference.

The retractor may comprise a prime mover, a retraction mechanism coupled to the prime mover, and a controller electrically coupled to the prime mover and configured to receive inputs from a user and a number of other hardware or sensors. The controller may process the inputs and provide output signals to the user, the prime mover, and a number of other hardware or sensors.

The retraction mechanism may comprise a clutch, a spool, and a retraction spring. The clutch may be coupled to the prime mover to receive rotational output therefrom. The clutch may transmit the rotational output from the prime mover to the spool until the clutch is selectively engaged to prevent transmission of output from the prime mover. The clutch may comprise a wrap spring, an input coupler, an output coupler, and an outer housing coupled to the wrap spring. The wrap spring may couple the input coupler to the output coupler such that rotation from the input coupler is transferred to the output coupler. The outer housing may be configured to release the wrap spring so that rotation from the input coupler is not transferred to the output coupler. The outer housing may be engaged by an engagement arm to release the wrap spring. The engagement arm may engage an engagement surface on the outer housing to release the wrap spring. The engagement arm may be configured to move between a first position in which the engagement arm engages the engagement surface of the outer housing and a second position in which the engagement arm is disengaged from the outer housing. In some embodiments, the engagement arm may be coupled to a solenoid, the solenoid configured to move the engagement arm between the first and second positions.

The spool may be coupled to an output coupler from the clutch to receive rotational output transmitted by the clutch. As the spool rotates in a first direction, the tether wraps about the spool. The spool may be coupled to a retraction spring which resists extension of the tether from the spool and urges retraction of the tether by biasing the spool to rotate in the first direction to retract the tether.

The prime mover may comprise an electric motor configured to provide rotational output, a gearbox coupled to the electric motor and configured to alter the speed of the rotational output from the motor. The motor may be a brushless, reversible DC motor. In some embodiments, the motor may be an AC motor. In some embodiments, the motor may receive power from the controller. In other embodiments, the motor may receive power directly from the patient support apparatus and the controller may provide an excitation signal to activate the motor. In still other embodiments, the motor may have an integrated power supply and receive power directly from a main power source such as a wall outlet, for example. In some embodiments, the controller may provide a supervisory signal that allows the motor to be activated. The gearbox may be an inline speed reduction apparatus. In other embodiments, the gearbox may transfer the output rotation from the motor at an angle, such as ninety degrees.

The controller may comprise a field programmable gate array (FPGA) logic circuit. In some embodiments, the controller may comprise a microprocessor or microcontroller coupled to a control network of the patient support apparatus. The controller may receive signals from various sensors and input devices and process those signals to provide output signals to the prime mover, solenoid, and an audible alarm. The sensors may include an optical detector, a potentiometer, and a bed status sensor. The optical detector detects that the tether is in the fully retracted position by detecting the presence of an end-of-travel indicator. The potentiometer may provide a feedback signal to the controller which is indicative of the amount of tether which has been extended from the spool by sensing the amount of rotation of the spool. The bed status sensor may be configured to receive a signal from the patient support apparatus indicating that the patient support apparatus is positioned to perform a patient repositioning operation or that a patient repositioning operation should not be performed. For example, if the head section of the patient support apparatus is inclined, the pull-up-in-bed system may not operate due to a signal from an associated bed status sensor. Likewise, if another bed motor other than the motor associated with the pull-up-in-bed system is active, the pull-up-in-bed system may not activate. It should be understood that there are a number of conditions which may be sensed to provide a signal to the controller not to operate the pull-up-in-bed system.

In some embodiments, a control system for the patient support apparatus may comprise a device operable to send a wireless signal, a wireless receiver, and a circuit operatively coupled to the wireless receiver. The device may control at least one function of the patient support apparatus. The wireless receiver may be coupled to the patient support apparatus and configured to receive the wireless signal from the device. The circuit may have a first mode of operation in which the circuit processes the wireless signal and associates the device with the patient support apparatus. The circuit may have a second mode in which the circuit controls the patient support apparatus to operate at least one function of the patient support apparatus in response to the wireless signal.

The control system may further comprise a visual indicator in communication with the circuit and configured to provide an indication that the device has been successfully associated with the patient support apparatus.

The circuit may comprise a memory device configured to store an association parameter transmitted by the device. In some embodiments, the device may transmit the wireless signal at a plurality of frequencies. The circuit may further comprise multiple memory devices and each memory device may store a different association parameter for each of the plurality of frequencies at which the device transmits. The circuit may further comprise multiple visual indicators, each visual indicator being associated with a respective frequency at which the device transmits and the indicators may be operable to provide an indication that the device has been successfully associated with the circuit at a particular frequency.

In another embodiment, a control system for the patient support apparatus may comprise a plurality of wireless receivers, each wireless receiver configured to alternately receive a signal transmitted at a plurality of wireless signals. The control system may further comprise a circuit operatively coupled to the wireless receivers. The circuit may sequentially poll combinations of each wireless receiver at each frequency until a signal of suitable quality is detected. The circuit may maintain the receiver and frequency combination at which the signal of suitable quality is detected.

In some embodiments, in order to determine if the signal is of suitable quality, the circuit may analyze the wireless signal to determine if the signal includes a signal source identifier that the circuit recognizes. The circuit may further analyze the signal to determine if the signal source identifier transmitted in a first transmission matches the signal source identifier in a second transmission immediately following the first transmission.

In some embodiments, the wireless receivers may each comprise an antenna tends to be immune to a particular interference source. In some embodiments, the circuit may comprise a printed circuit board. The antenna may comprise a trace of a printed circuit board or an external wire coupled to the circuit. The source of wireless signal transmitted over a plurality of frequencies may be a device that transmits the signal to control a function of the patient support apparatus. The function of the patient support apparatus may be a motor. The motor may be a part of a pull-up-in-bed system.

In some embodiments, the signal may be an infrared signal. A wireless transmitter may be coupled to the sheet attachment device or other user input device and configured to send a signal to operate a function of the patient support apparatus only if an appropriate sequence of user input devices are activated to prevent unintentional operation. In some embodiments, an enable input may be required to be activated prior to a function input and the function input may be required to activated within a predetermined time of the enable input for the function to be activated by the control system. The circuit may be configured to determine that the signal includes is from a device which has been previously associated with the circuit before activating the function of the patient support apparatus.

The control system may include a memory to store an association variable of the transmitter, such as a serial number of the transmitter, for example. In some embodiments, the device may transmit a signal redundantly over a plurality of frequencies. The signal may be a radio frequency signal In an illustrative embodiment, a wireless receiver may be coupled to the controller and configured to receive a wireless signal from the wireless transmitter and process that signal to provide an input signal to the controller to indicate that the user has activated the pull-up-in-bed system. The wireless receiver may comprise multiple antennae, an antennae switching system, a FPGA, a learn switch, an electrically erasable programmable read-only memory (EEPROM), and one or more light emitting diodes (LEDs). The learn switch may be moveable between a learn position and a normal position. The FPGA may be configured to receive and store a unique identifier for the wireless transmitter hardware when the learn switch is in the learn position and store this identifier in the EEPROM. The FPGA may be configured to compare the stored identifier with an incoming identifier that is part of a wireless signal from the wireless transmitter uniquely indicative of the wireless transmitter hardware being used. When the learn switch is in the normal position, the FPGA may compare the stored identifier to the incoming identifier to confirm that the signal is from the appropriate transmitter. The LEDs may provide visual indication to a user of the status of the wireless receiver with respect to a mode, such as a learn mode, for example, and whether the wireless receiver has successfully acquired and stored the identifier of the wireless transmitter.

The retractor may be coupled to a frame of the patient support apparatus. In some embodiments, the retractor may be coupled to a frame independent of a weighing frame of the patient support apparatus and the sheet attachment device may be stowed on the headboard which is on the weighing frame of the patient support apparatus. In such embodiments, the retractor is configured to control retraction of the tether such that during periods of non-use the tether remains slacked and thereby reduces the amount of force on the weighing frame thereby reducing interference with the performance of a weighing system of the patient support apparatus which operates to determine the patient's weight.

While the present invention discloses the use of a wireless signal to operate a pull-up-in bed function of the patient support apparatus, it should be understood that the wireless functionality of the system may be applied to the operation of any of a plurality of functions of the patient support apparatus. For example, articulation functions of a patient support apparatus such as head elevation, apparatus height, leg section articulation or other articulation functions may be activated by the system. In some embodiments, the wireless system may be applied to operate other functions such as patient controlled devices including television channel up, channel down, channel select volume up, volume down, radio, audio, direct lighting, or indirect lighting or to activate or operate a nurse call system.

Additional features of the disclosure will become apparent to those skilled in the art upon consideration of the following detailed description of illustrative embodiments exemplifying the best mode of carrying out the pull-up-in-bed system as presently perceived.

BRIEF DESCRIPTION OF THE DRAWINGS

The detailed description particularly refers to the following figures in which:

FIG. 21 is a map showing how to lay out FIGS. 22-39 to form a schematic of a control board circuit of the pull-up-in-bed system;

DETAILED DESCRIPTION OF THE DRAWINGS

Figure 1:
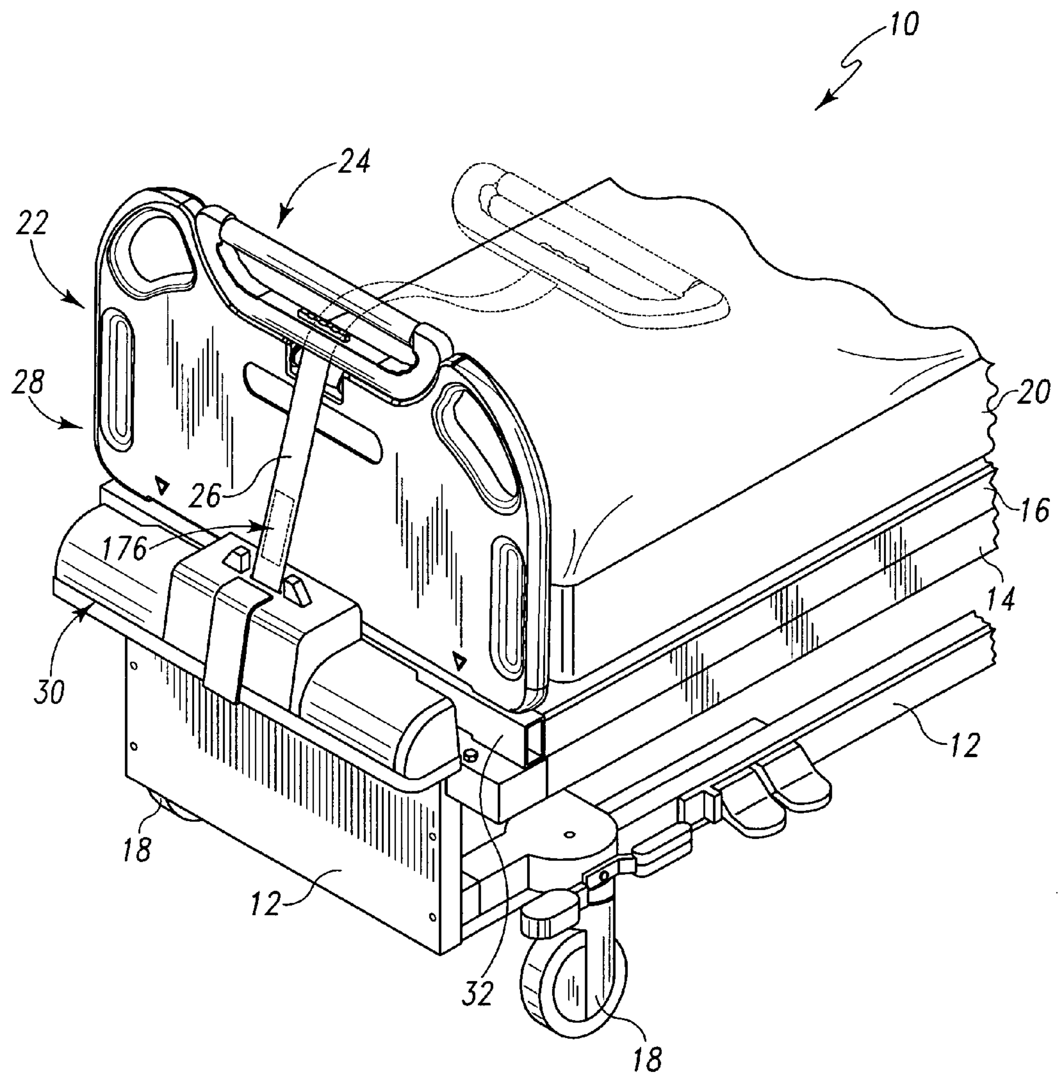
FIG. 1 is a fragmentary perspective view of a hospital bed having a pull-up-in bed system located thereon.

A patient support apparatus 10 including a pull-up-in-bed system 28 is shown in FIG. 1. The patient support apparatus 10 comprises a base frame 12, an intermediate frame 14 located on and moveable relative to the base frame 12, and an upper frame 16 located on the intermediate frame 14. A mattress 20 is located on the upper frame 16. The base frame 12 is supported on multiple casters 18. A headboard mounting frame 32 is located on the base frame 12 and is configured to receive and support a headboard 22. The pull-up-in-bed system 28 comprises a retractor 30 mounted on the base frame 12, a tether 26 coupled to the retractor 30 at one end, and a sheet attachment device 24 coupled to the tether 26 at the end opposite the retractor 30. In some embodiments, the headboard 22 may be located on the intermediate frame 14 with the retractor 30 located on the base frame 12.

Figure 2:
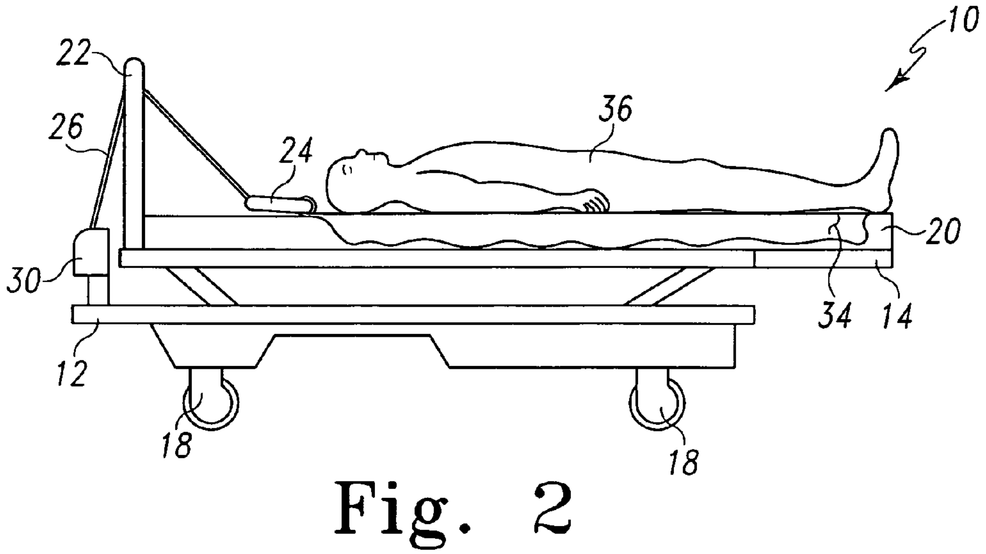
FIG. 2 is a side view of the hospital bed of FIG. 1 having a patient supported on the hospital bed near a foot end of the hospital bed and the pull-up-in-bed system coupled to a sheet under the patient.
Figure 3:
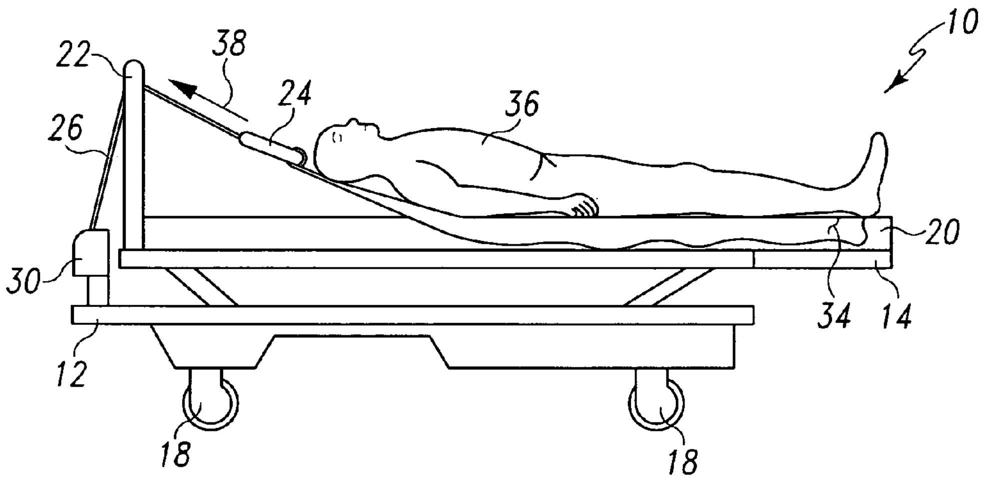
FIG. 3 is a side view of the hospital bed of FIG. 2 showing the patient being repositioned by the pull-up-in-bed system.
Figure 4:
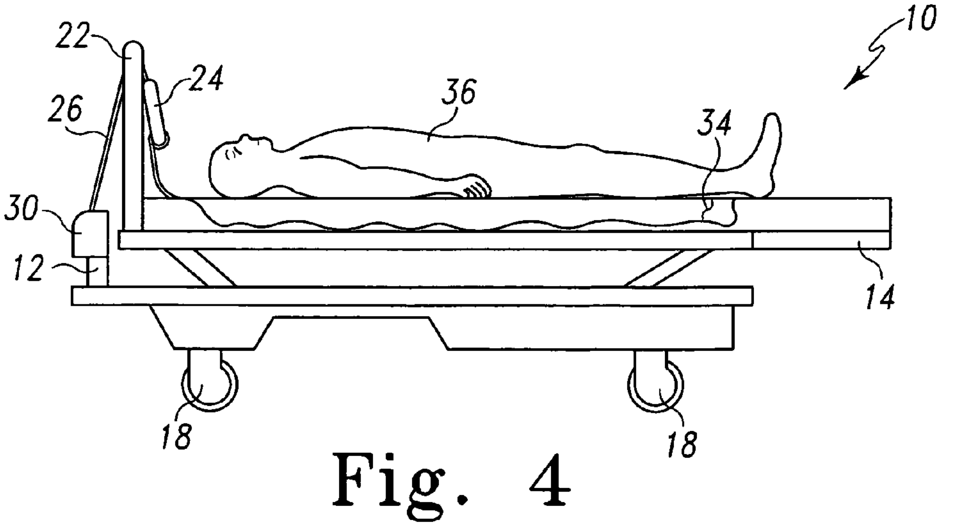
FIG. 4 is a side view of the hospital bed of FIG. 2 showing the patient repositioned near a head end of the hospital bed and the pull-up-in-bed system reversed by a sufficient amount to create slack in the pull-up-in-bed system.

Referring now to FIGS. 2-4, the pull-up-in-bed system 28 is configured to assist with the repositioning of a patient located on the mattress 20 by pulling a sheet located between the patient and the mattress 20. This is accomplished by extending the tether 26 and attaching the sheet attachment device 24 to sheet 34 as shown in FIG. 2. Once the sheet attachment device 24 is attached to the sheet 34, the retractor 30 is operated to retract the tether 26 which thereby pulls the sheet 34 and the patient 36 thereon as depicted by the arrow 38 shown in FIG. 3. Once the repositioning cycle has been completed, the retractor 30 reverses direction for a predetermined time to slacken the tether 30 so as to relieve any forces which are developed in the tether 26 or sheet 34. The result of the operation of the pull-up-in-bed system 28 is to move the patient 36 between a first position where the patient 36 has slid to the foot end of the patient support apparatus 10, as shown in FIG. 2, and a second position where the patient 36 is located more properly near the head end of the patient support apparatus 10 as shown in FIG. 4.

Figure 5:
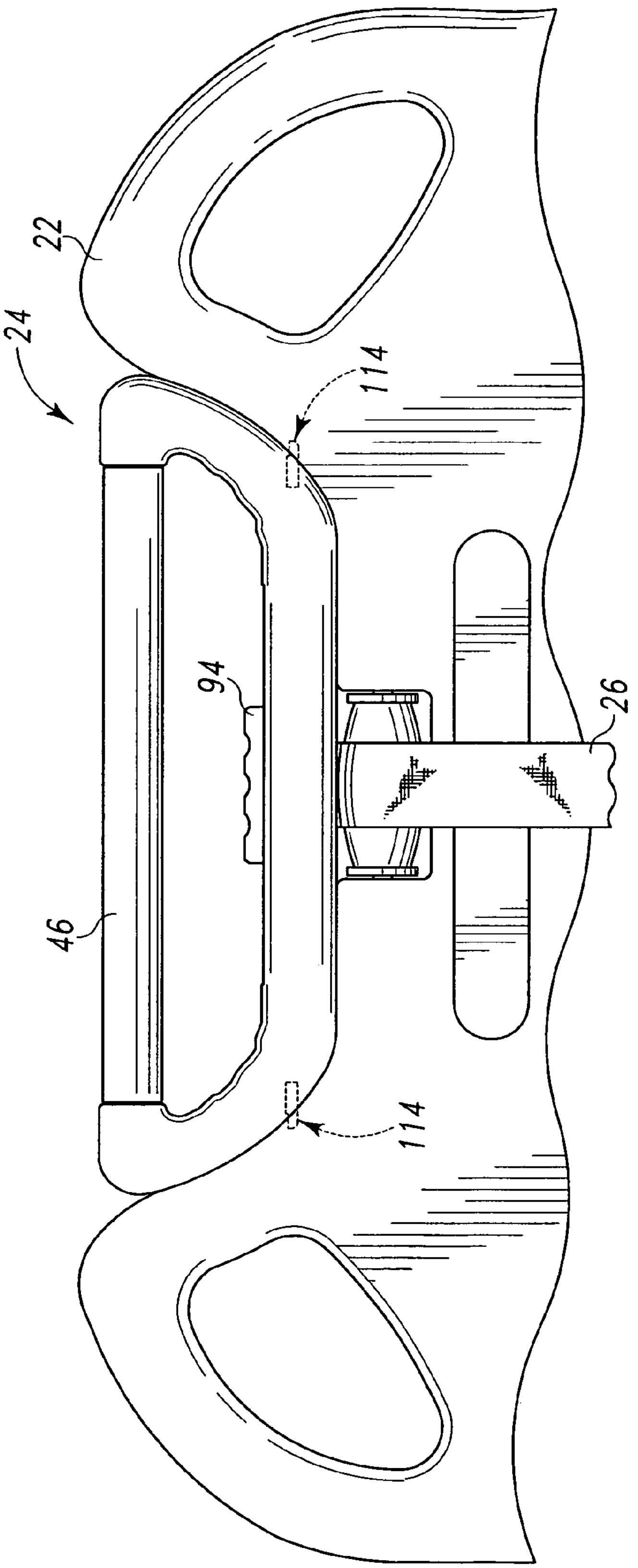
FIG. 5 is a fragmentary end view of the hospital bed of FIG. 1 showing a sheet attachment device of the pull-up-in-bed system stowed in a headboard of the hospital bed and showing a tether extending downwardly from the sheet attachment device.

Upon completion of the repositioning cycle, the sheet attachment device 24 is detached from the sheet 34. The sheet attachment device 24 is configured to be stowed in the headboard 22 when not in use as shown in FIG. 5 and in solid in FIG. 1. The sheet attachment device 24 and tether 26 are shown in an extended position in phantom in FIG. 1.

Figure 7:
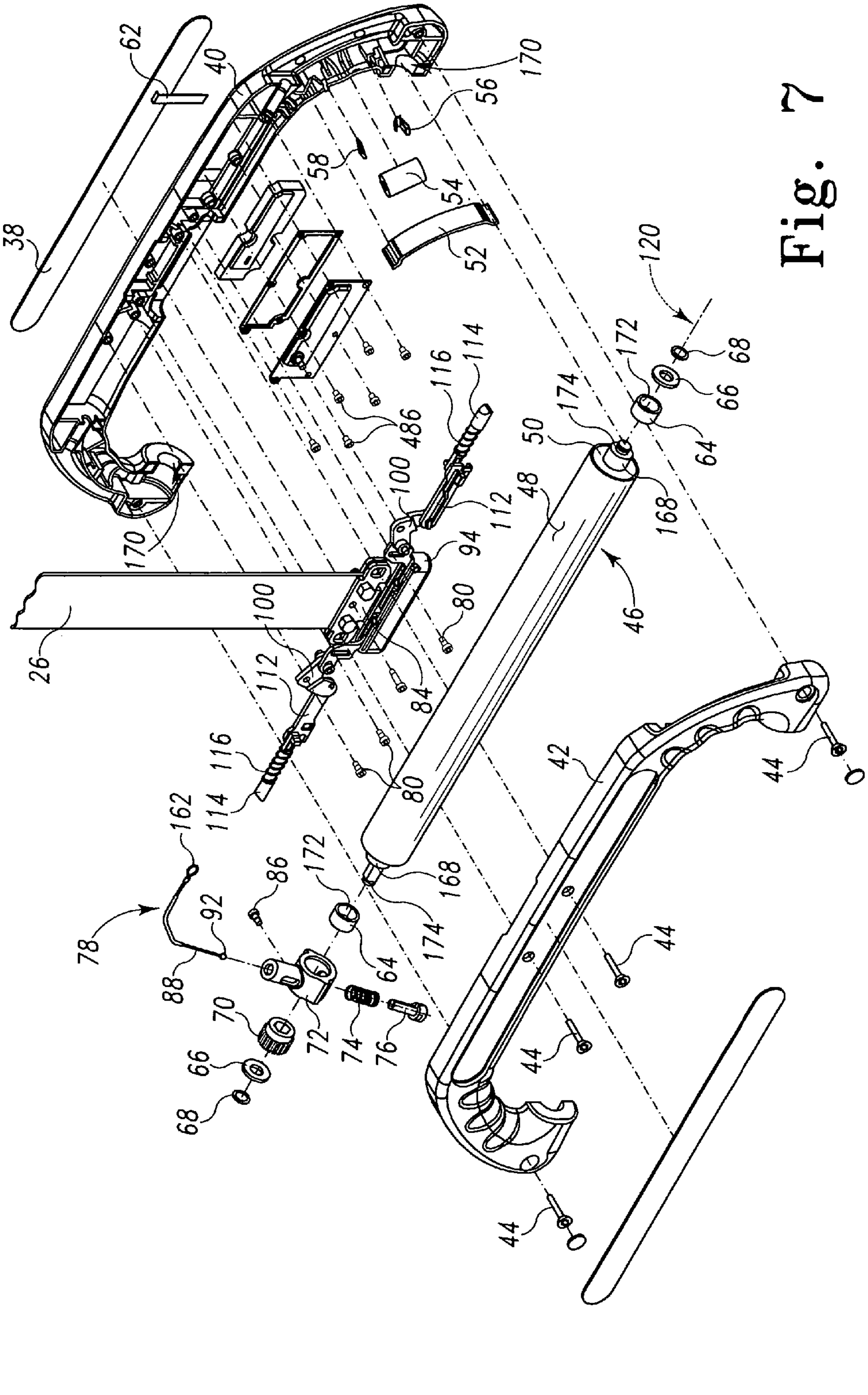
FIG. 7 is an exploded perspective view of the sheet attachment device of FIG. 6.
Figure 16:
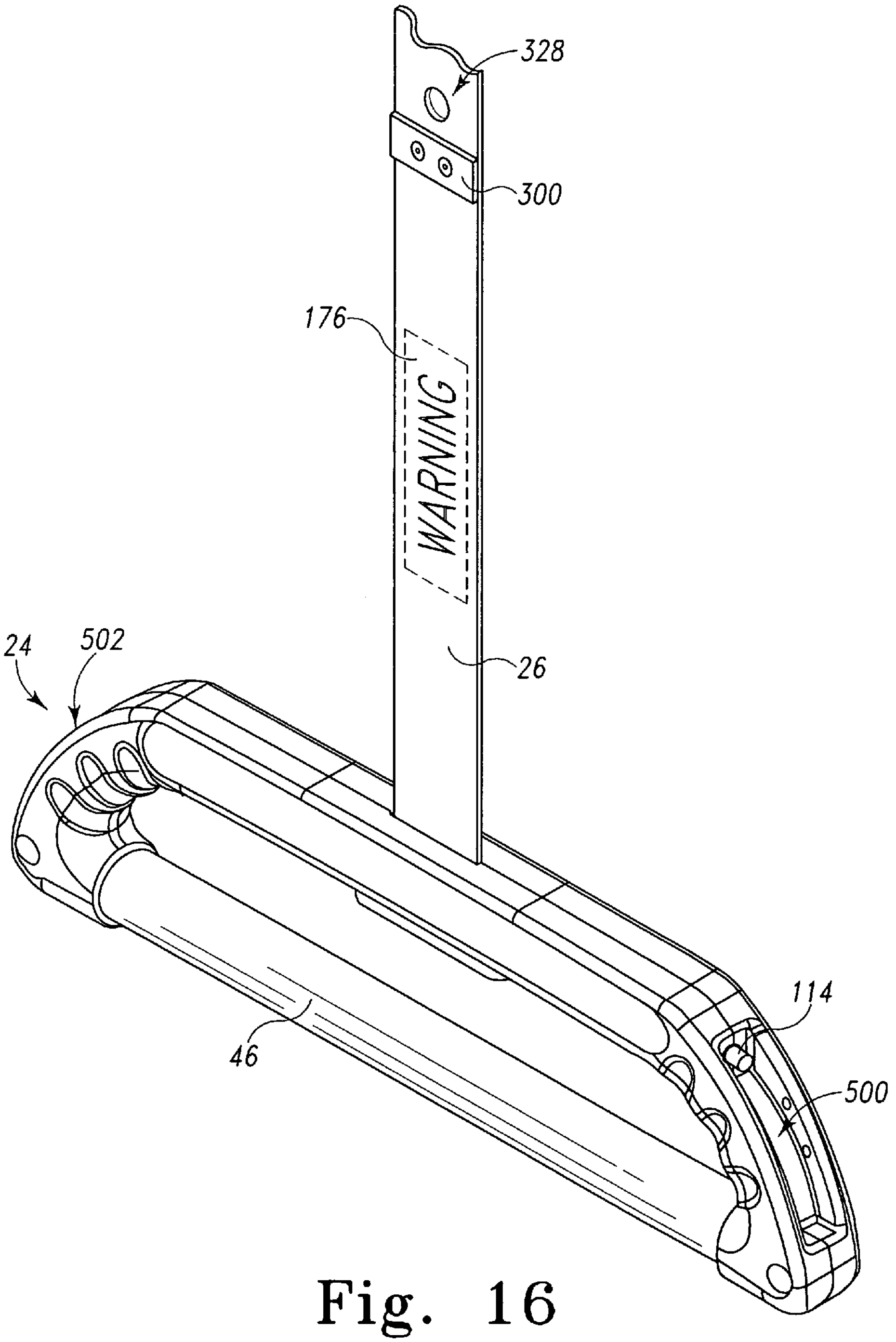
FIG. 16 is a perspective view of a sheet attachment device and a portion of the tether.
Figure 17:
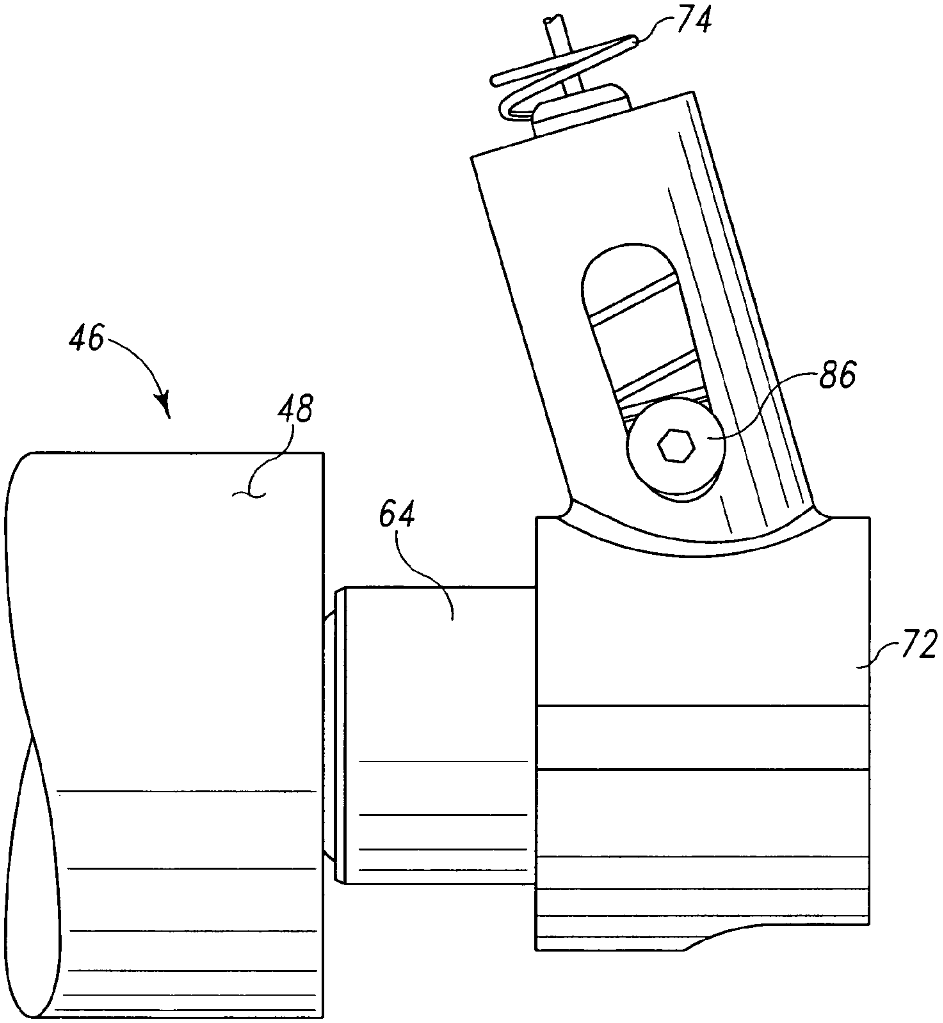
FIG. 17 is a fragmentary front view of a ratchet release mechanism for a sheet attachment device.

Referring now to FIG. 7, the sheet attachment device 24 comprises a front housing 40 and a back housing 42 which is coupled to the front housing 40 such as by screws 44. The sheet attachment device 24 also includes a roller 46 and a retainer which is coupled to the tether 26 and is configured to retain the tether 26 relative to the sheet attachment device 24. The front housing 40 and the back housing 42 are configured to intermesh so that when they are coupled together, such as by screws 44, the resulting assembly is a U-shaped frame that provides structural strength to transfer a load between the roller 46 and the tether 26. The assembly of front housing 40 and back housing 42 also results in the creation of two elongated cavities 500, 502 on the outer opposite sides of the U-shaped frame of the sheet attachment device 24 as seen in FIG. 16. These cavities 500, 502 are sized to receive two lugs 504, 506 on the headboard 22 when the sheet attachment device 24 is inserted into a cavity 160 in the top of the headboard 22. When the sheet attachment device 24 is inserted in cavity 160, the lugs 504, 506 and cavities 500, 502 assist in retaining the sheet attachment device 24 on the headboard 22 as will be discussed in further detail below.

The front housing 40 and the back housing 42 experience significant stresses due to the loads transferred therethrough. In the illustrative embodiment of FIG. 7, the housings 40, 42 are compression molded glass-filled polyester. In other embodiments, the housings 40, 42 may be machined, formed, cast, or molded from any material having suitable strength and structural characteristics necessary to withstand and transmit the load of patient 36 during repositioning.

Figure 6:
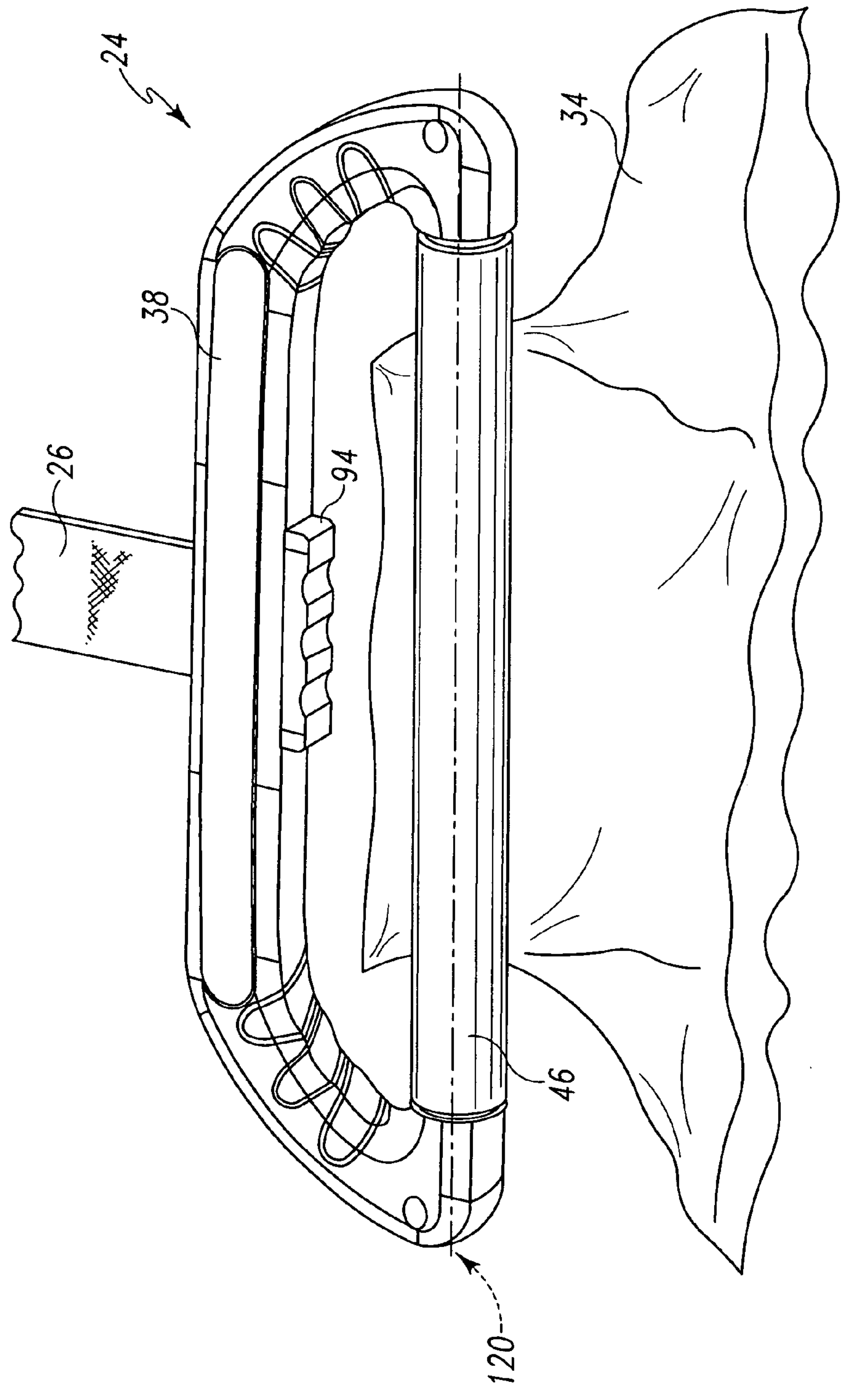
FIG. 6 is a fragmentary perspective view showing a sheet attachment device positioned near a sheet that is to be wound onto a roller of the sheet attachment device.

When the housings 40, 42 are coupled together, the roller 46 is retained by the housings 40, 42 and is rotatable relative to the housings 40, 42 about an axis 120 which is substantially coincident with the centerline of the roller 46 along its longitudinal length as shown in FIG. 6. Referring now to FIG. 7, the roller 46 includes a roller cover 48 and a roller core 50. The roller cover 48 is adhered to the roller core 50 by an adhesive. The surface of the roller core 50 which engages the roller cover 48 may be knurled to increase the friction between the roller cover 48 and roller core 50 in some embodiments. In some embodiments, the knurling may be replaced by some other discontinuity such as grooving or ridges. In some embodiments, the adhesive may be omitted and the roller cover 48 retained on the roller core 50 by friction. The roller cover 48 is a pliable material such as Santoprene® material. In use, the roller 46 engages with a sheet 34 and as the roller 46 is rotated, the sheet 34 is wrapped around the roller 46 as shown in FIG. 6. After one complete revolution, the sheet 34 begins to wrap upon itself thereby securing the sheet 34 to the sheet attachment device 24.

Referring again to FIG. 7, rotation of the roller 46 relative to the housings 40, 42 is facilitated by a bushing 64 which engages the roller core 50 at a shoulder 168. The bushing 64 nests in a semi-circular pocket 170 at each end of the front housing 40 and a complementary pocket (not shown) at each end of the back housing 42. The bushing 64 is held fixed by the housings 40, 42 and has a bearing surface 172 which permits rotation between the roller core 50 at the shoulder 168 and the bushing 64. A thrust washer 66 interfaces between the surface (not shown) of the roller core 50 and the housings 40, 42. The washer 66 is maintained in position by a snap ring 68 which fits into a groove 174 on the roller core 50.

Figure 18:
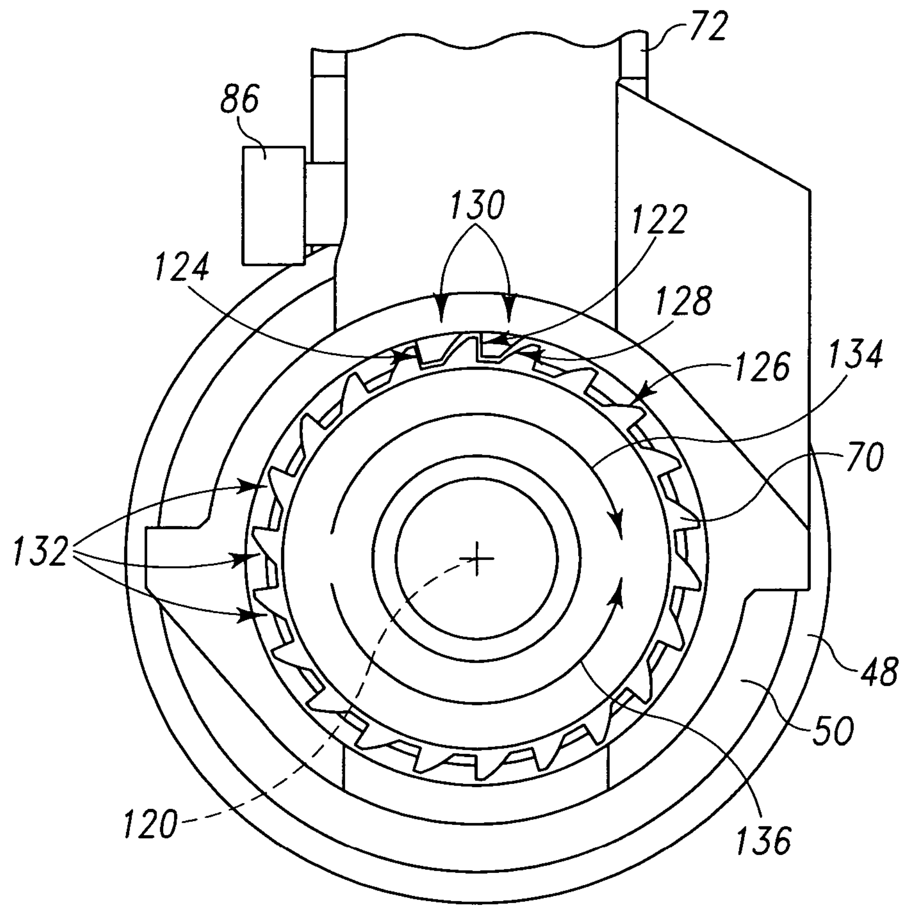
FIG. 18 is an end view of the ratchet release of FIG. 17 with portions cut away.

While the roller 46 freely rotates about axis 120 in one direction, a ratchet gear 70 which is coupled to the roller 46 is engaged by a retractable pawl 76 to prevent rotation in the opposite direction about axis 120. Referring now to FIG. 18, the pawl 76 has two teeth 130 which engage two of the teeth 132 which circumscribe the outer diameter of the ratchet gear 70. The pawl teeth 130 each have a locking surface 124 which is substantially perpendicular to the axis 120 of the roller 46. The ratchet gear 70 has a complementary locking surface 122 on each of the teeth 132, which locking surface 122 is also substantially perpendicular to the axis 120. Engagement between pawl locking surfaces 124 and gear locking surfaces 122 prevents rotation of the roller 46 about axis 120 in a first direction as depicted by the arrow 134 in FIG. 18.

Rotation in a second direction opposite the first direction, and depicted by arrow 136 in FIG. 18, results in ratcheting rotation as the torque applied disengages the pawl 76 from the ratchet gear 70. Ratcheting results from the engagement between ratcheting surface 128 on the teeth 130 of the pawl 76 and a ratcheting surface 126 on the teeth 132 of the ratchet gear 70. On the pawl 76, the ratcheting surface 128 is angled in relation to the locking surface 124. Similarly, on the ratchet gear 70 the ratcheting surface 126 is angled in relation to the locking surface 122 and the ratcheting surface 126 is complementary to ratcheting surface 128 on the pawl 76. As torque is applied in the direction of arrow 136, the resultant force transmitted from teeth 132 to teeth 130 through the ratcheting surfaces 126, 128 tends to urge the pawl 76 to disengage from the ratchet gear 70 and permit the ratchet gear 70 to index in the direction 136. This results in ratcheting of the roller 46 with respect to the remainder of the sheet attachment device 24, thereby allowing the sheet 34 to be spooled or wound onto the roller 46.

Figure 9:
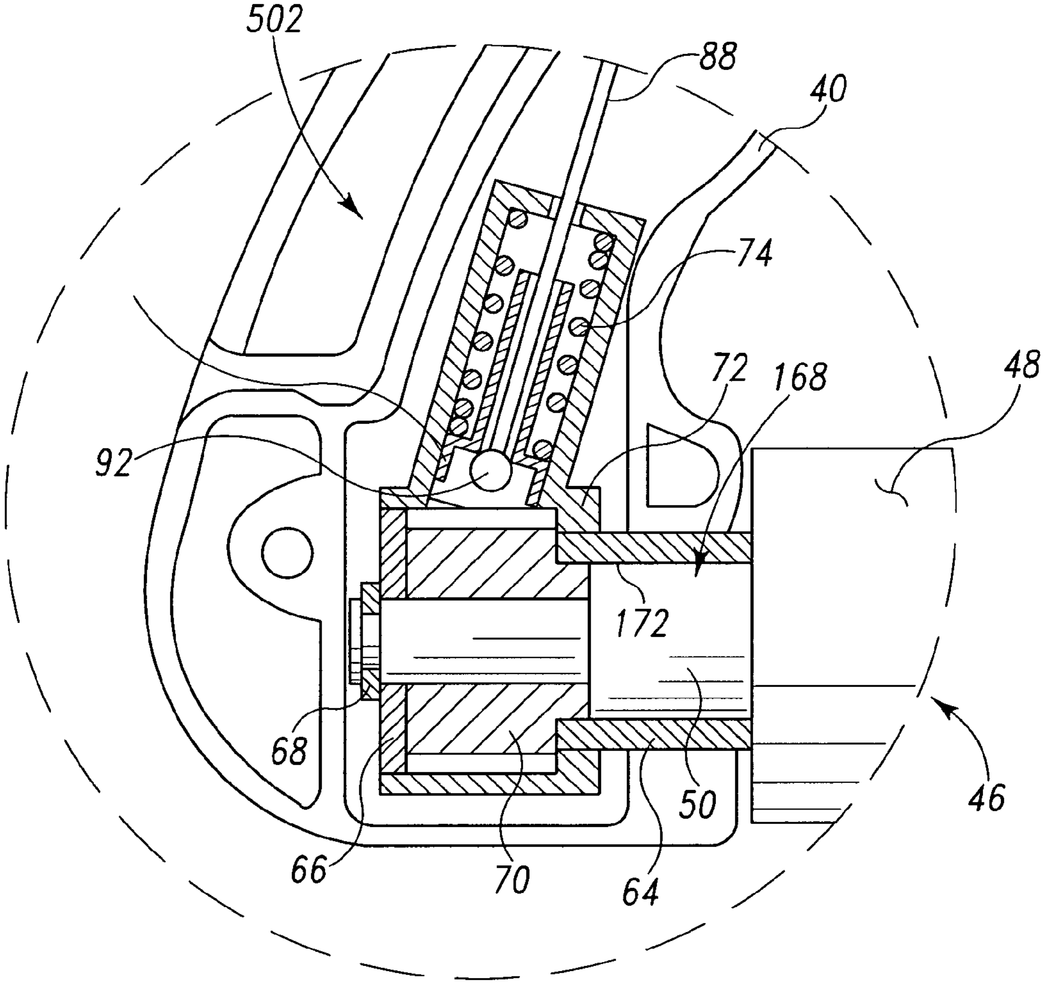
FIG. 9 is an enlarged cross-sectional view of a portion of the sheet attachment device of FIG. 8.

When the pawl is engaged as shown in FIGS. 9 and 18, the roller 46 is locked to prevent rotation in direction 134 and thereby prevents unspooling or unwinding of the sheet 34. The pawl 76 is retained in an upper portion 138 of ratchet housing 72 but is biased to engage the ratchet gear 70 by a spring 74 which is retained in a state of compression in the upper portion 138 between the pawl 76 and the ratchet housing 72. In order to disengage the pawl 76 from the ratchet gear 70, the bias of spring 74 is overcome such that the pawl 76 moves relative to the ratchet housing 72. In the illustrative embodiment, the pawl 76 is coupled to a first end of a ratchet release cable assembly 78 shown in FIG. 7. The second end of ratchet release cable assembly 78 is coupled to a lateral bracket 112 which is selectively actuable by a user to pull on the second end of the ratchet release cable assembly 78 and thereby overcome the bias of spring 74 and disengage the pawl 76 from the ratchet gear 70. During actuation of the lateral bracket 112, the roller 46 is free to move in both directions 134 and 136. Movement of roller 46 in direction 134 allows the sheet 34 wrapped on roller 46 to unwind or unspool therefrom.

Referring now to FIGS. 8-11, the actuation of lateral bracket 112 and, thereby, disengagement of the pawl 76 from the ratchet gear 70 is accomplished by a transfer of forces from a handle 94 through a series of links and pins. More specifically, the handle 94 is retained between housings 40 and 42, but is moveable with respect to housings 40 and 42. The handle 94 is biased to a first position, shown in FIG. 8, by two springs 96 which are each retained at a first end with notches formed in the retainer 84. When the handle 94 is in the first position, shown in FIG. 8, the pawl 76 is engaged with the ratchet gear 70. If sufficient force is applied to the handle in a normalized direction 140 as represented by the arrow in FIG. 8, the handle 94 moves between the first position, shown in FIG. 8, and a second position, shown in FIG. 10. This movement results in movement of two brackets 98 as well. Brackets 98 are located on opposite sides of the handle 94 and are situated within the housings 40, 42. The brackets 98 each have a guide slot 144 configured to receive a guide pin 146. Each guide slot 144 has a longitudinal length which is parallel to the direction of force 140 and when a force is applied to the handle 94, the interaction of guide slots 144 and guide pins 146 restrains the motion of the handle 94 so that the handle 94 does not cock when moving between the first and second positions.

When the handle 94 is actuated from the first position to the second position, the resulting motion moves the brackets 98. The brackets 98 each further include an aperture 148. The aperture 148 is configured to receive a pivot pin 110 which is coupled to a pivot link 100. The aperture 148 has an inside diameter which is slightly larger than the outer diameter of the pivot pin 110 so that the pivot pin 110 is free to rotate within the aperture 148. The pivot link 100 also includes an aperture 150 which receives a pivot pin 152 coupled to the front housing 40. Like the relationship of aperture 148 and pivot pin 110 discussed above, the aperture 150 inside diameter is sized slightly larger than the outside diameter of the pivot pin 152 so that the pivot link 100 is free to pivot about the pivot pin 152. Thus, when handle 94 is actuated by force 140 the resulting motion is translated through the bracket 98, pivot pin 110 to pivot the pivot link 100 about the pivot pin 152.

The pivoting of the pivot link 100 results in the linear movement of a lateral bracket 112 which is pivotably coupled to the pivot link 100. The lateral bracket 112 has yet another aperture (not seen) which receives another pivot pin 110 on the pivot link 100. The aperture on lateral bracket 112 receives the pivot pin 110 similar to the interaction of aperture 148 and pivot pin 110 discussed above such that the pivot pin 110 is free to pivot within aperture on the lateral bracket 112. The lateral bracket 112 then becomes a follower relative to movement of the pivot link 100. The lateral bracket 112 floats relative to the front housing 40 due to the support of the pivotable coupling of the lateral bracket 112 to the pivot link 100 through the pivot pin 110 and support of the lateral bracket 112 by the retaining pin 114 through the slot 154 of the retaining pin 114 engaging the pin 156 of the lateral bracket 112. Additional support is provided by the bias of the spring 74 which places tension on the ratchet release cable assembly 78. The tension developed by spring 74 also supports lateral bracket 112 and allows lateral bracket 112 to continue to float if the retaining pin 114 is displaced by an external force not transmitted through handle 94.

The resulting motion of lateral bracket 112 is transferred to the ratchet release cable assembly 78 and a retaining pin 114. The retaining pin 114 has a slot 154 which is configured to receive a pin 156 coupled to the lateral bracket 112. Movement of the lateral bracket 112 pulls the retaining pin 114 so that the retaining pin 114 is retracted from the cavity 502. The retaining pin 114 is biased to extend into the cavity 502 by a spring 116 which interfaces with the housing 40 at one end and with a shoulder 158 of retaining pin 114. Retraction of the retaining pin 114 into the housings 40, 42 results in compression of the spring 116. Upon subsequent release of the force on retaining pin 114, the spring 116 urges the retaining pin 114 to extend from the housings 40, 42 into the associated cavity 502.

Figure 8:
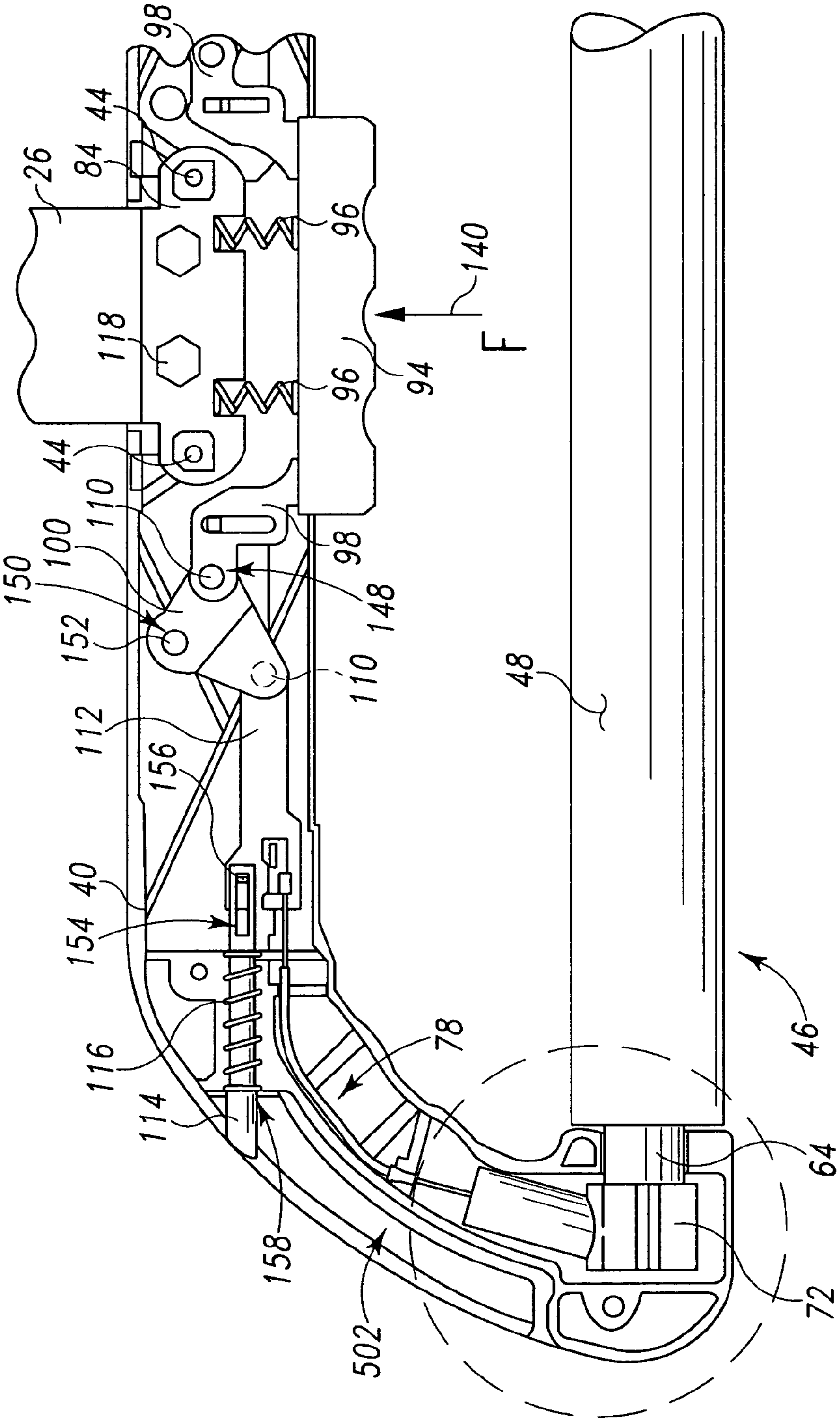
FIG. 8 is a fragmentary view of the sheet attachment device of FIG. 6 with portions cut away and a release handle in a first position.
Figure 10:
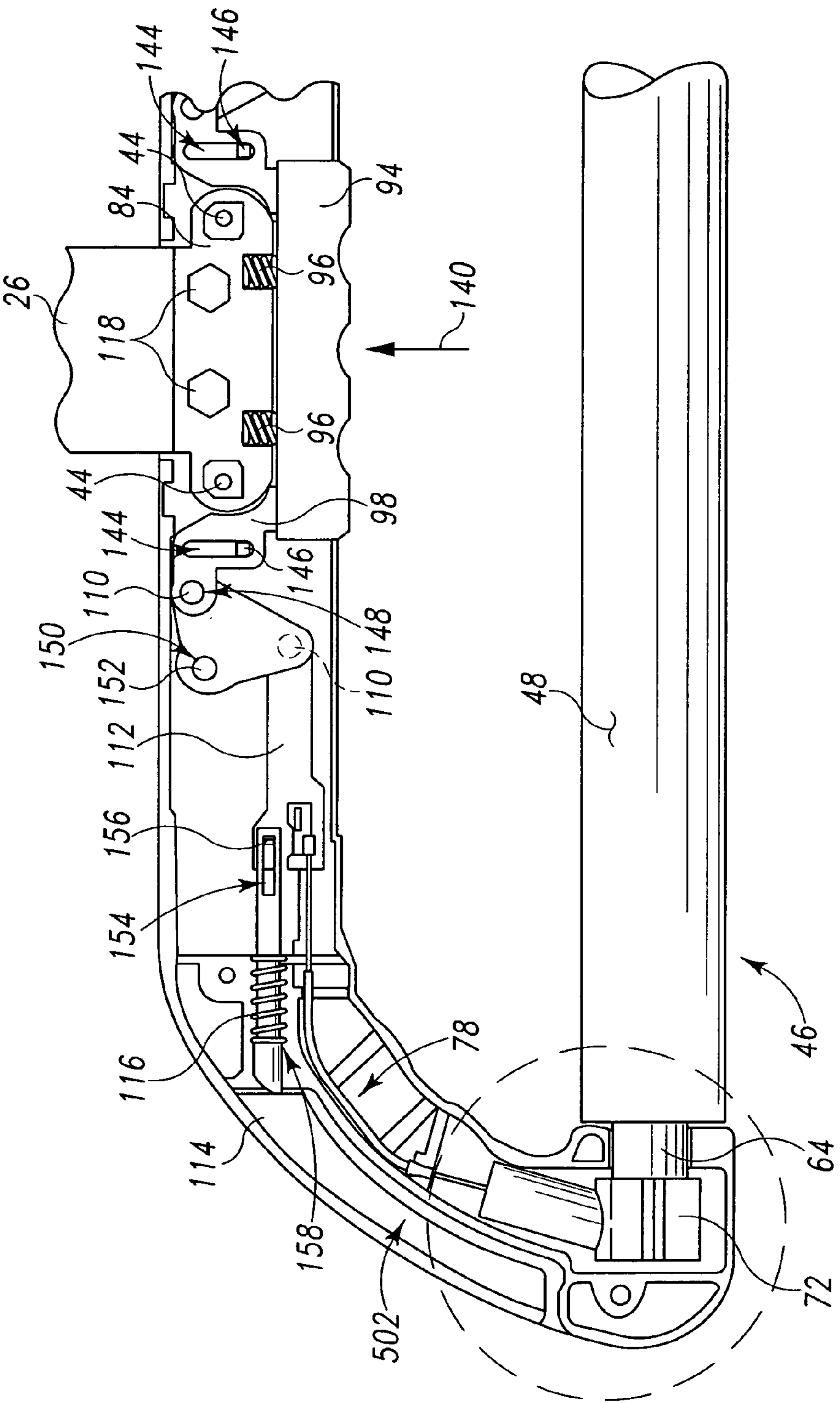
FIG. 10 is a fragmentary view of the sheet attachment device of FIG. 6 with portions cut away and the release handle in a second position.

Each retaining pin 114 extends into the respective cavity 502 of housing 40 and when the sheet attachment device 24 is moved in a downward direction into the cavity 160, shown in FIG. 16, distal end of the retaining pins 114 engage the lugs 504, 506, such that the retaining pins 114 are urged to retract to the second position (see FIG. 10). Once the retaining pins 114 slide past lower edges 508, 510 of the lugs 504, 506, the retaining pins 114 are urged to extend outwardly beneath the lugs 504, 506 to retain the sheet attachment device 24 on the headboard 22 for storage purposes as is best seen in FIG. 5. The storage of the sheet attachment device 24 on the headboard 22 is accomplished by sliding the sheet attachment device 24 into the cavity 160 in the headboard 22, the cavity 160 being configured to receive the sheet attachment device 24. Referring now to FIGS. 8 and 10, the retaining pin 114 is able to be retracted into housings 40, 42 when an external force is placed on the retaining pin 114. If a force sufficient to overcome spring 116 is applied along the axis of the retaining pin 114, the interaction between the slot 154 and the pin 156 is such that the pin 156 guides motion of the retaining pin 114 during the externally urged retraction of retaining pin 114 while the slot 154 is sized to permit the retaining pin 114 to move relative to lateral bracket 112. Referring again to FIG. 5, force is applied to the retaining pin 114 as the sheet attachment device 24 is inserted into the cavity 160. As the sheet attachment device 24 is placed into the cavity 160 the pressure applied to the sheet attachment device 24 results in the lugs 504, 506 of the cavity 160 to interfere with the retaining pin 114 and urges the retaining pin 114 to move inboard of the sheet attachment device 24 by overcoming the bias of spring 116. Once the sheet attachment device 24 is in a home position as shown in FIG. 1, the retaining pin 114 extends and couples the sheet attachment device 24 to the headboard 22. The retaining pins 114 are retracted by applying force to handle 94 to retract the retaining pins 114 before the sheet attachment device 24 can be removed from the headboard.

Figure 11:
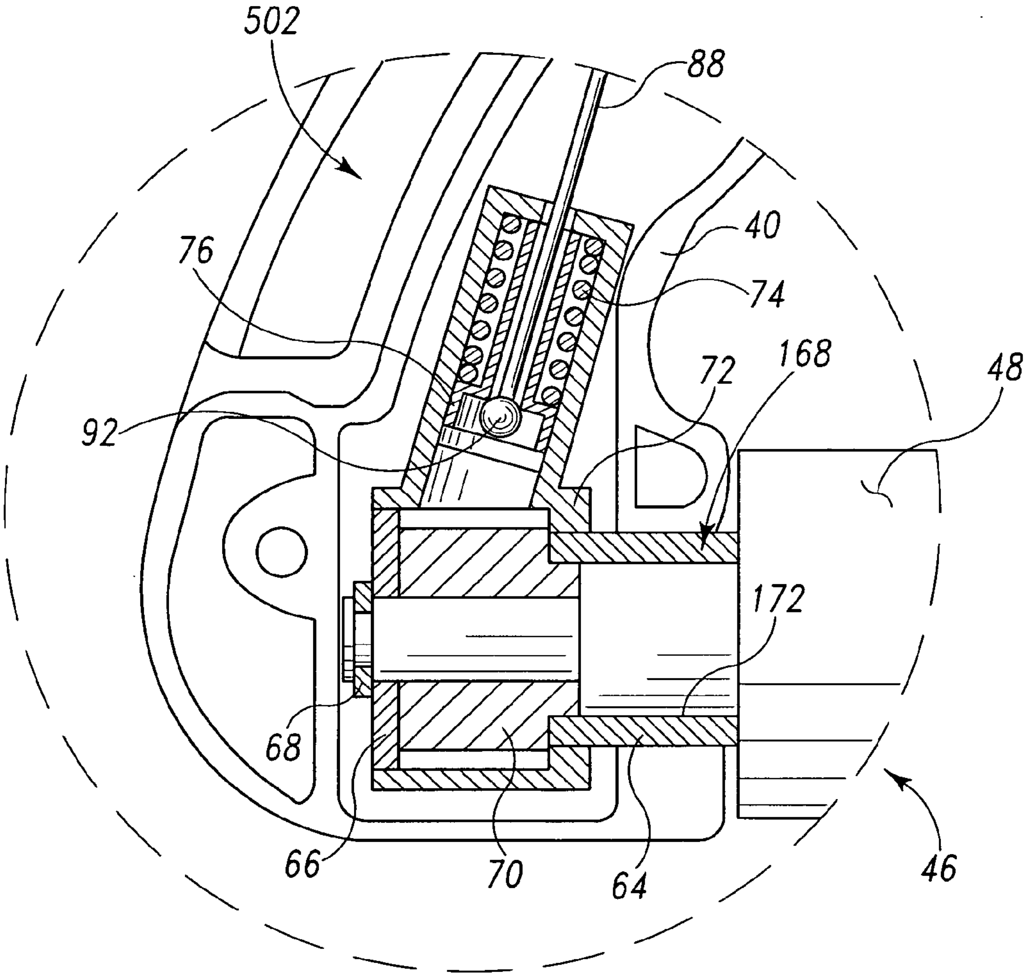
FIG. 11 is an enlarged cross-sectional view of a portion of the sheet attachment device of FIG. 10.

In addition to retracting the retaining pins 114, movement of lateral bracket 112 simultaneously moves the pawl 76 to the retracted position permitting the roller 46 to move freely and thereby unspool the sheet 34 from the roller 46 as shown in FIGS. 10 and 11. The ratchet release cable assembly 78 is coupled to the lateral bracket 112 by a loop 162. The loop 162 is directly coupled to a ratchet release cable 88 in turn, which is coupled to the pawl 76 by a ball 92 situated at an end of the ratchet release cable 88 opposite the loop 162. The ratchet release cable 88 passes through a sheath 90 which routes the ratchet release cable 88 through housing 40. The cable 88 is free to move relative to the sheath 90. Movement of the cable 88 overcomes the bias of spring 74 to move the pawl 76 to the retracted position shown in FIG. 9. The cable 88 passes through a slot (not shown) machined in the pawl 76 so that the ball 92 engages the pawl 76 with the cable 88 passing through the pawl 76. When force is applied to handle 94, the action is transmitted to the cable 88 which retracts the pawl 76. Release of handle 94 and thereby force on the cable 88 results in the bias of spring 74 to urge the pawl 76 back to the engaged position shown in FIG. 9.

Referring now to FIGS. 7, 8, and 10, the tether 26 is coupled to the retainer 84 by two bolts 118 which pass through the retainer 84, the tether 26, and the opposite side of the retainer 84 and retained by a nut (not shown). The retainer 84 is retained between the front housing 40 and the rear housing 42 when the housings 40, 42 are coupled together. In some embodiments, the tether 26 is a nylon web material similar to that used in seat belts of vehicles. The tether 26 is coated with urethane to preserve the life of the tether 26. In addition tether 26 includes instructions 176 for use of the pull-up-in-bed system 28 silk screened under the coating. In some embodiments, the instructions are printed on a label that is coupled to the tether 26 prior to the application of the urethane. In either embodiment, a clear urethane is used so that the instructions may be read through the urethane. The tether 26 is coupled on the end opposite the sheet attachment device 24 to a spool core 178 in the retractor 30. Placing the operating instructions on tether 26 assures that the instructions will not be misplaced and can be reviewed as needed by a caregiver.

Figure 15:
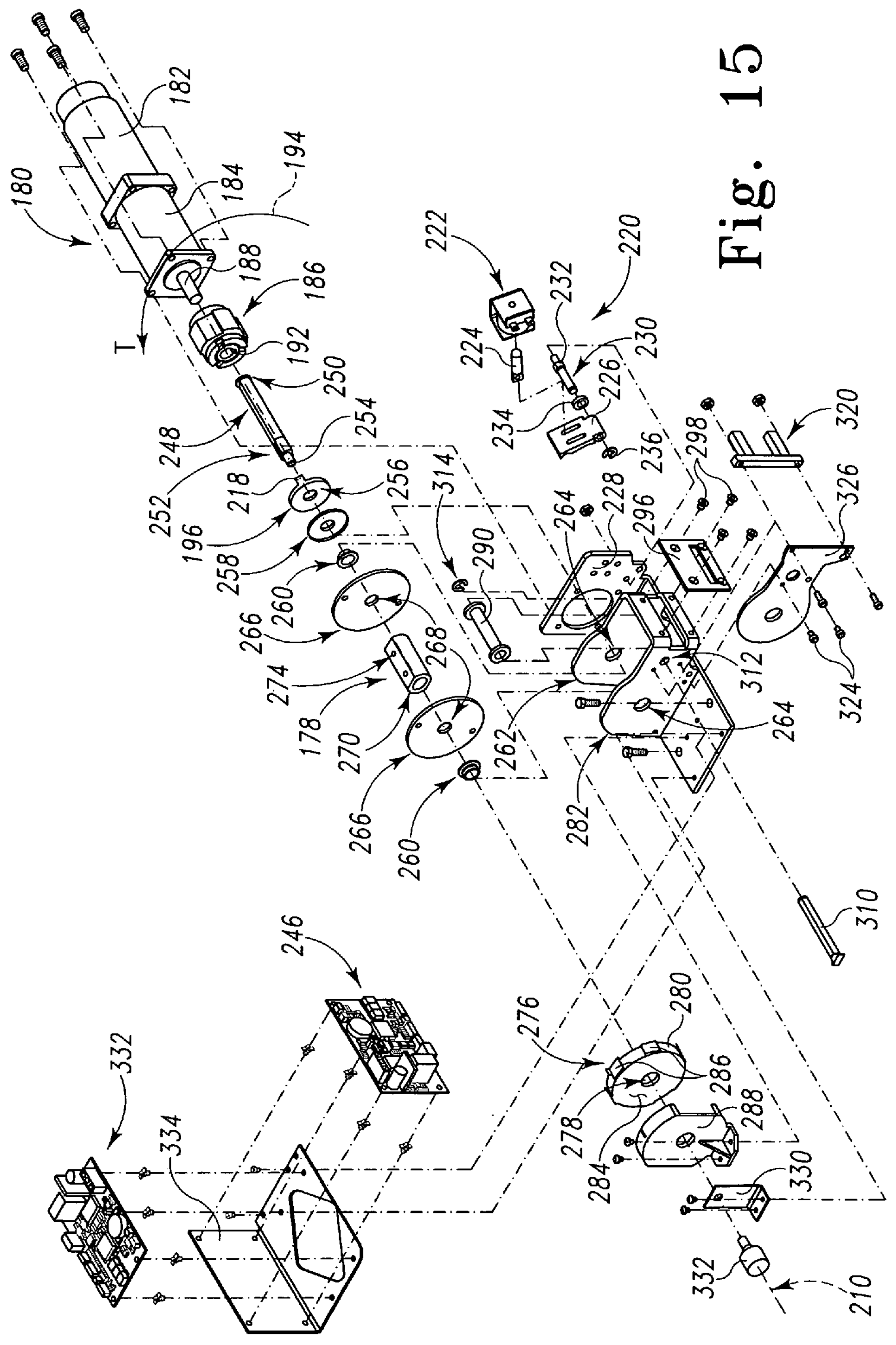
FIG. 15 is an exploded perspective view of a retractor of the pull-up-in-bed system of FIG. 1.
Figure 19:
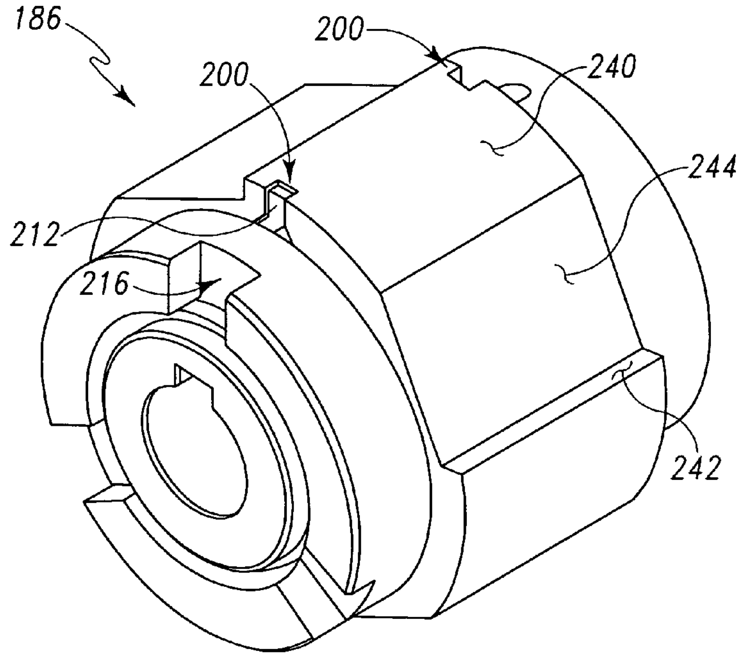
FIG. 19 is a perspective view of a wrap spring clutch mechanism.
Figure 20:
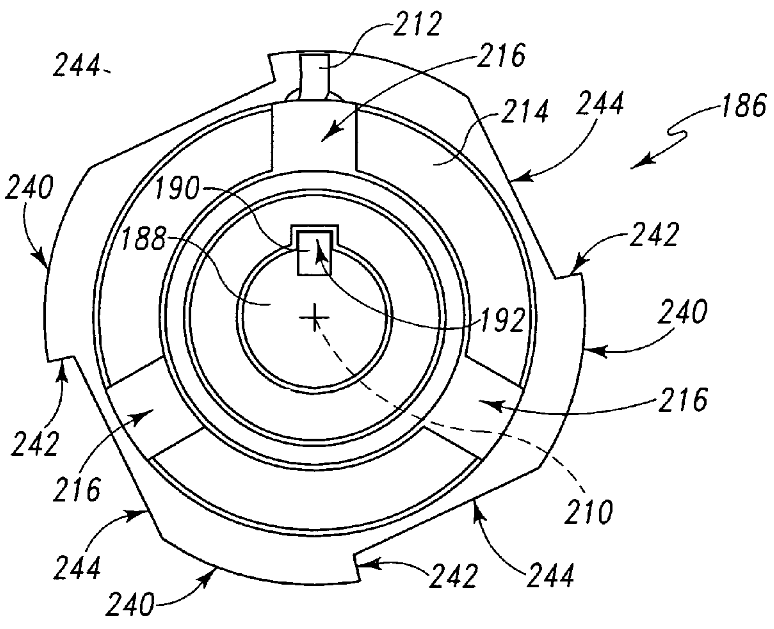
FIG. 20 is an end view of the wrap spring clutch of FIG. 19.

The retractor 30 is configured to be selectively actuable to retract the tether 26 and thereby provide the locomotion to reposition a patient 36. Referring now to FIG. 15, the retractor 30 includes a prime mover 180 which illustratively comprises an electric motor 182 and a gearbox 184 which receives output from the electric motor 182 and provides the appropriate speed to the spool core 178. Power from the prime mover 180 is output by an output shaft 188 to a clutch 186. The centerline of the output shaft 188 is a common axis of rotation 210 of the entire retractor 30 in the illustrative example. The output shaft 188 includes a keyway (not shown) on the outer diameter of the shaft which is configured to receive a key 190 as shown in FIG. 20. Referring to FIGS. 19 and 20, the clutch 186 has a complementary keyway 192 on the inside diameter of the clutch 186, wherein the keyway 192 is configured to receive the key 190. The keyed connection of the output shaft 188 to the clutch 186 transmits the rotational output from the prime mover 180 to the clutch 186.

The clutch 186 is configured to be selectively actuable to engage or disengage the prime mover 180 relative to the spool core 178. The clutch 186 is a wrap spring type clutch such as the Danaher Motion PSI 5 clutch Danaher part number 205-10-022. While the illustrative embodiment is a wrap spring clutch, it should be understood that a number of other clutches or motion control devices may be used to disengage output from the prime mover 180 to the remainder of the retractor 30.

When the prime mover 180 outputs torque in the direction represented by arrow 194, a wrap spring (not shown) internal to the clutch 186 locks an input portion of the clutch 186 to an output portion of the clutch 186. Torque is then transmitted through the clutch to a coupler 196. Upon completion of the repositioning cycle, the prime mover 180 output is reversed and torque is applied in the direction opposite 194. At the end of the reposition cycle, the tether 26 is under tension. By operating the prime mover 180 in the direction opposite 194, the tension on tether 26 is relieved. The clutch 186 further includes an outer housing 198 which has slots 200 on opposite ends and aligned with the keyway 192 when the clutch 186 along an axis perpendicular to the axis of rotation 210. The slots 200 are configured to receive tangs 212 of the wrap spring (not shown) internal to the clutch 186.

Figure 14:
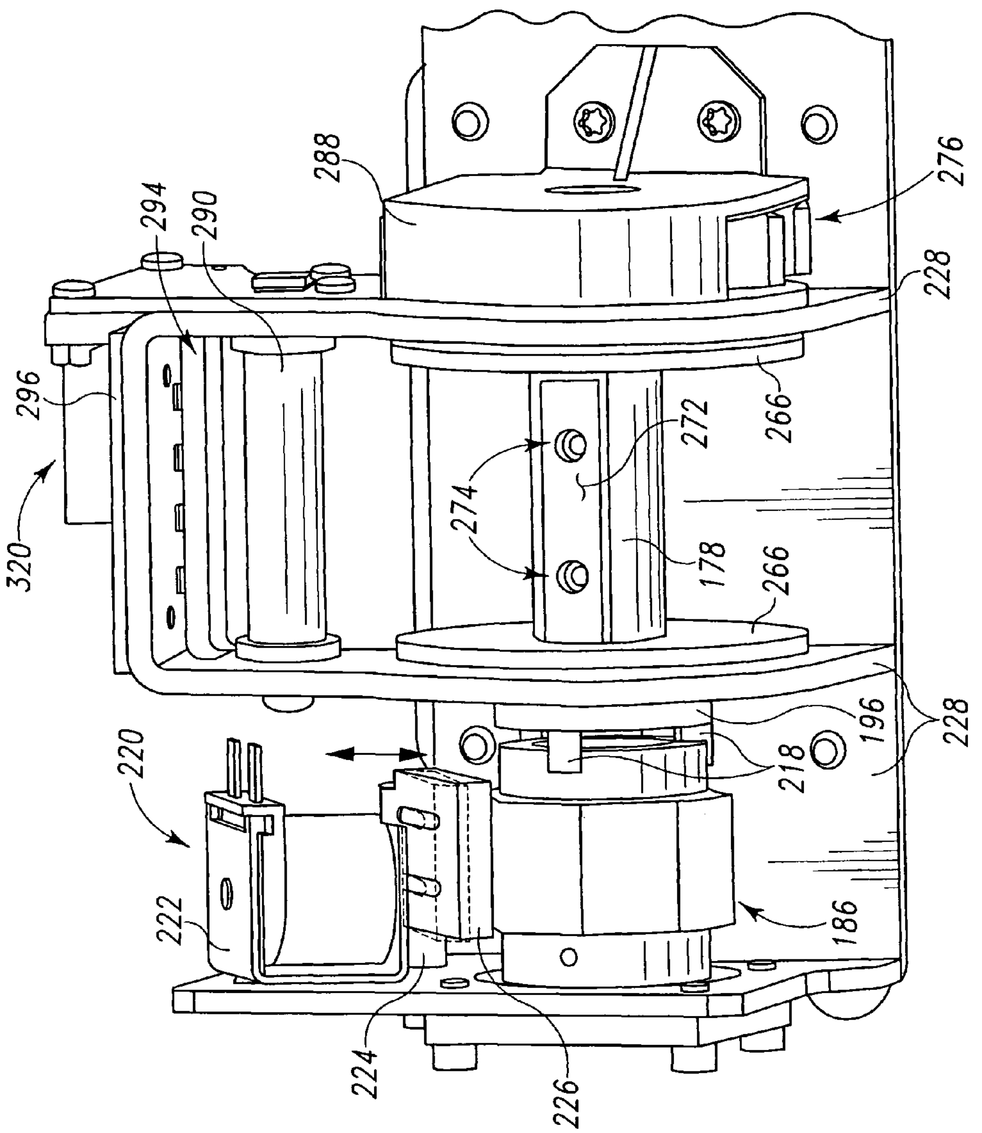
FIG. 14 is a fragmentary perspective view of a portion of a retractor of the pull-up-in-bed system of FIG. 1 with portions cut away.

The output from the clutch 186 is transmitted through a slotted output collar 214 (see FIGS. 19 and 20) of the clutch 186 to a three fingered coupler 196 shown in FIGS. 14 and 15. The output collar 214 has three slots 216 which are sized to mate with three fingers 218 of the coupler 196. Mating of the fingers 218 to the slots 216 is configured so that there is freedom between the members to reduce binding and substantially maintain transmission of the torque along the axis of rotation 210.

The clutch 186 is disengaged when torque from the prime mover 180 is not to be transferred to spool core 178. Clutch 186 is disengaged by the action of an engagement assembly 220 which includes a solenoid 222, a retractable plunger 224 coupled to the solenoid 222 at a first end and coupled to an engagement arm 226 at the second end. The engagement arm 226 is pivotably coupled to a base bracket 228 which supports the clutch 186 and various other components of the retractor 30. The engagement arm 226 is supported by a pivot pin 230 which is coupled to the base bracket 228. The pivot pin 230 has a shoulder 232 which locates the pivot pin 230 axially on the base bracket 228. The engagement arm 226 is separated from the shoulder 232 by a washer 234 and is retained on the pivot pin 230 by a snap-ring 236 which is configured to mate with a groove 238 on the pivot pin 230.

The engagement assembly 220 is configured to move the engagement arm 226 between a first position wherein the engagement arm 226 is engaged with the clutch 186, shown in solid in FIG. 14, and a second position wherein the engagement arm 226 is disengaged from the clutch 186, shown in phantom in FIG. 14. When the engagement arm 226 is in the first position, the engagement arm 226 engages the outer housing 198 of the clutch 186. The outer housing 198 has a symmetrical profile when viewed along the axis of rotation 210 as shown in FIG. 20. The profile of the outer housing includes three surface portions which repeat every ninety degrees about the axis of rotation 210 with an arced surface portion 240 centered on the axis of rotation 210 forming the first portion. The arced surface portion 240 abruptly transitions into an engagement surface portion 242 which is perpendicular to the axis of rotation 210 and situated so as to contact an end of the engagement arm 226 when the engagement arm is in the first position. The engagement surface portion 242 transitions into a substantially flat surface portion 244 which is oriented at a slightly obtuse angle relative to the engagement surface portion 242. The flat surface portion 244 intersects the next arced surface portion 240 and the pattern is repeated about the axis of rotation 210.

In operation, the clutch 186 is disengaged by engagement of the engagement arm 226 with the engagement surface 242 and slight rotation of the output shaft 188 in the direction of the torque 194. The relative motion of the output shaft 188 to the outer housing 198 of the clutch 186 urges the wrap spring (not shown) to expand and disengage permitting the output collar 214 to rotate freely relative to the output shaft 188 of the prime mover 180. Movement of the solenoid 232 to the second position results in disengagement of the engagement arm 226 from the outer housing 198 which thereby releases the wrap spring (not shown) allowing it to engage and couple the output shaft 188 to the output collar 214. The solenoid 232 is a DC coiled device which, when energized, magnetically urges the plunger 224 into the coil body. This movement is transmitted to the engagement arm 226 causing the engagement arm 226 to pivot about the pivot pin 230 to the second position wherein the engagement arm 226 is disengaged from the outer housing 198. Thus, engagement arm 226 is normally in the first position engaging the outer housing 198 of clutch 186. While the illustrative embodiment utilizes a solenoid, any of a number of actuation methods may be used which move an engagement member such as the engagement arm 226, for example, between an engaged position and a disengaged position. Control of the actuation of the solenoid 226 is provided by a controller 246 which is further discussed below.

Referring again to FIG. 15, when the clutch 186 is engaged (i.e., where the engagement arm 226 is in the second position), torque 194 is transmitted to the coupler 196 which thereby transmits torque 194 through a shaft 248. The shaft 248 is a double-d shaft having two flat sides and two rounded sides. At one end of the shaft 248 is a head 250 that is slightly larger than the outer dimensions of the shaft 248 along it's longitudinal length. At the end opposite the head 250, the shaft 248 has a spring engagement portion 252 which has a round cross section when viewed along the axis of rotation 210. The spring engagement portion 252 further includes a slot 254 across the diameter of the spring engagement portion 252, the slot 254 being configured to engage a tang (not shown) of a retracting spring 280. The coupler 196 has an aperture 256 which is sized to allow the shaft 248 to pass through the aperture 256 with the head 250 sized to engage the coupler 196 to retain the coupler 196 on the shaft 248. The aperture 256 is shaped to mate with the double-d shape of the shaft 248 so that torque 194 can be transmitted through the coupler 196 to the shaft 248. The remaining mechanical structure of the retractor 30 is configured to support the shaft 248, spool core 178, and tether 26 so that the torque 194 can be utilized to retract the tether 26.

In addition to passing through the coupler 196, the shaft 248 passes through a washer 258, a bushing 260, and a first flange 262 of the base bracket 228. The washer 258 is configured to prevent wear between the coupling 196 and the first flange 262 of the base bracket 228. The bushing 260 is a flanged bushing which is configured to mate with an aperture 264 in first flange 262. The bushing 260 is inserted into the aperture 264 such that the flange portion of the bushing 260 is on the side of the flange 262 of base bracket 228 opposite the washer 258. The inside diameter of the bushing 260 is sized to support the shaft 248 as a bearing surface thereby permitting the round sides of the shaft 248 to be supported by the busing 260 while the shaft 248 rotates. The shaft 248 also passes through a spool flange 266, the spool core 178, and a second spool flange 266.

Continuing to refer to FIG. 15, the spool flanges 266 and spool core 178 operate to form a spool which guides the tether 26 during retraction. The torque 194 and accompanying rotational motion is transferred to the spool flanges 266 and spool core 178 in a manner similar to the transfer of torque 194 from the coupling 196 to shaft 248. Namely, the spool flanges 266 each have an aperture 268 which is sized such that the shaft 248 passes through the spool flange 266, but is shaped such that the flat sides of the shaft 248 engage corresponding flat sides of the apertures 268 so that rotational motion of the shaft 248 is transmitted to the spool flanges 266. Likewise, spool core 178 has a double-d shaped aperture 270 which extends along the longitudinal axis of the spool core 178 and is sized to receive the shaft 248 which passes through the spool core 178. The rotational motion of the shaft 248 and associated torque 194 is transferred to the spool core 178. The spool flanges 266 and spool core 178 are supported on the shaft 248. The shaft 248 extends through a second flange 282 of base bracket 228 and another bushing 260. The flange portion of both of the bushings 260 are on the spool flange 266 of their respective flanges 262, 282 of base bracket 228. This prevents the spool flanges 266 from contacting the bracket flanges 262, 282 thereby reducing the potential for friction therebetween. The spring engagement portion 252 of the shaft 248 extends beyond the second flange 282 to engage the retraction spring assembly 276.

The retraction spring assembly 276 is a flat coiled steel spring 280 which is retained by a retainer 284 having multiple flanges 286 which hold the spring 280. The spring engagement portion 252 is received in the aperture 278 and the slot 254 in the spring engagement portion 252 engages a tang (not shown) which is formed at the inner coil of the spring 280 and is configured to engage the slot 254. The retraction spring assembly 276 is held fixed by a bracket 288 which is coupled to base bracket 228. When the shaft 248 rotates in the direction opposite torque 194 slot 254 and the tang on spring 280 also rotates. Because the spring 280 is retained, potential energy is developed in the spring 280. This potential energy urges the spring 280 and thereby, the shaft 248 and spool core 178, to maintain tautness in the tether 26.

In use, when the prime mover 180 is disengaged from the spool core 178, the retraction spring assembly 276 maintains some tension in the tether 26, but allows the tether 26 to be extended from the retractor 30 by a user. In addition, when the retractor 30 and headboard 22 are mounted on different frames of the patient support apparatus 10 that move relative to one another, the operation of the retraction spring assembly 276 permits the tether 26 to extend during relative movement of the frames away from one another without damaging the retractor 30. The constant bias of the retraction spring assembly 276 results in the tether 26 being retracted when the frames move toward one another.

The spool core 178 further includes two threaded holes 274 as shown in FIGS. 14 and 15. The threaded holes 274 are configured to receive fasteners (not shown) which are used to fasten the tether 26 to the spool core 178. Rotation of the prime mover 180 in the direction of torque 194 wraps the tether 26 about the spool core 178 and thereby provides locomotion to reposition a patient. Extension of the tether 26 is opposed by the spring 280 as described above. Therefore, slack in the tether 26 is taken up by the operation of the retraction spring assembly 276 to reduce the potential for a loop to be developed in the tether 26 when the tether 26 is in the stowed position.

Further control of the operation of the tether 26 is provided by a guide roller 290 which is rotatably coupled to the base bracket 228. The guide roller 290 provides a substantially constant exit angle of the tether 26 from the base bracket 228 regardless of how much or how little of tether 26 is wound upon spool core 178 by sandwiching the tether between the spool core 178 and a clamping plate (not shown). The tether 26 passes through an aperture 292 in base bracket 228 and another aperture 294 in a plate 296 which is coupled to the base bracket 228 by several fasteners 298. The plate 296 serves as a mechanical stop for the tether 26 so that the tether 26 is not retracted excessively. The plate 296 aperture 294 is sized to prevent a stop 300 coupled to the tether 26 from passing through the aperture 294. This limits the retraction of the sheet attachment device 24 so that a patient is not retracted such that they contact the headboard 22.

The size of the aperture 294 is such that as the tether 26 is unwound from the spool core 178, the angle of interaction between the tether 26 and the aperture 294 changes and increases the frictional forces on the tether 26, thereby reducing the amount of force transmitted through the tether 26 to reposition the patient. The addition of the guide roller 290 provides a constant exit angle for the tether 26 through the aperture 294. The guide roller 290 is supported by a shaft 310 having a head 318 at one end and a retaining ring groove 316 proximate the end opposite the head 318. The shaft 310 is ad-shaped shaft which engages an aperture 312 in the second flange 282, passes through the guide roller 290, and another aperture 312 in the first flange 262. The apertures 312 are also d-shaped such that the shaft 310 is restrained from rotation relative to the flanges 262, 282. The guide roller 290 has a circular hollow core along it's longitudinal axis which and is free to rotate about it's longitudinal axis. The guide roller 290 further includes a flange 320 proximate each end of the guide roller 290. The flanges 320 assist in retaining the guide roller 290 between the flanges 262, 282. The shaft 310 is retained relative to the first flange 262 by a retaining ring 314 which is configured to engage the groove 316 on the shaft 310 and prevent longitudinal movement of the shaft 310 relative to the base bracket 228.

While the stop 300 provides a mechanical safety to prevent excessive retraction of the tether 26, further control of the retraction is achieved by an optical sensor 320 and/or a potentiometer 322. The optical sensor 320 is coupled to a bracket 326 by several fasteners 324 and the bracket 326 is coupled to the base bracket 228 by several more of the fasteners 324. The optical sensor 320 is U-shaped with one leg of the u-shape including an optical emitter. The opposite leg of the u-shape includes an optical detector. The optical sensor 320 is configured such that the tether 26 passes between the legs of the optical sensor 320 as the tether 26 retracts. When the tether 26 is in a fully retracted position, an aperture 328 is positioned such that the optical detector is in communication with the optical emitter. The optical sensor 320 is electrically coupled to the controller 246, which is discussed in further detail below, and is configured to provide a signal to the controller 246 when the tether 26 is in the fully retracted position.

The potentiometer 322 is coupled to a bracket 330 which is coupled to the base bracket 228. The input shaft 332 of the potentiometer is coupled to the shaft 248 so that the potentiometer 322 input shaft 332 rotates in unison with the shaft 248. The potentiometer 322 is electrically coupled to the controller 246 and is configured to provide a signal to the controller 246 indicative of the position of the potentiometer 322 which directly correlates to the amount of extension or retraction of the tether 26. The controller 246 is configured to process the signal from the potentiometer 322 and/or the optical sensor 320 to determine the state of the retractor 30 and provide control signals to the prime mover 180 based on the signals from the potentiometer 322 and/or the optical sensor 320.

Figure 34:
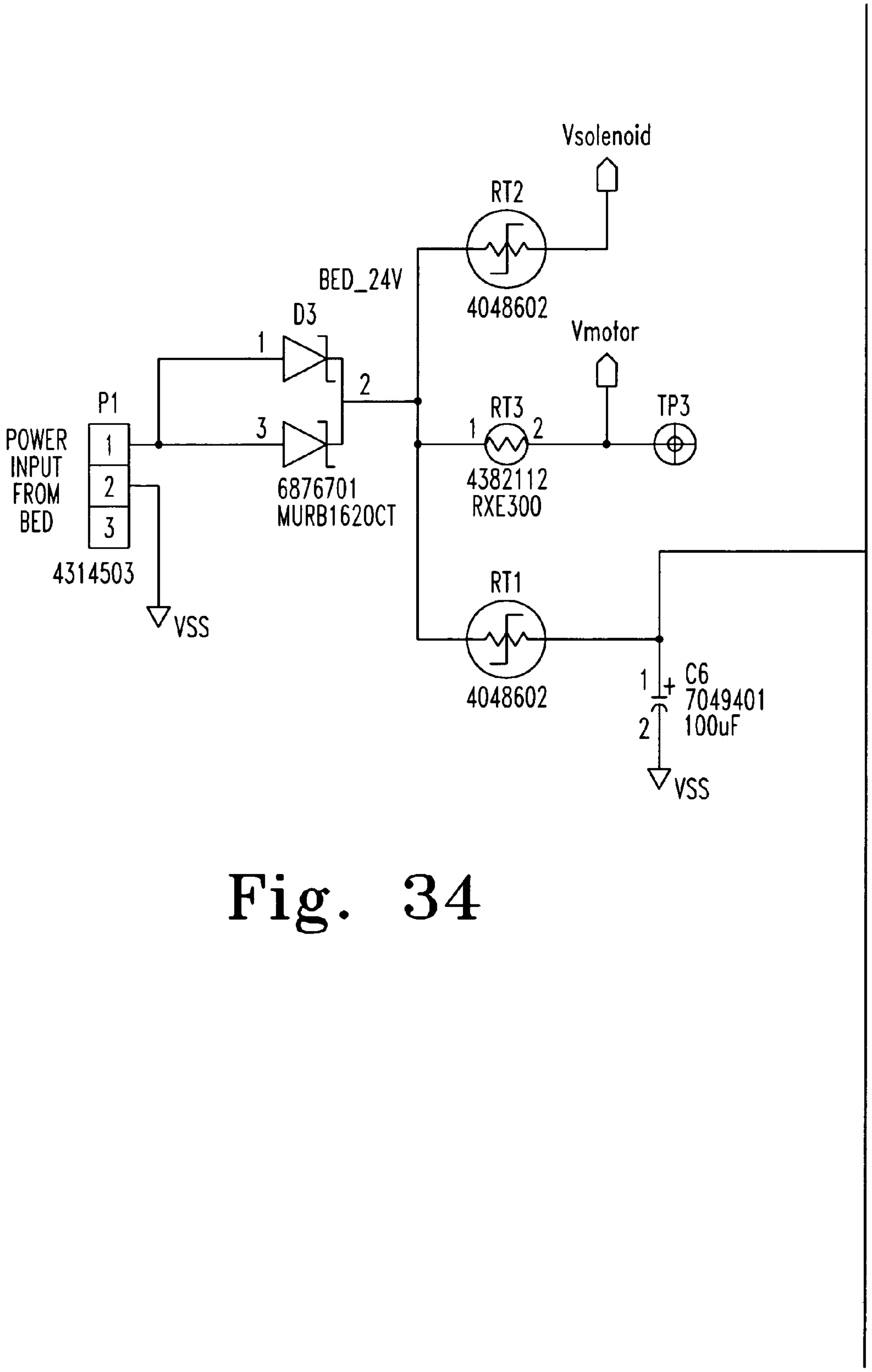
Figure 35:
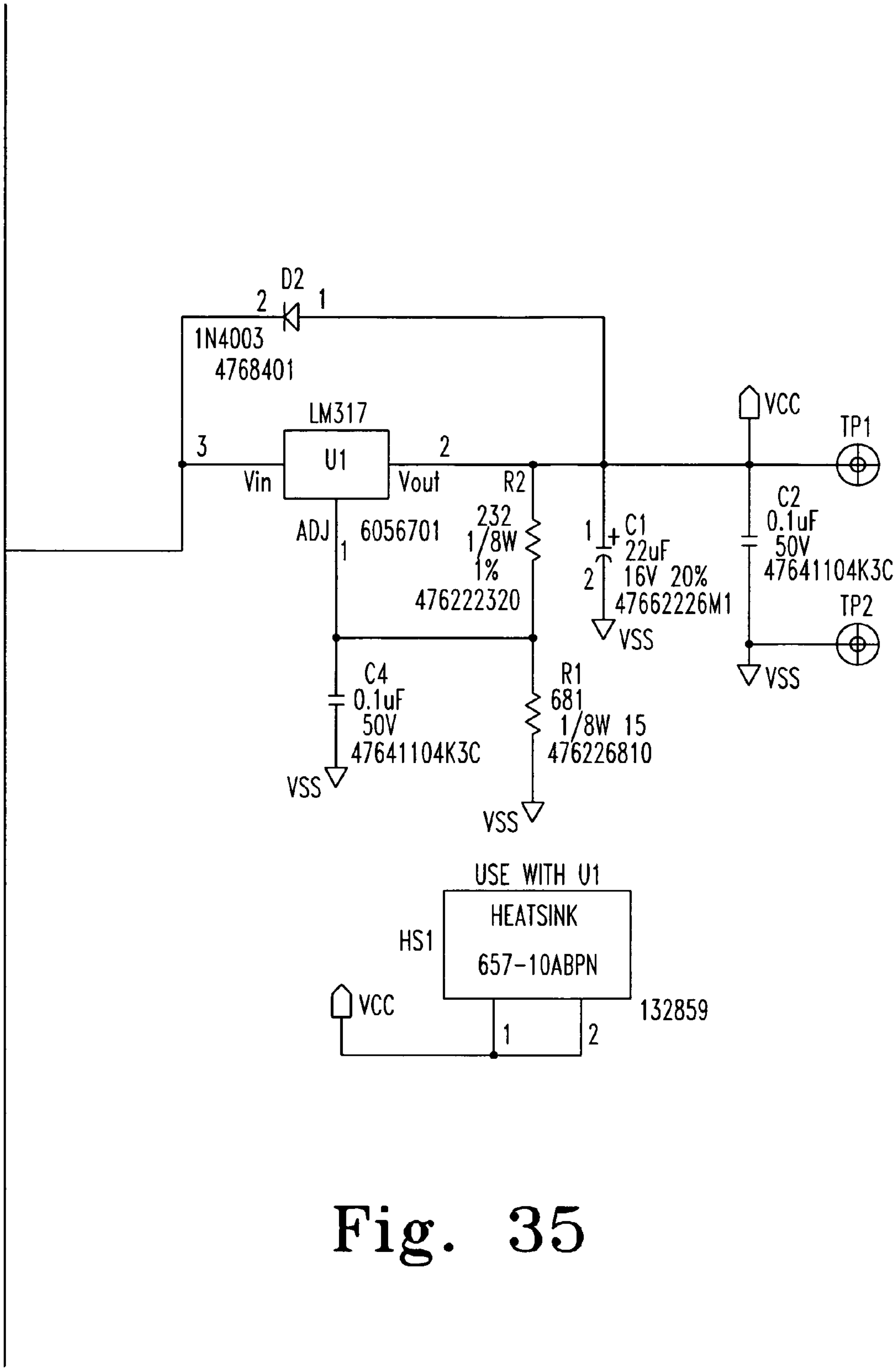
Figure 36:
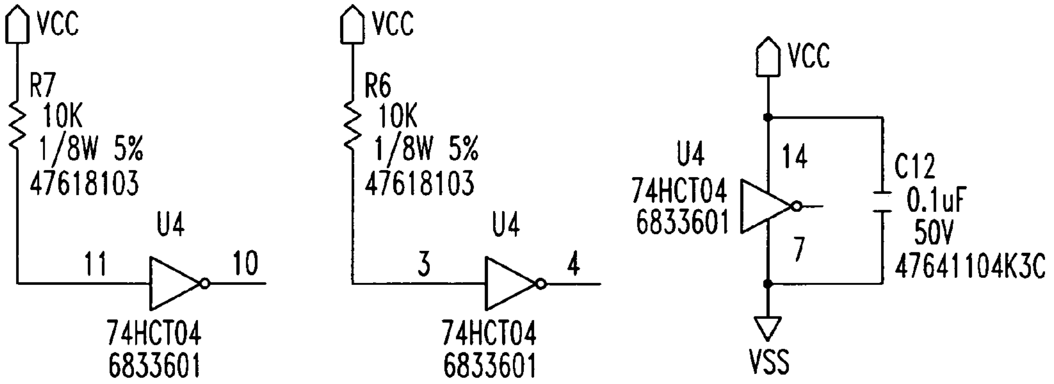

The controller 246 is included as part of an exemplary control board assembly 332 which is coupled to a circuit board bracket 334 which is coupled to the base bracket 228 as shown in FIG. 15. Illustrative circuitry of the control board assembly 332 is shown in FIGS. 21-39. The controller 246 is connected to various components of the pull-up-in-bed system 28 as shown diagrammatically in FIG. 12. The controller 246 is electrically coupled to a power supply 336. The controller 246 receives unregulated power from the power supply 336 and processes the unregulated power to the appropriate power levels. In the illustrative embodiment, it is contemplated that the power supply 336 may be common to the patient support apparatus 10 on which the pull-up-in-bed system 28 is located. In other embodiments, the power supply 336 may be independent from the patient support apparatus 10 and pull-up-in-bed system 28. In still other embodiments, the power supply 336 may be integral to the pull-up-in-bed system 28. Illustrative circuitry of the control board assembly 332 associated with processing of power from the power supply 336 is shown in FIGS. 34-35 with the connection between the power supply 336 and the control board assembly 332 interfacing at a connector P1.

Additional hardware associated with the operation of the pull-up-in-bed system 28 includes the optical detector, 320, a receiver assembly 338, lock-out switch 340, audible alarm 342, and status indication 344 which are each electrically coupled to the controller 246 and configured to provide the controller 246 input signals. The controller 246 is configured to process these signals and determine the appropriate outputs to provide operation of the pull-up-in-bed system 28.

Figure 37:
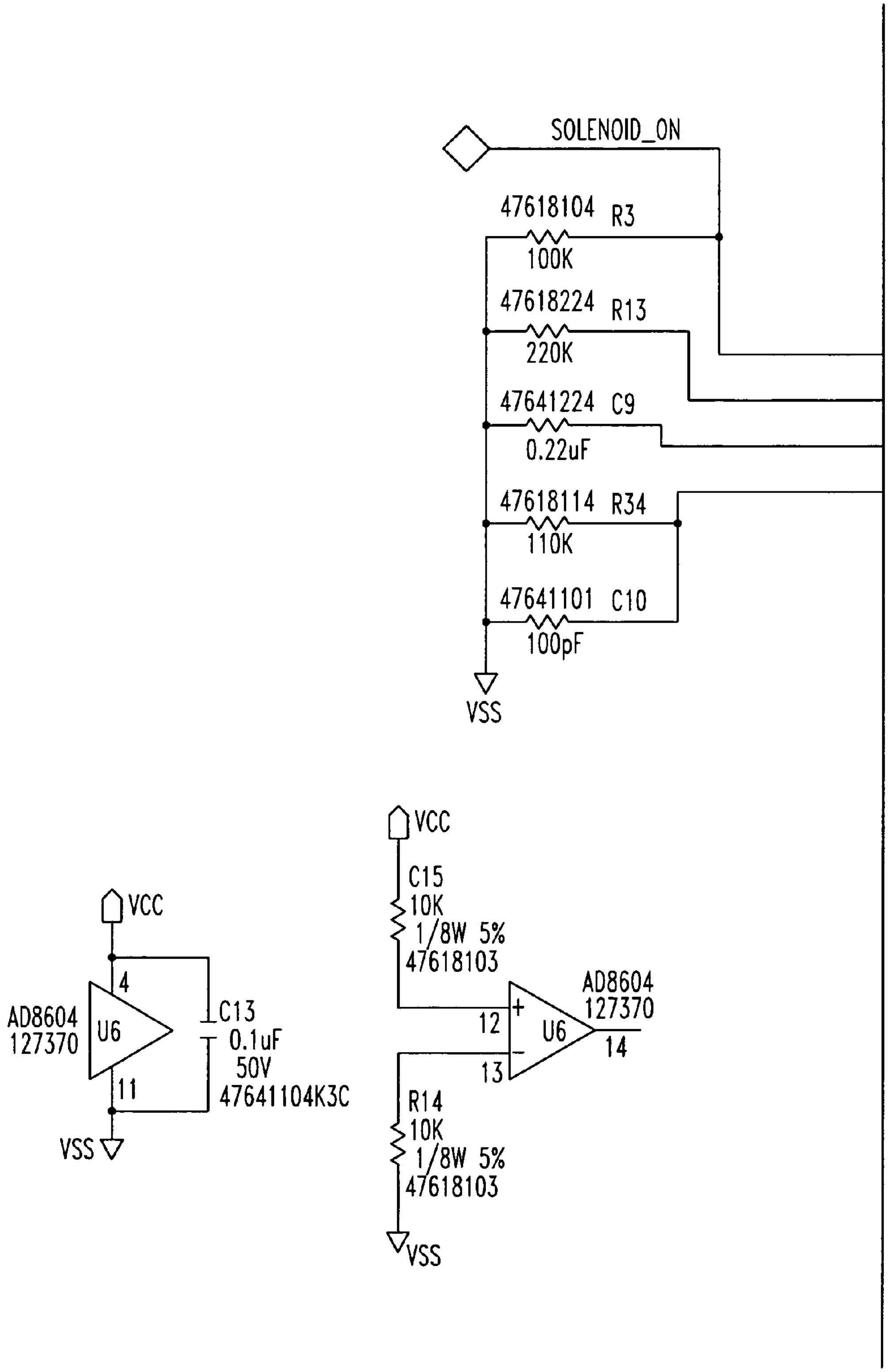
Figure 38:
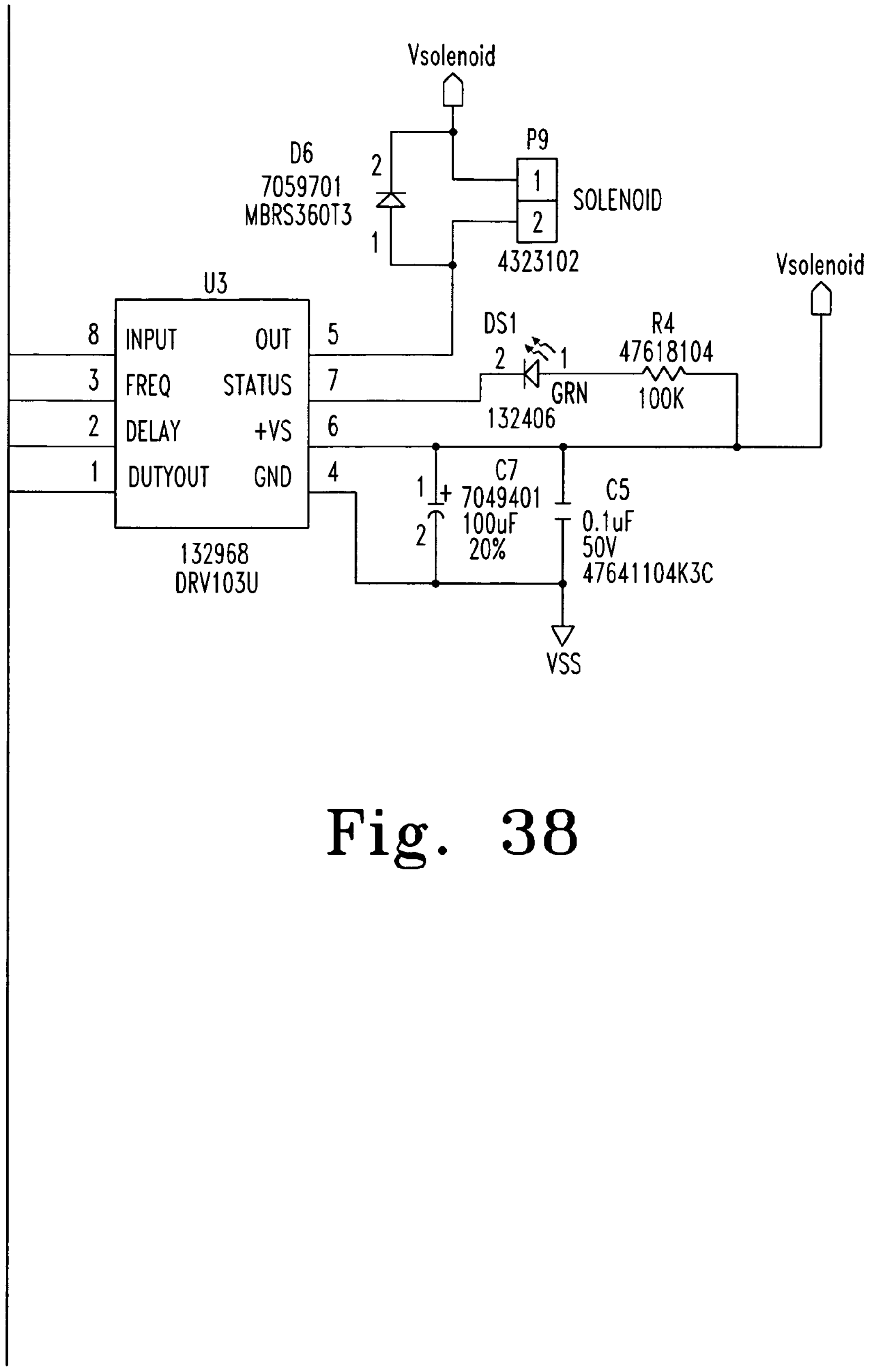

Illustrative circuitry of the control board assembly 332 associated with the driving of solenoid 222 is shown in FIGS. 37 and 38 with a connector P9 serving as the interface between the solenoid 222 and the control board assembly 332.

Figure 33:
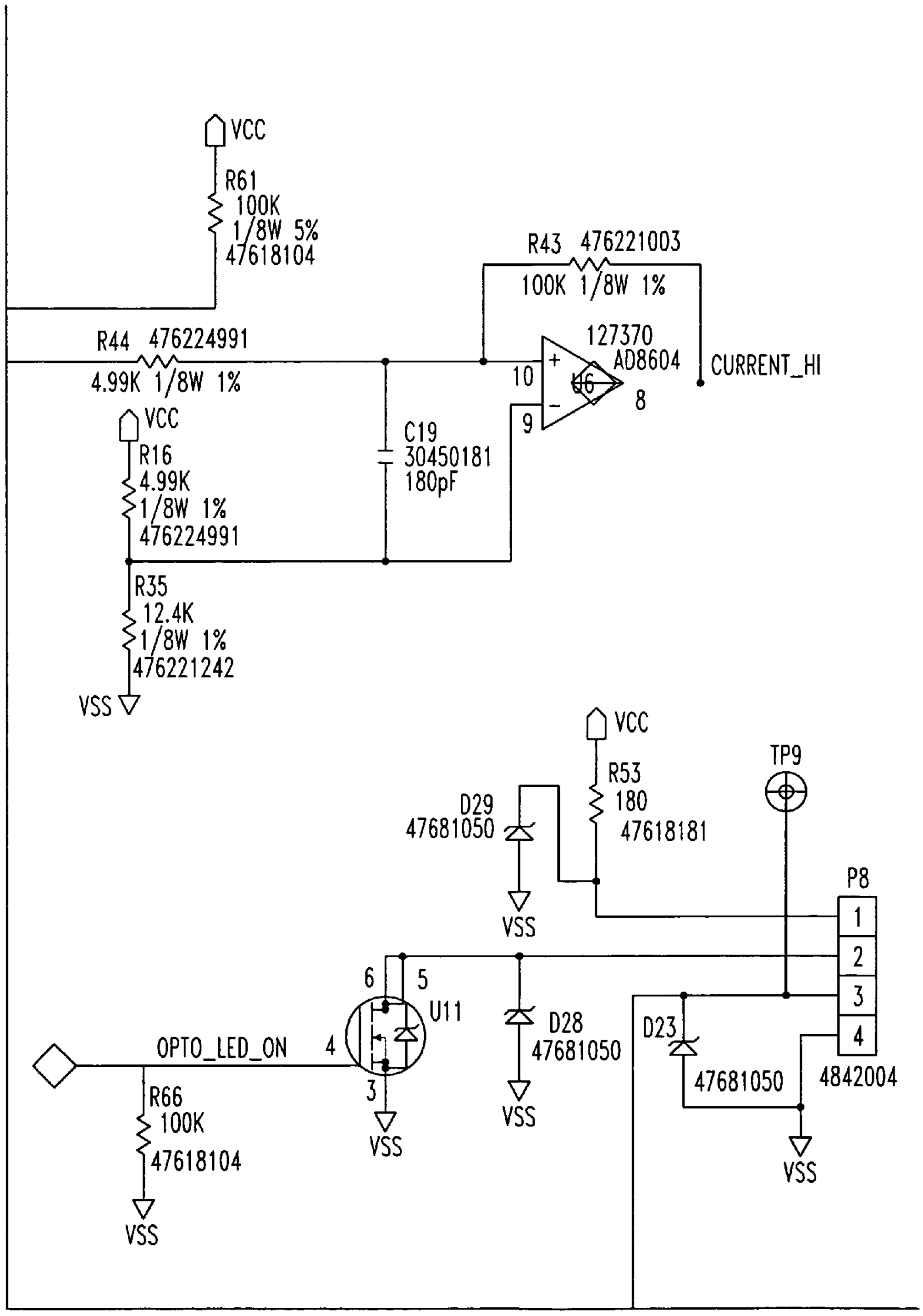
Figure 39:
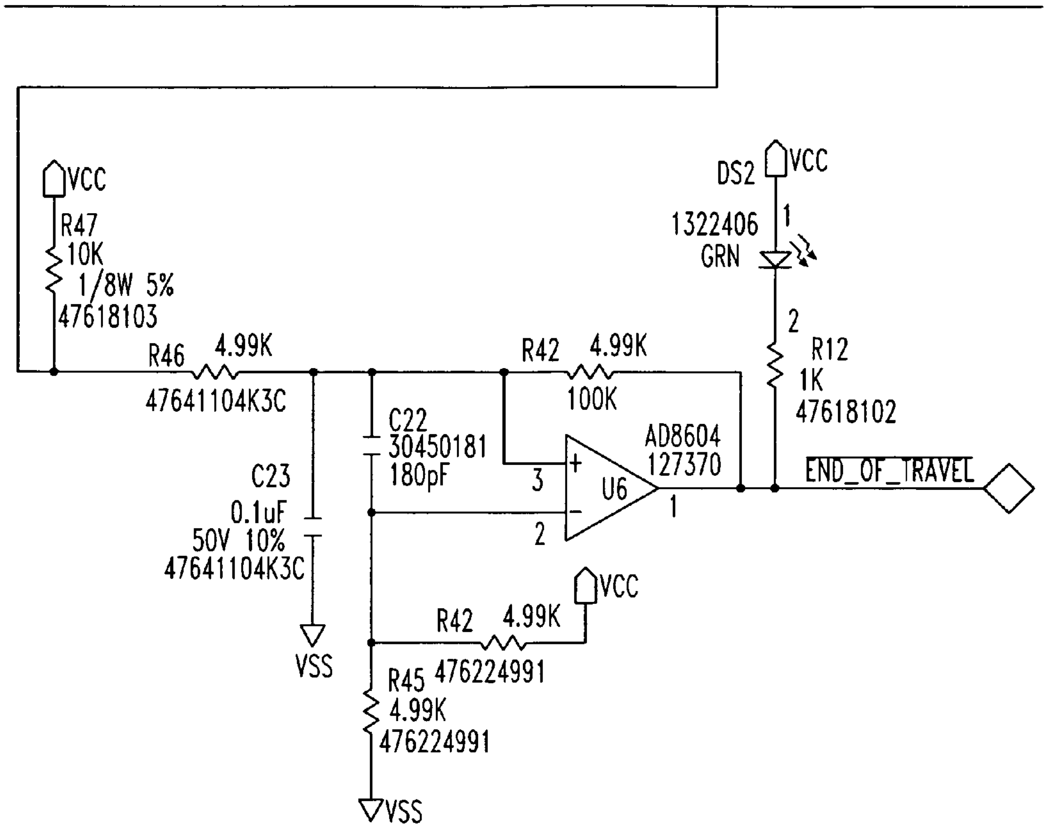

Exemplary circuitry of the control board assembly 332 for processing signals from the optical detector 320 is shown in FIGS. 33 and 39 with the connection between the optical detector 320 and the control board assembly occurring through a connector P8.

Figure 27:
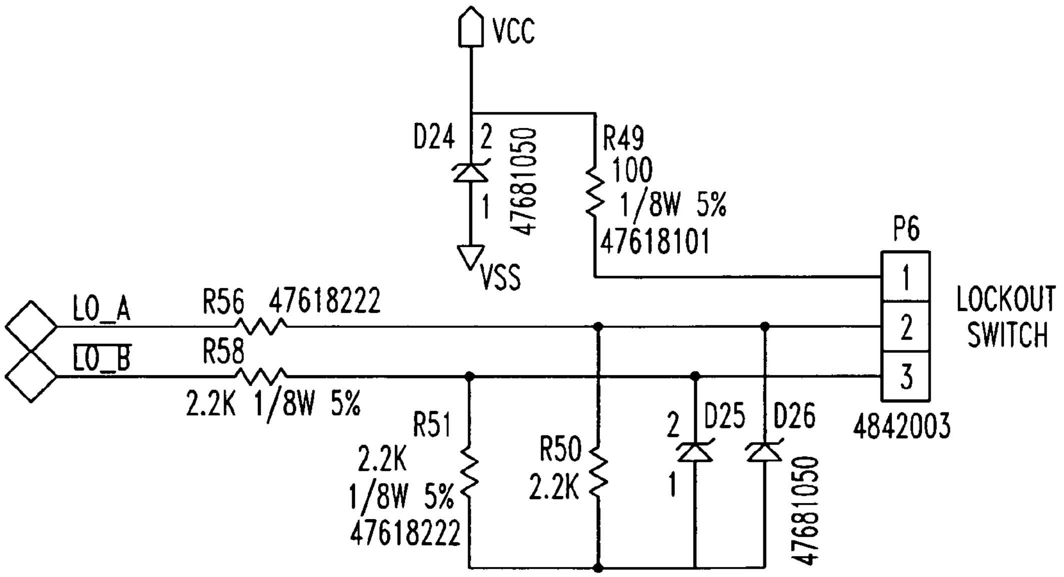

Illustrative circuitry of the control board assembly 332 that may be used to receive the signal from the lock-out switch 340 is shown in FIG. 27. The lock-out switch 340 may be any of a number of two-position electrical switches connected to the control board assembly 332 through a connector P6

Figure 28:
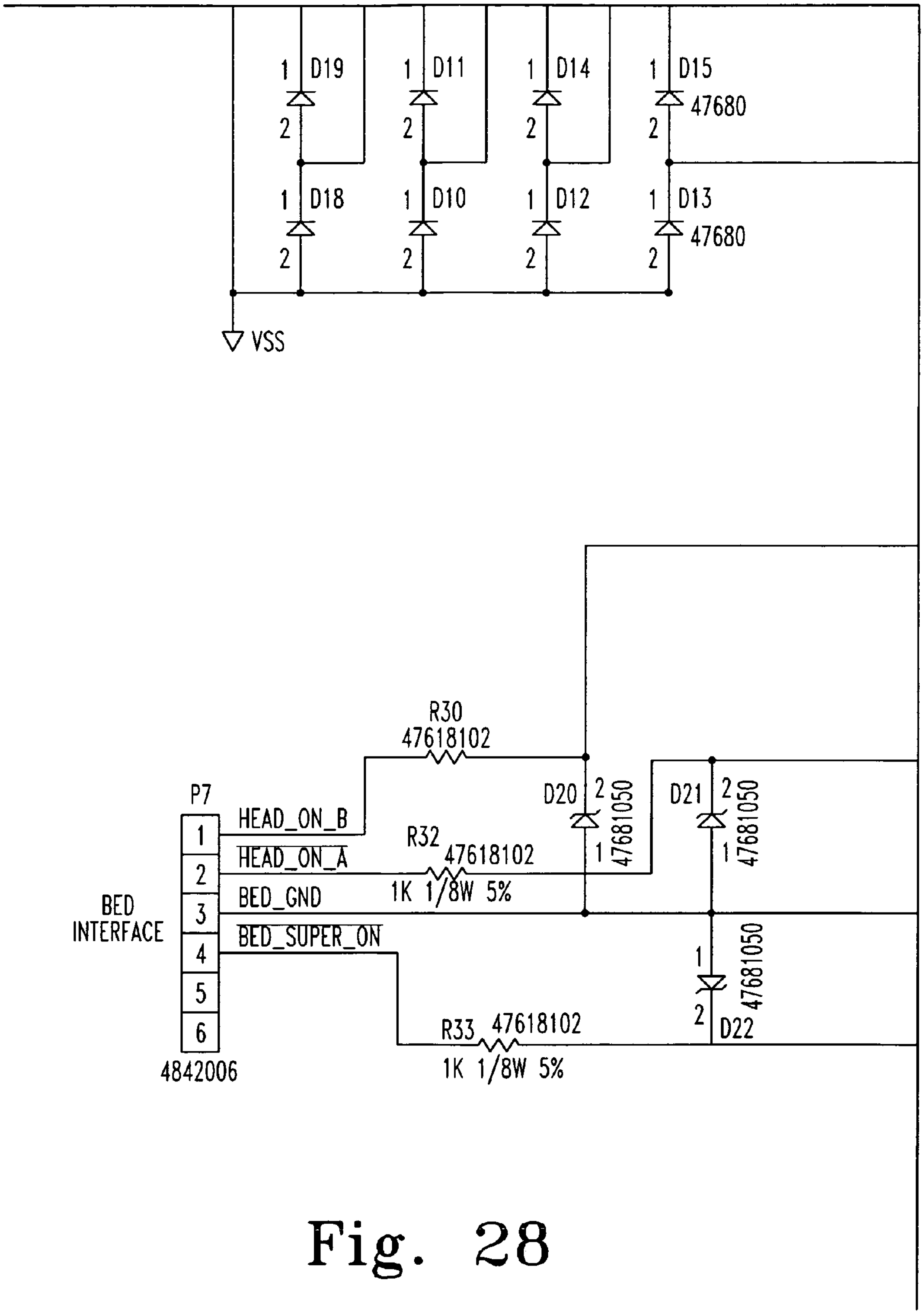
Figure 29:
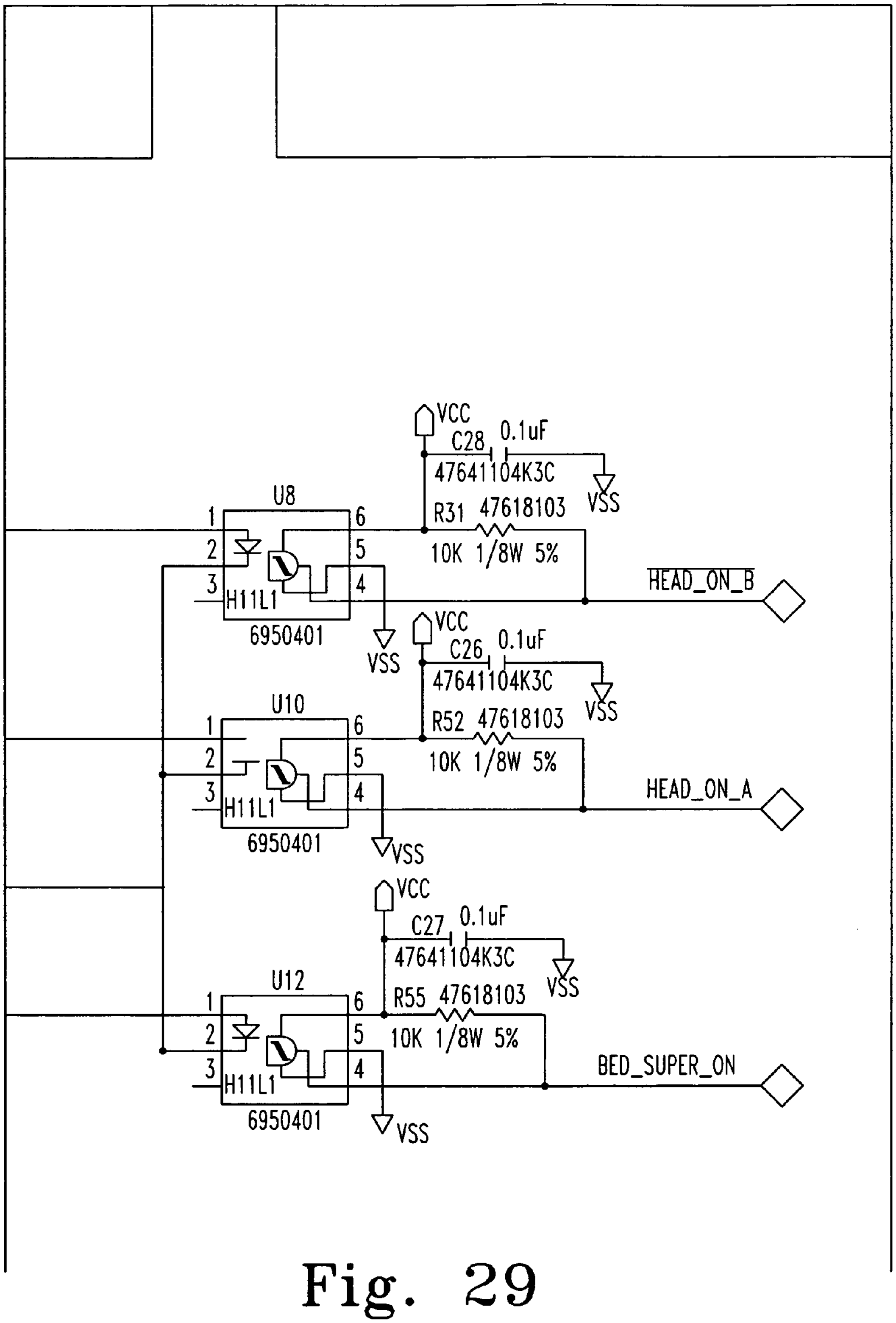
Figure 30:
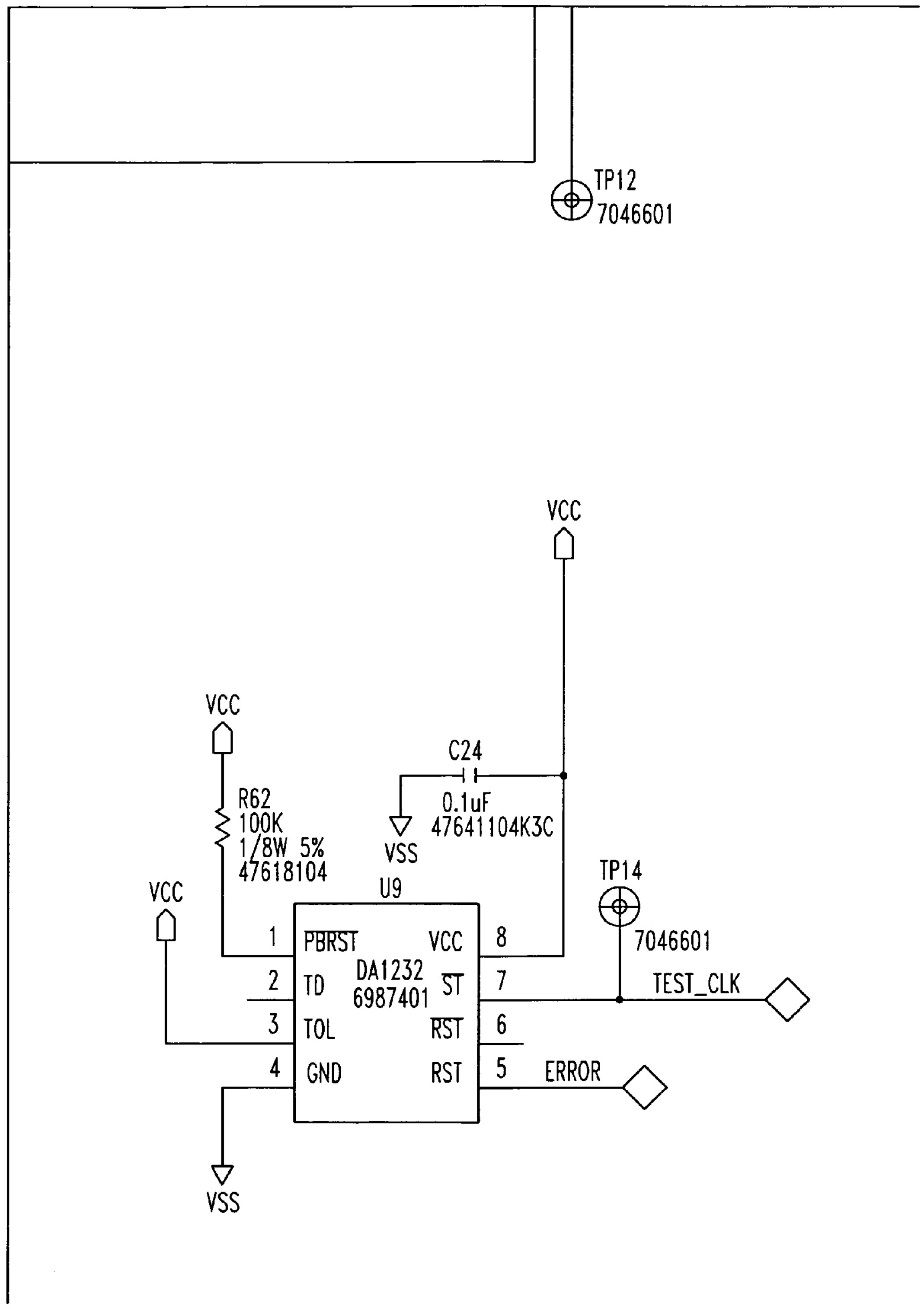

A connector P7, shown in FIG. 28, provides the interface between the bed status indictors 334 and the control board assembly 332. Exemplary circuitry of the control board assembly 332 associated with processing the signal from the bed status indicators 334 is shown in FIGS. 28 and 29.

Figure 26:
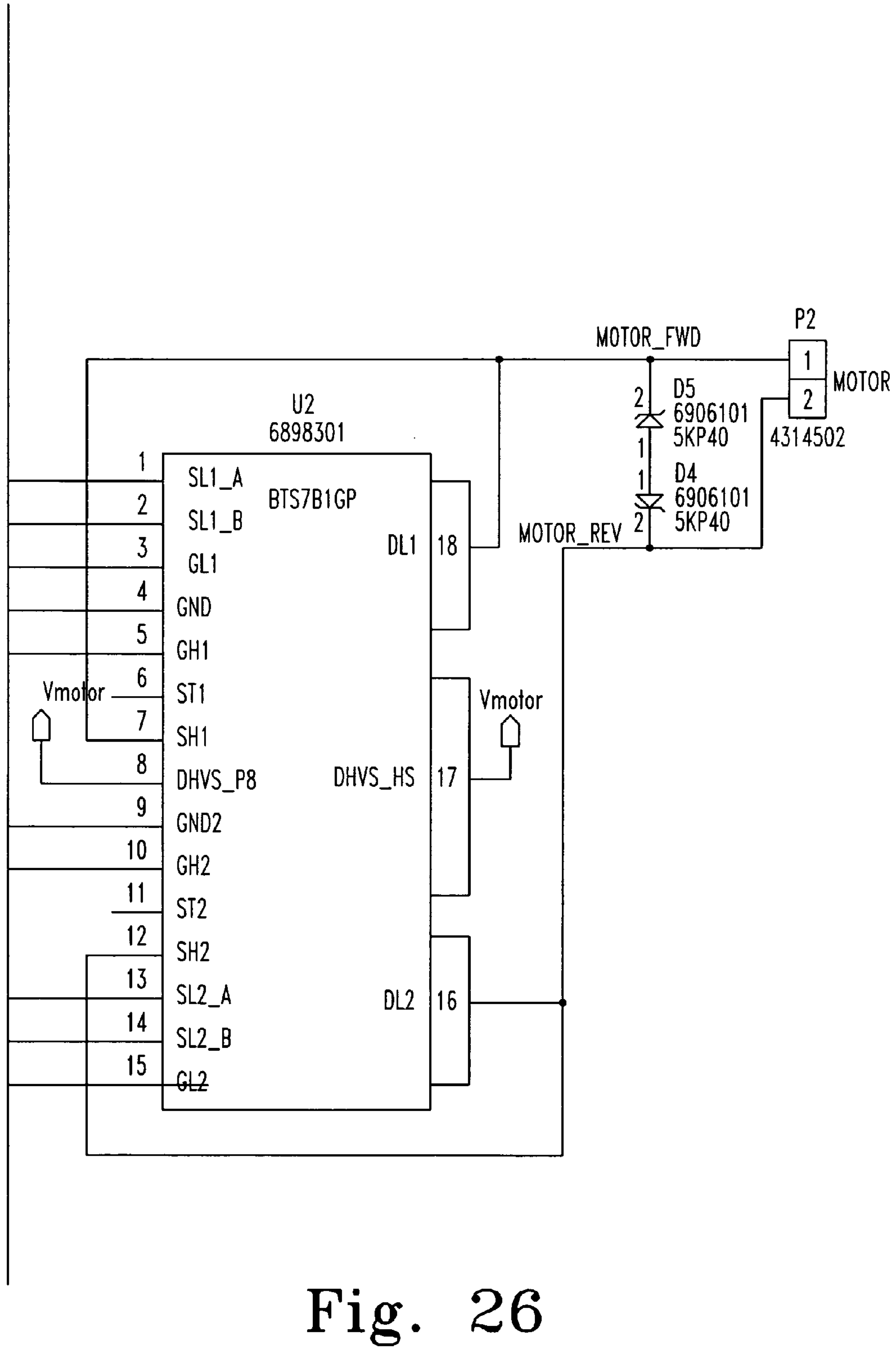
Figure 31:
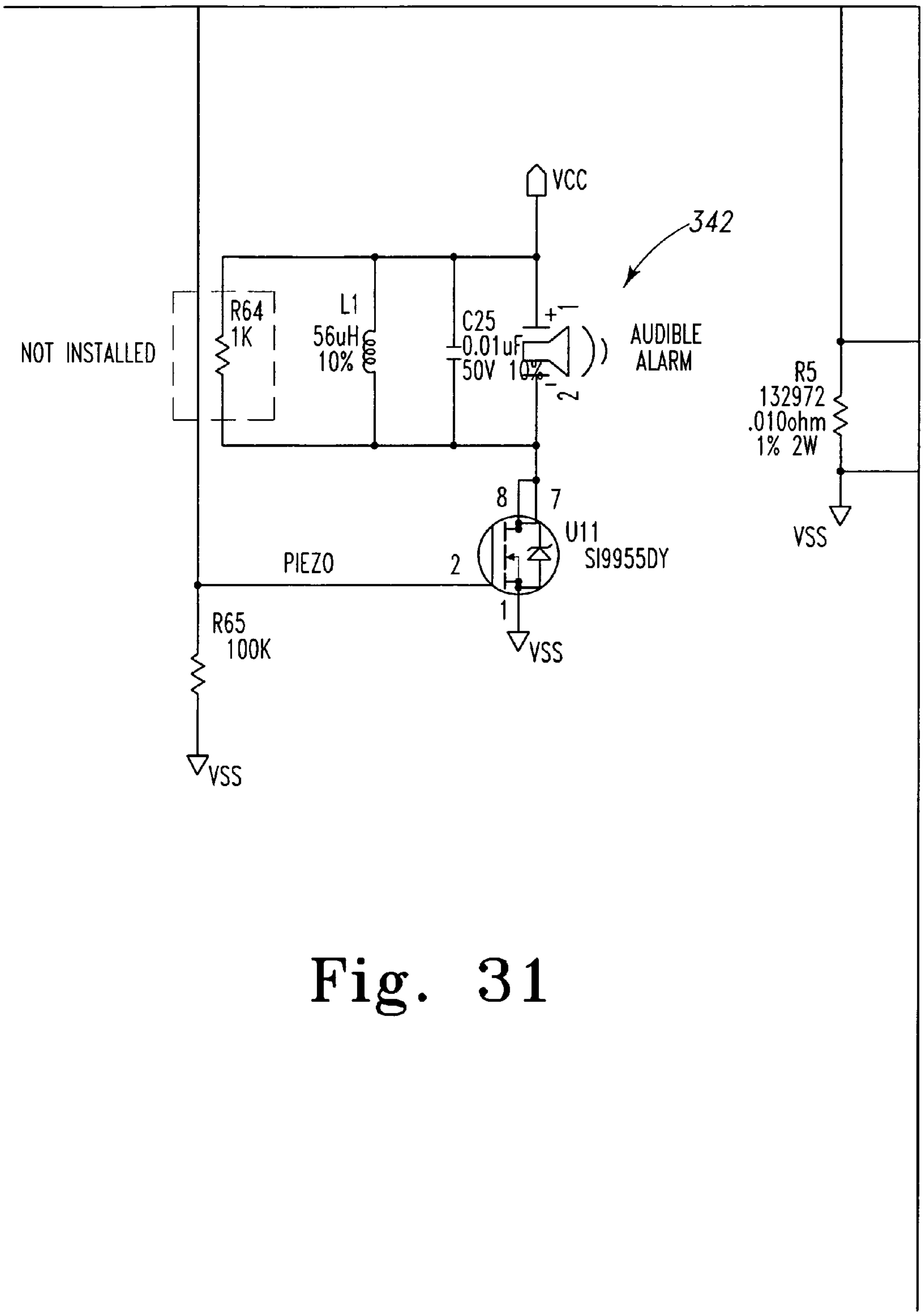
Figure 32:
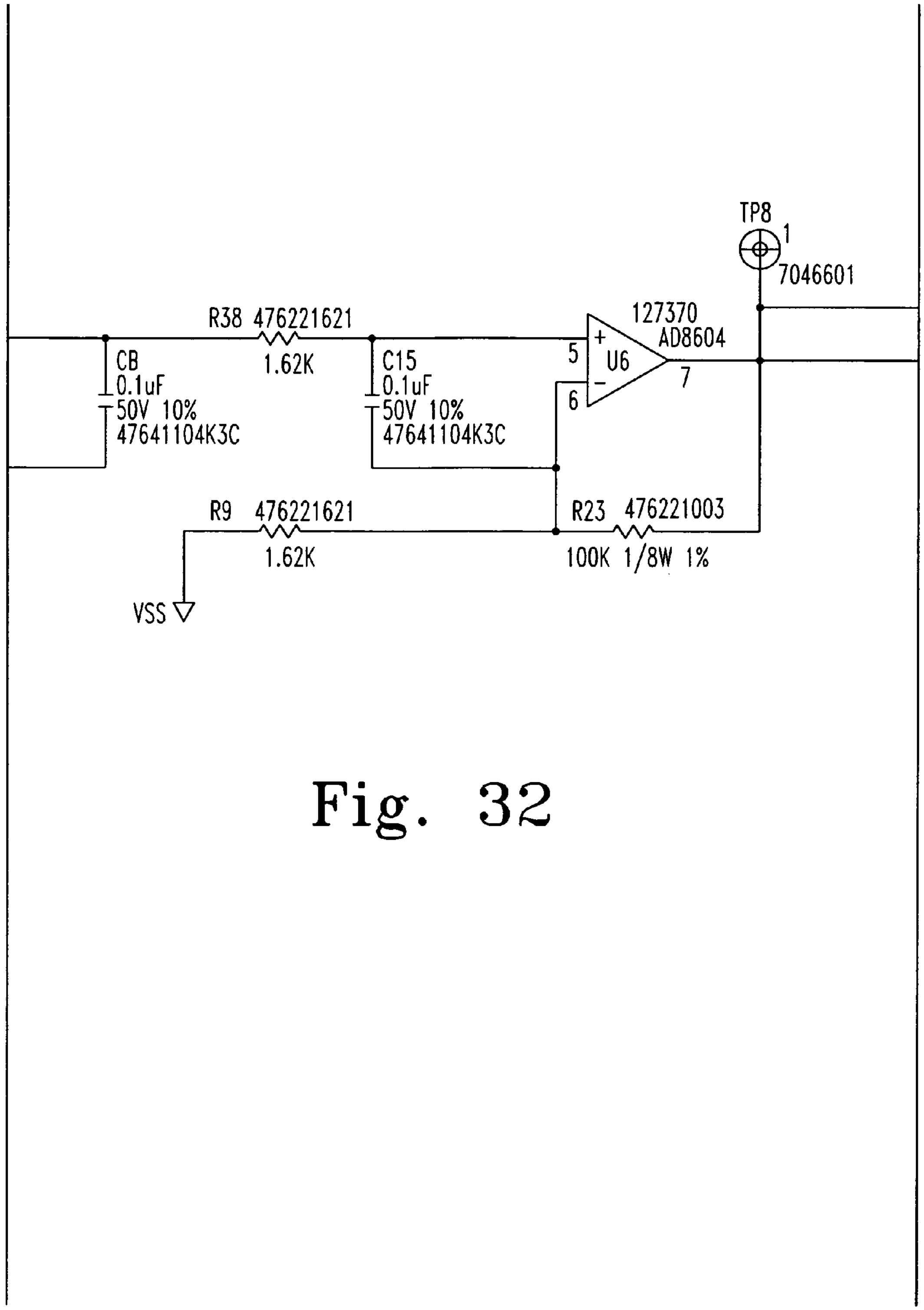

FIG. 31 shows exemplary circuitry associated with the operation of the audible alarm 342. FIG. 26 shows the exemplary circuitry associated with the driving of the motor 182, with the connection between the control board assembly 332 and the motor 182 provided by a connector P2. In some embodiments, the control board assembly 332 may include circuitry configured to monitor the current flow to the motor 182 and to stop operation of the motor 182 if the current exceeds a predetermined level. This may be triggered if the stop 300 is reached or if some binding occurs in the operation of the tether 26 thereby creating an amount of force in the tether 26 which is translated into excessive current draw to the motor 182.

Figure 22:
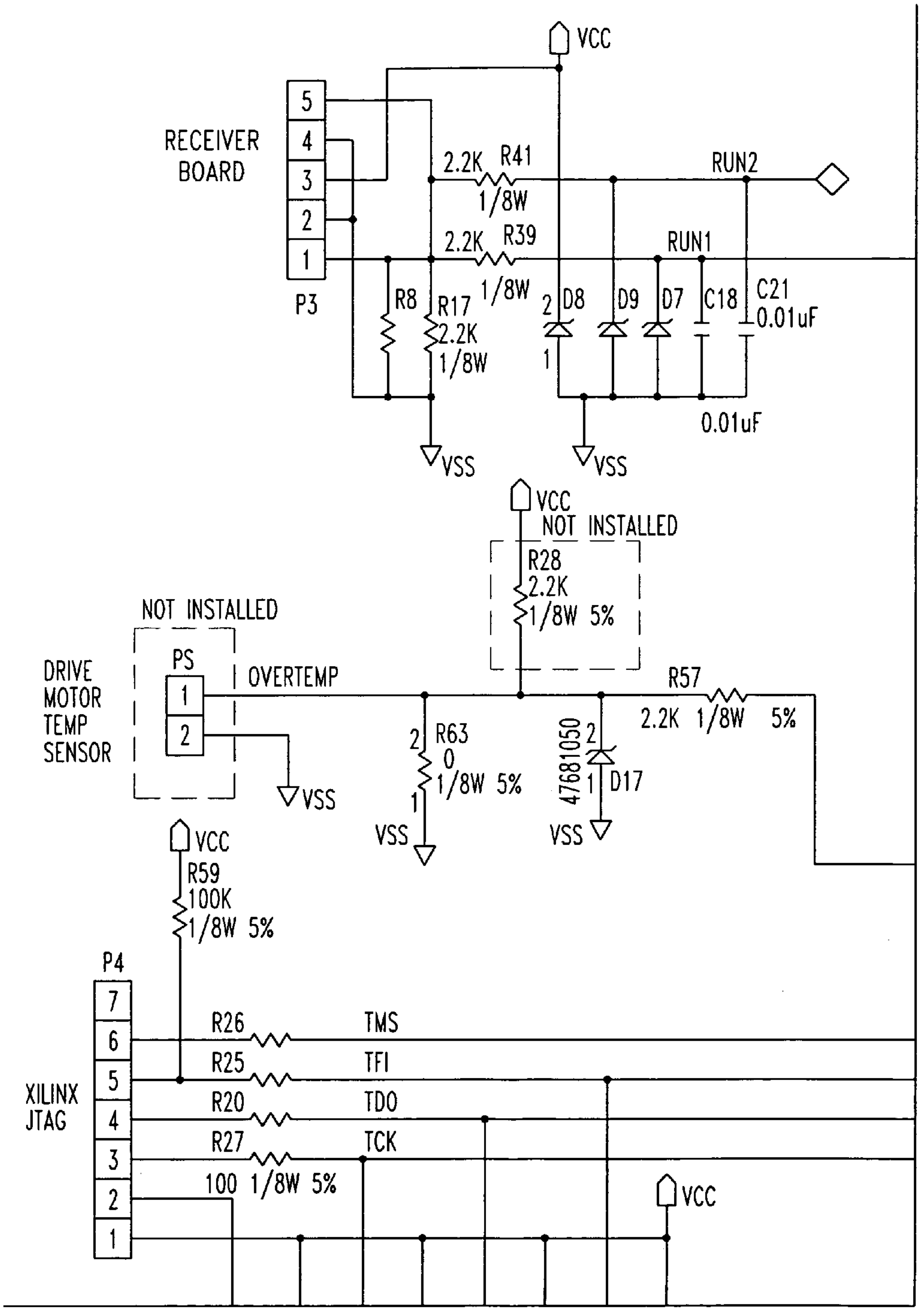
Figure 23:
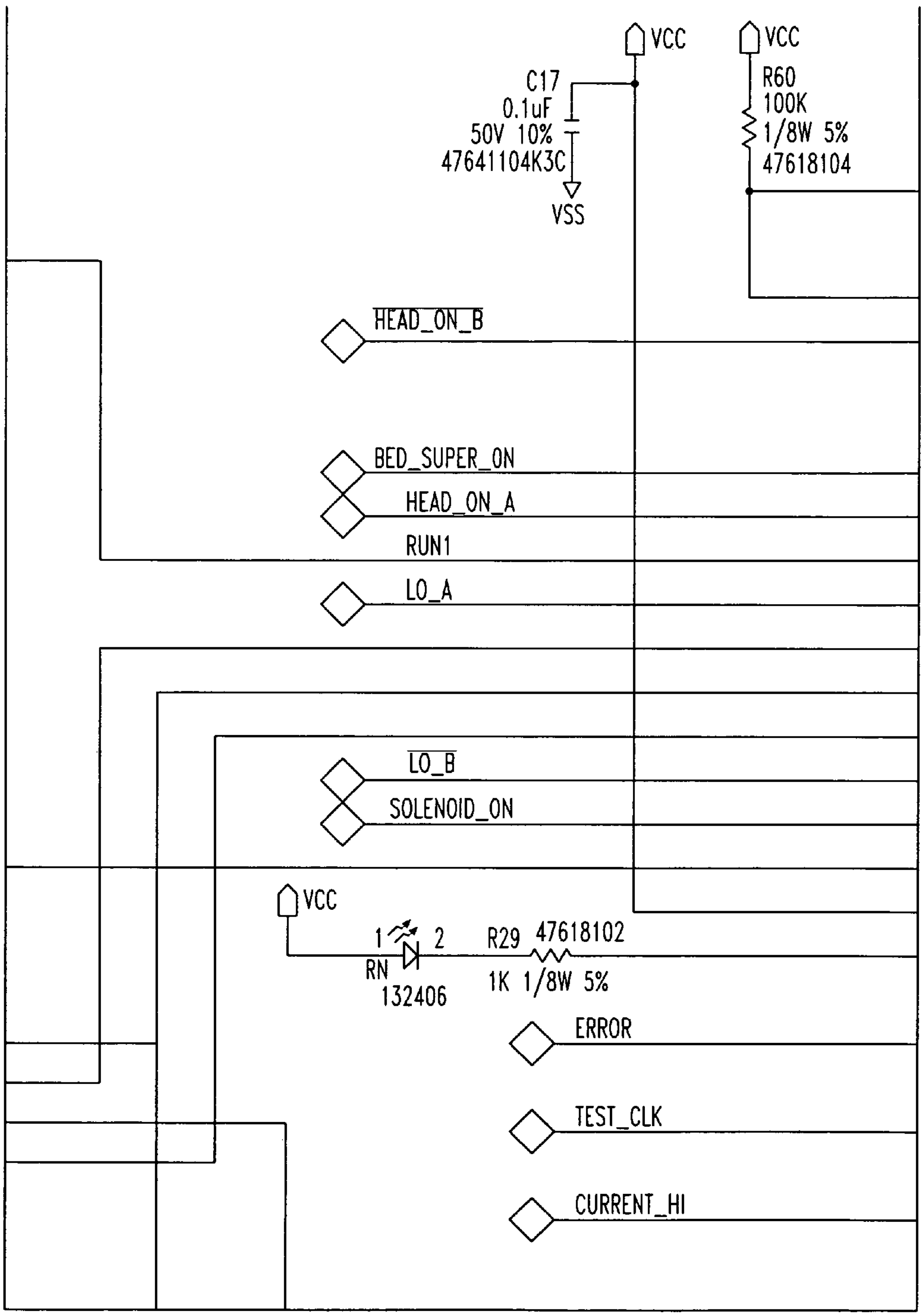
Figure 24:
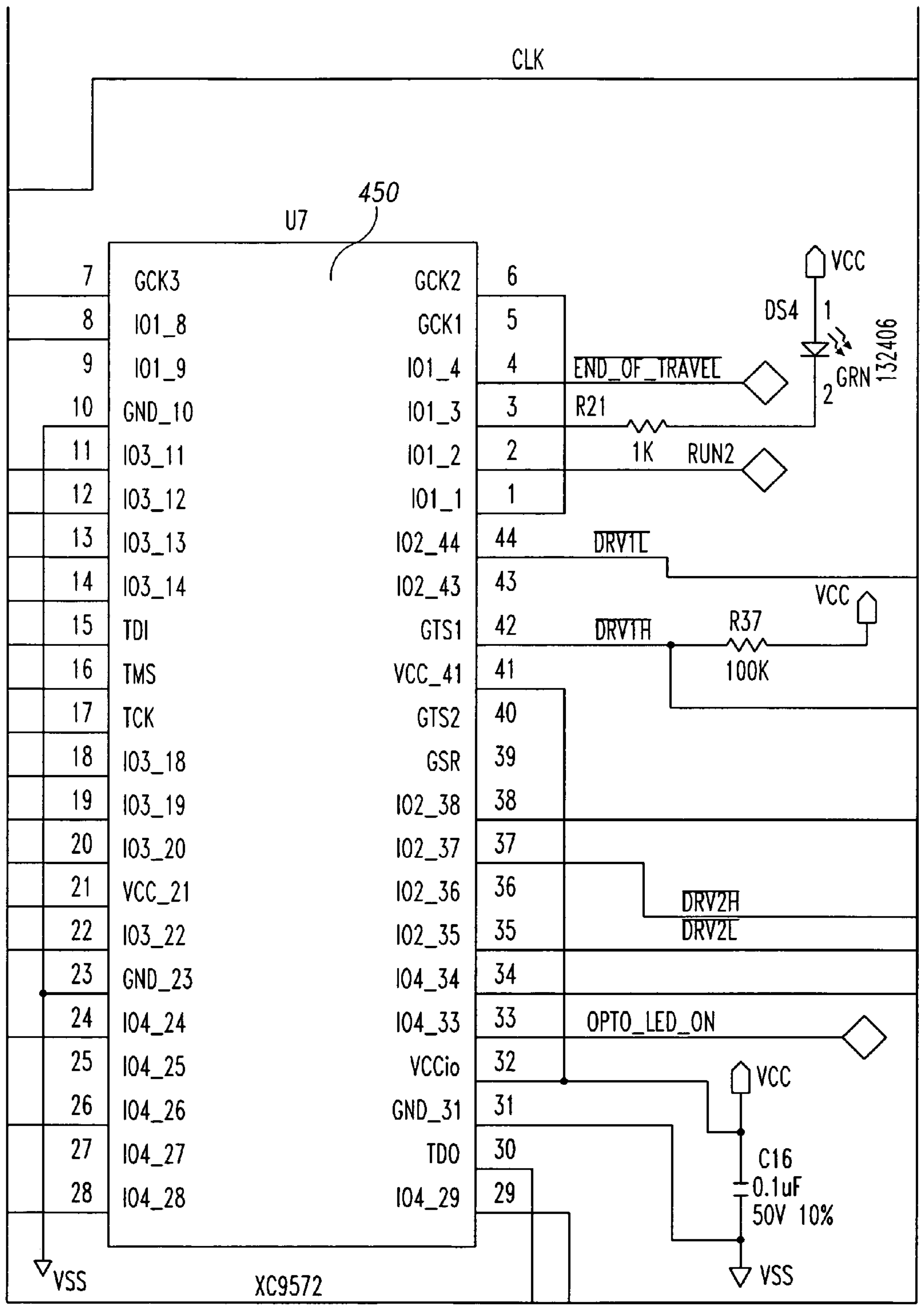
Figure 25:
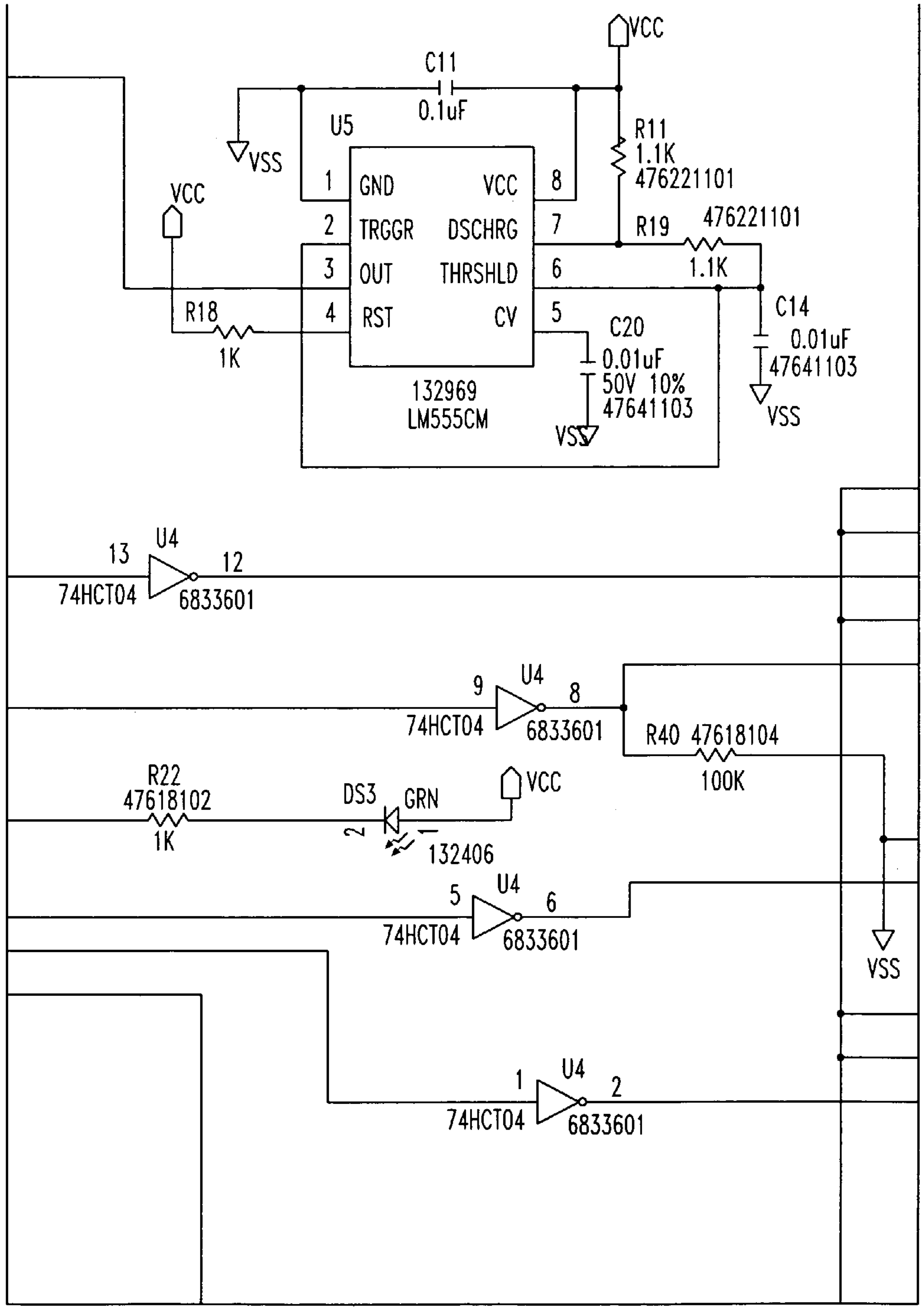

FIGS. 23-25 show the connections on the control board to the main control processor 450. Likewise, FIG. 22 shows circuitry which may be utilized to interface the receiver assembly 338 shown in FIGS. 43-46 to the control board assembly 332, with the connection between the receiver assembly 338 and the control board assembly 332 being provided by a connector P3.

The remaining figures show various other exemplary circuitry which may be utilized in the control board assembly 332 to control the operation of the pull-up-in-bed system 28. FIGS. 21-39 are exemplary in nature and represent only one embodiment of circuitry which may be used to control the pull-up-in-bed system 28. It should be understood that any of a number of other circuits may be used to perform the control of the pull-up-in-bed system 28 described.

Figure 12:
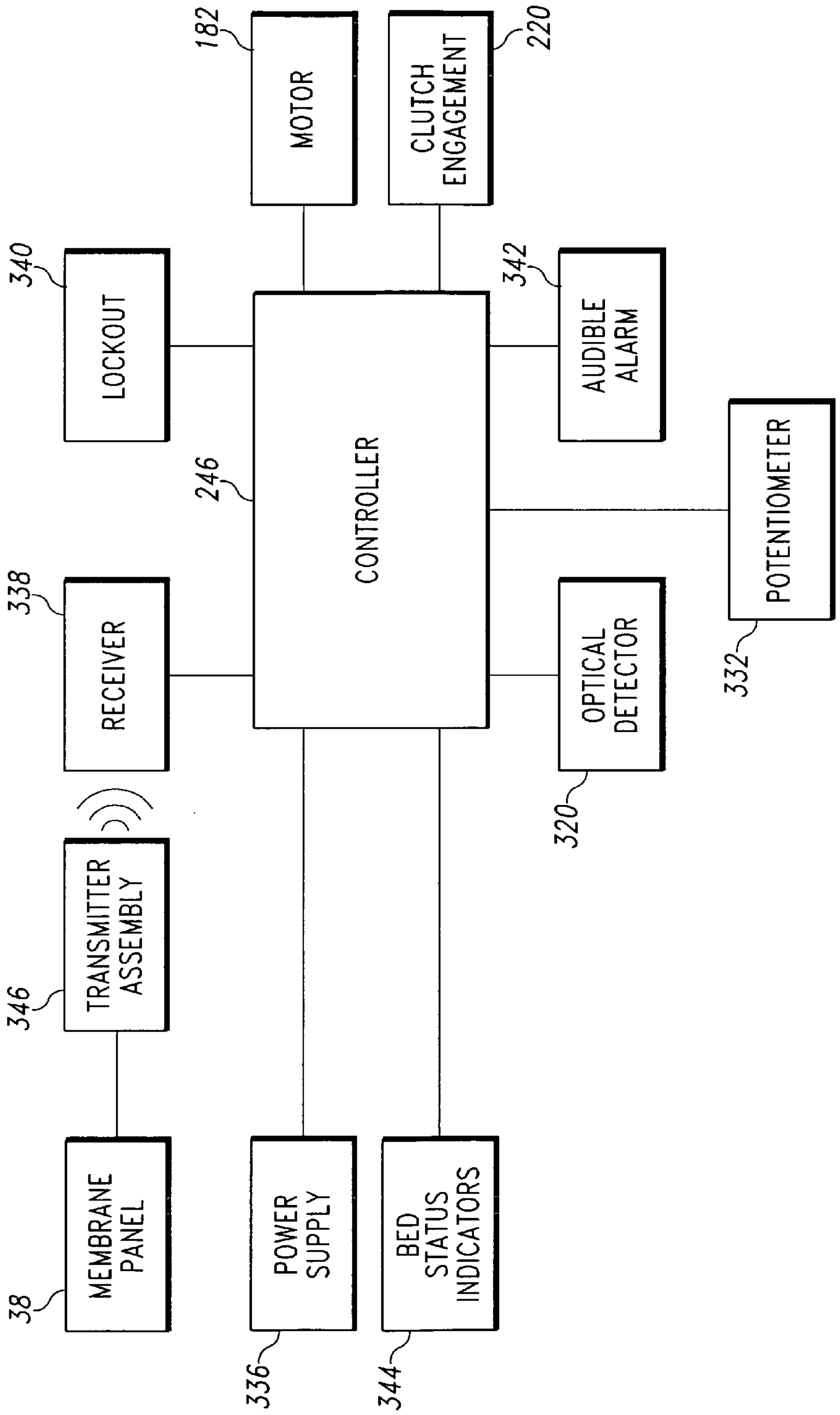
FIG. 12 is a block diagram of an embodiment of a portion of control hardware for the pull-up-in-bed system of FIG. 1.

Referring now to FIG. 12, the receiver assembly 338 operates in conjunction with a transmitter assembly 346 to receive a signal from the transmitter assembly 346 initiating the operation of the retractor 30 to commence repositioning of the patient. In the illustrative embodiment, the transmitter assembly 346 and receiver assembly 338 tandem comprise a dual-channel radio frequency communication system. This permits wireless signaling of operation of the pull-up-in-bed system 28. In other embodiments, the radio frequency communication system may be replaced by other wireless signaling such as infrared signaling, for example. In still other embodiments, the signaling may be hardwired from the point of operation to the controller. The dual-channel radio frequency communication is configured such that a transmitter assembly 346 and receiver assembly 338 tandem may be matched and the associated signaling processed to prevent a transmitter assembly 346 from a first pull-up-in-bed system 28 to inadvertently activate a second pull-up-in-bed system 28.

Figure 13:
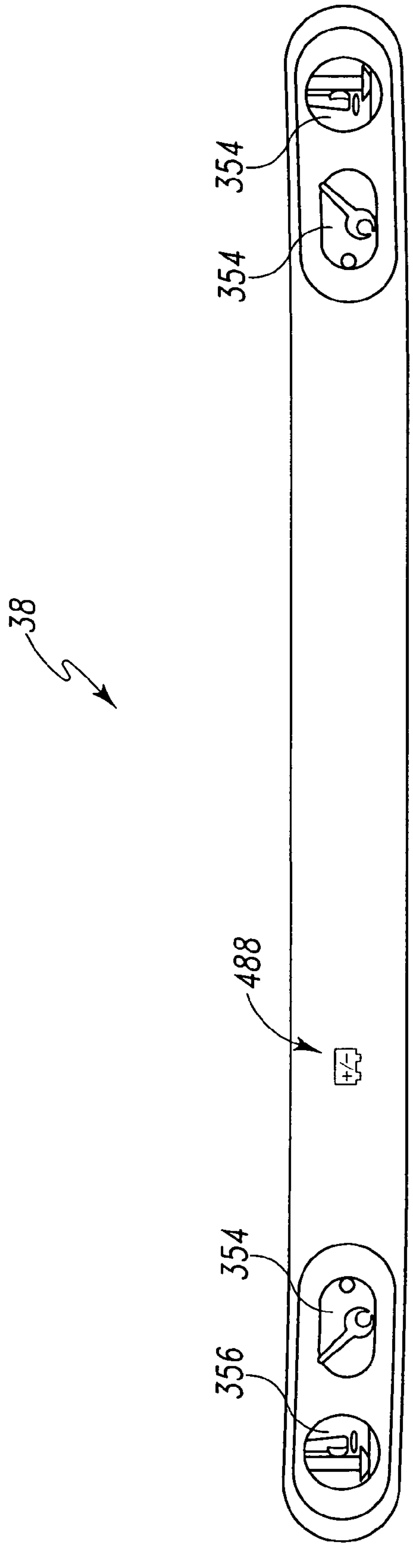
FIG. 13 is a front view of a membrane panel having multiple user input devices and a battery status indicator.

The transmitter assembly 346, shown in FIG. 7 is coupled to the sheet attachment device 24. The transmitter assembly 346 is coupled to the front housing 40 and covered by a membrane 482 which is substantially waterproof and which, in turn, is covered by a cover 484. The cover 484, membrane 484, and transmitter assembly 346 are coupled to the front housing 40 by several fasteners 486. The transmitter assembly 346 is electrically coupled to a membrane panel 38 through a connector 62. The membrane panel 38 is shown in FIG. 13 and includes two enable switches 354 and two run switches 356. The transmitter assembly 346 receives power from a battery 54 shown in FIG. 7. The battery 54 is retained in the sheet attachment device 24 and is electrically connected to the transmitter assembly through a positive pole connecter 58 and a negative pole connector 56. The battery 54 is covered by a removable battery cover 52 which is removably coupled to the sheet attachment device 24. The battery 54 charge status is indicated on the membrane panel 38 through a battery charge indicator 488 shown in FIG. 13.

Figure 40:
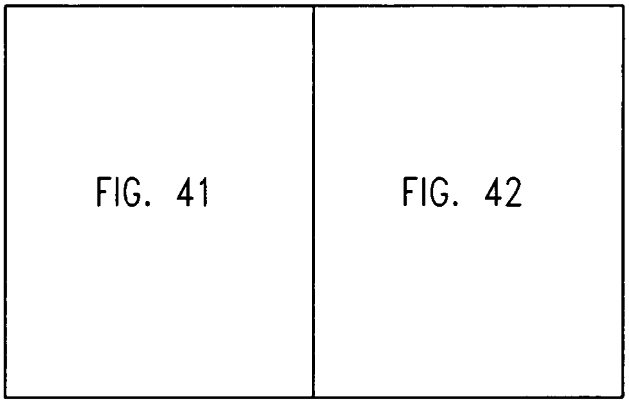
FIG. 40 is a map showing how to lay out FIGS. 41 and 42 to form a schematic of a wireless transmitter circuit of the pull-up-in-bed system.
Figure 41:
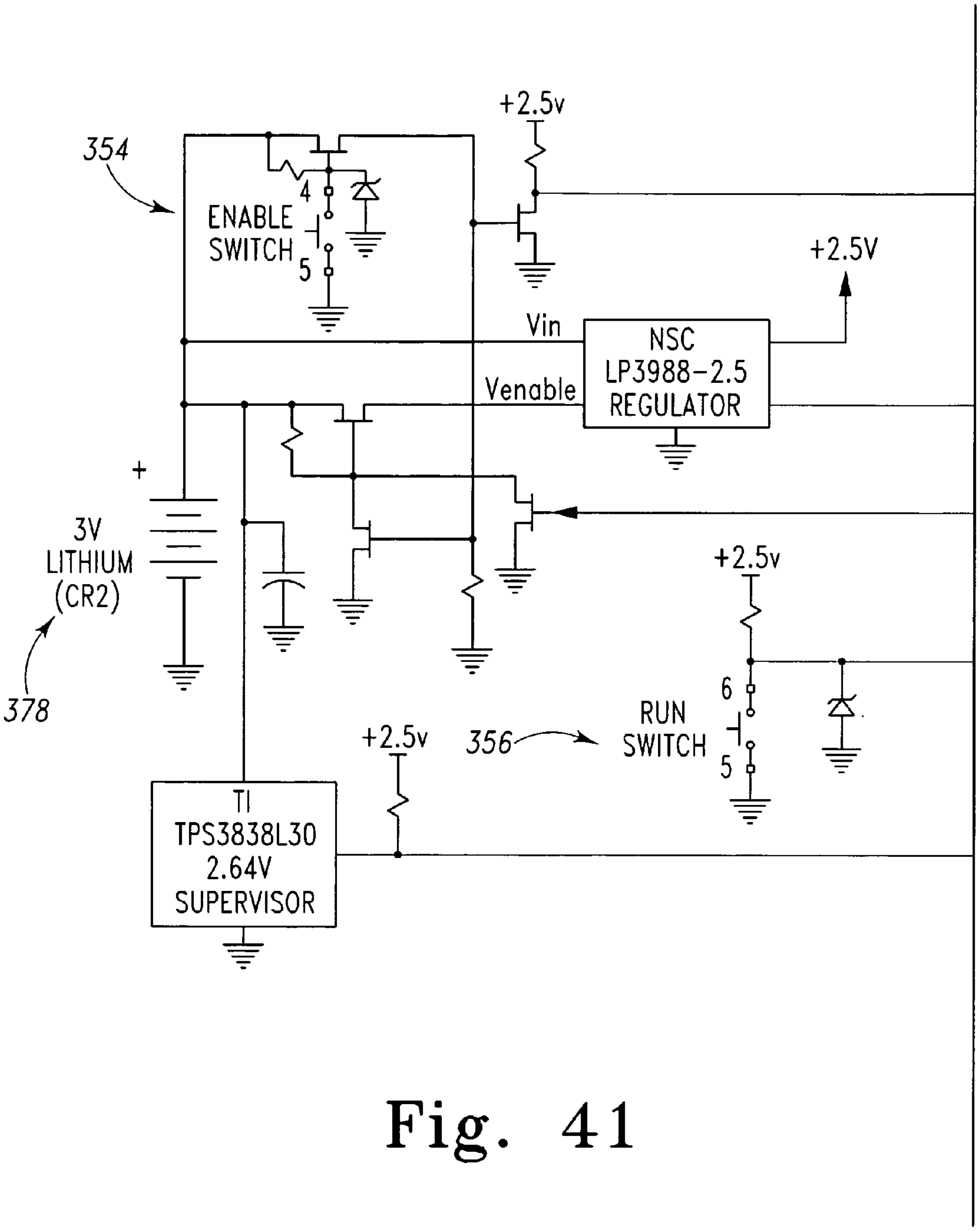
Figure 42:
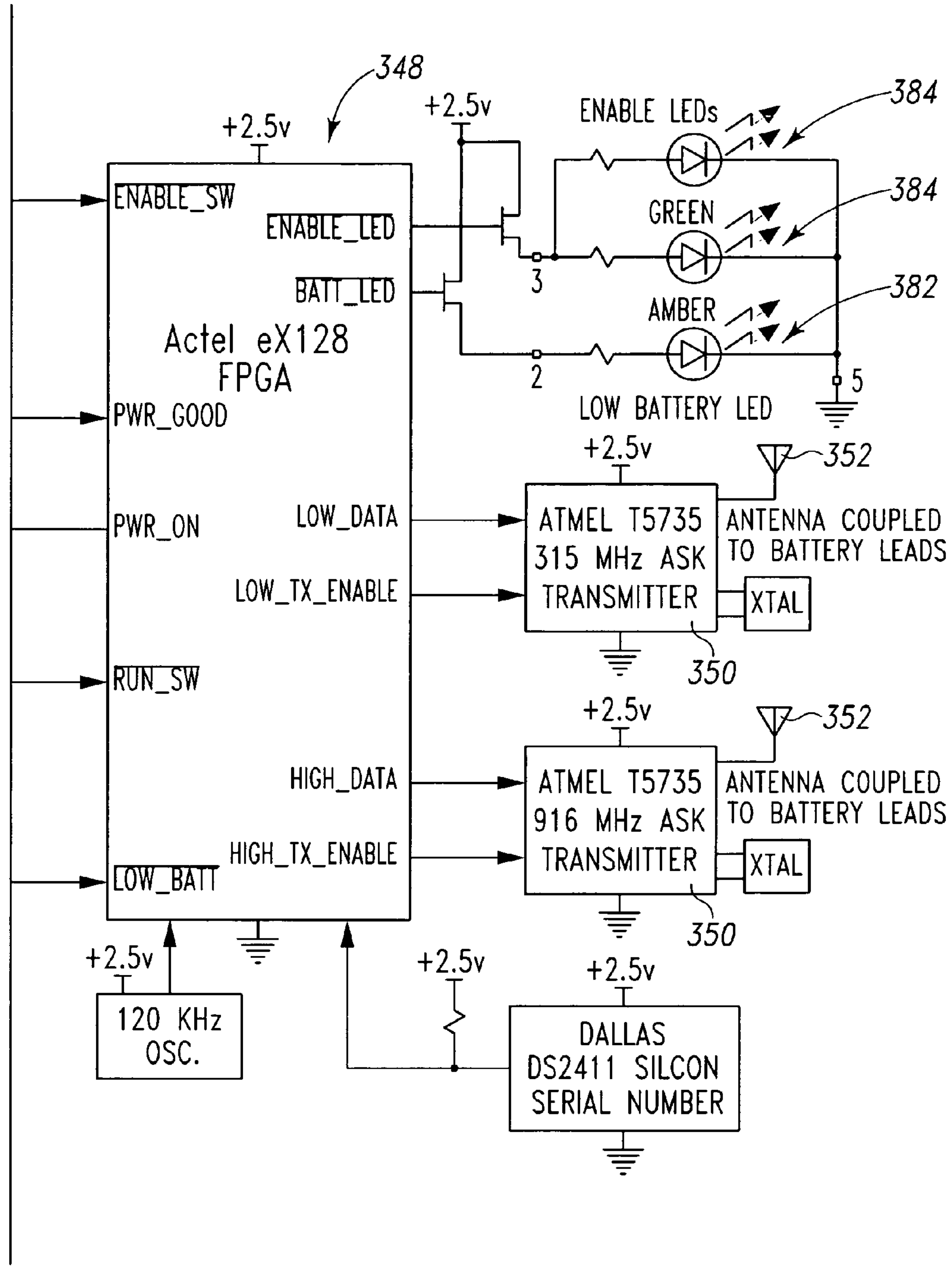
Figure 43:
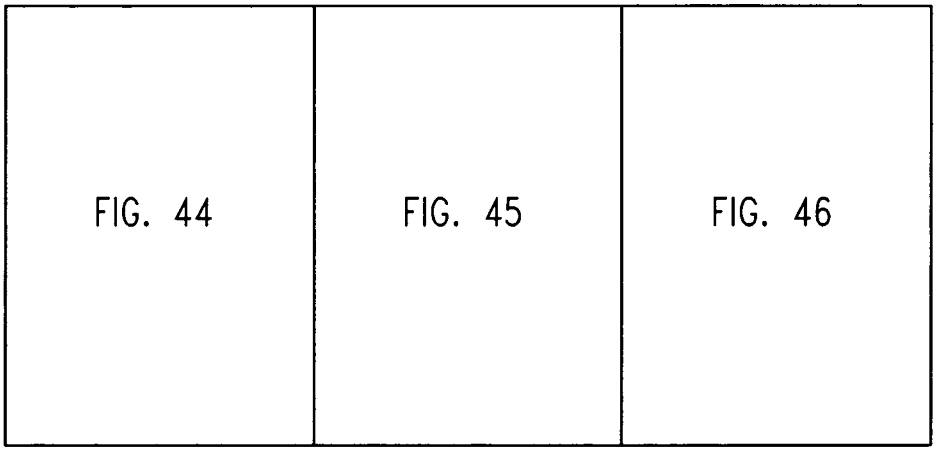
FIG. 43 is a map showing how to lay out FIGS. 44-46 to form a schematic of a wireless receiver circuit of the pull-up-in-bed system.
Figure 44:
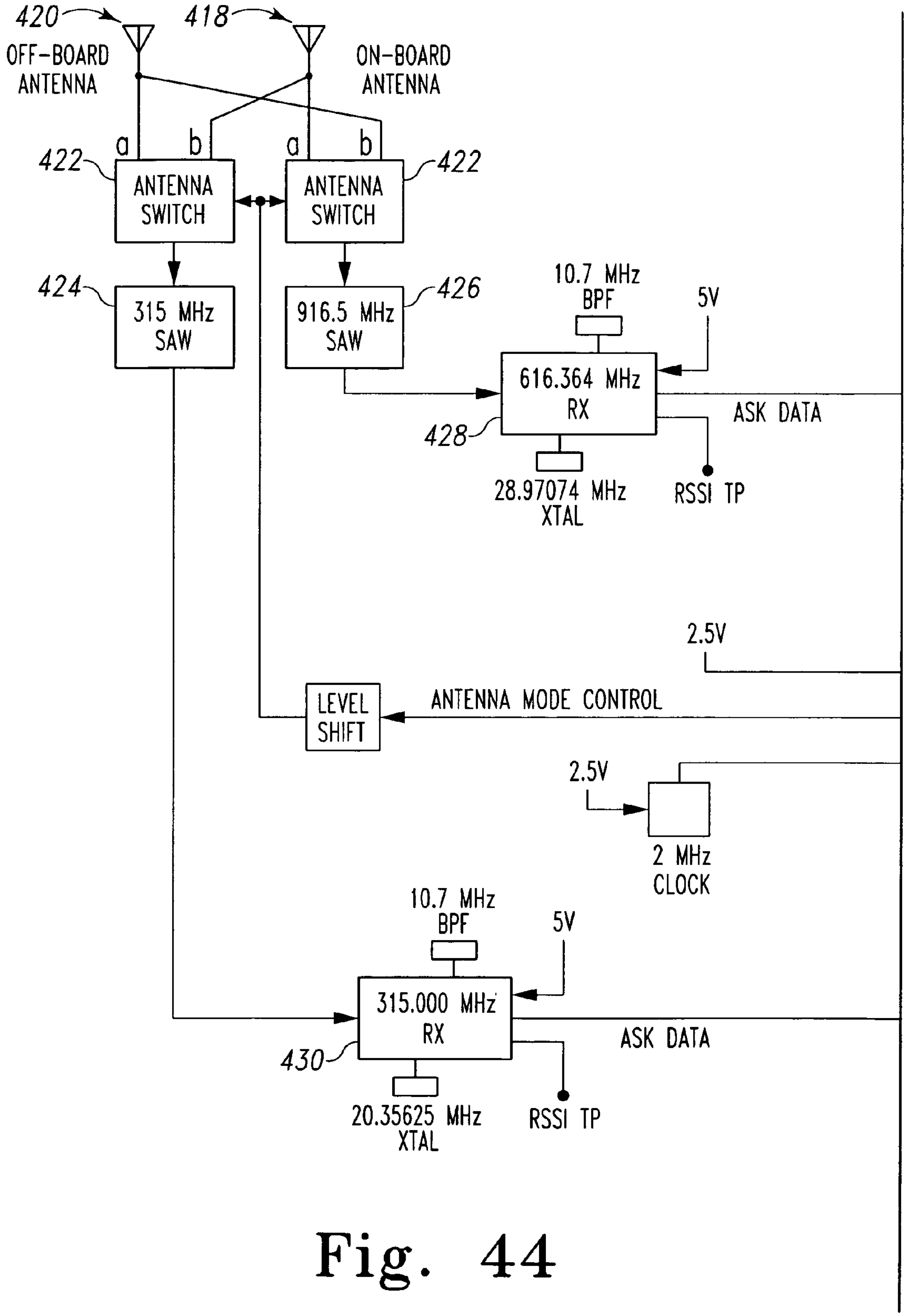
Figure 45:
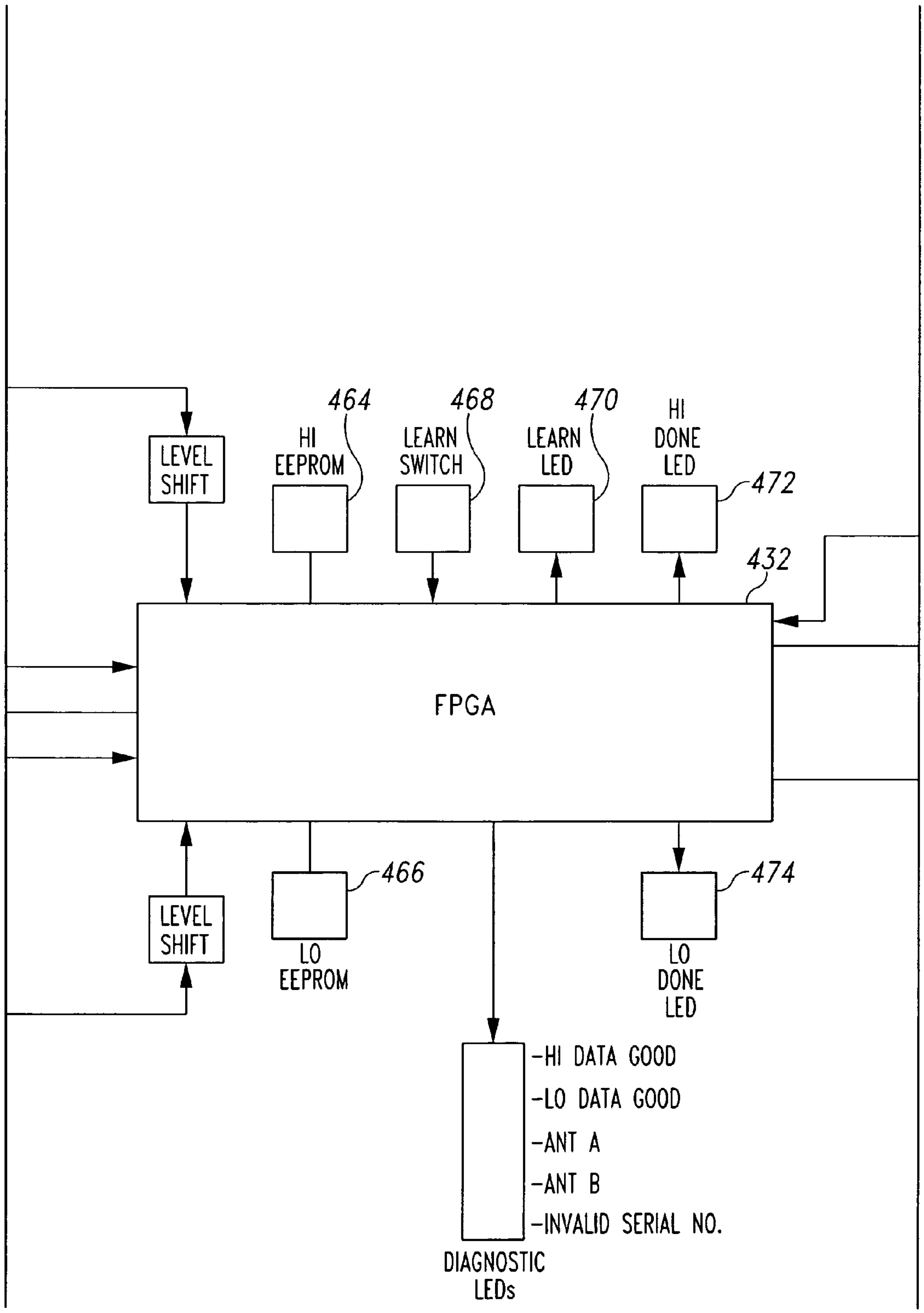
Figure 46:
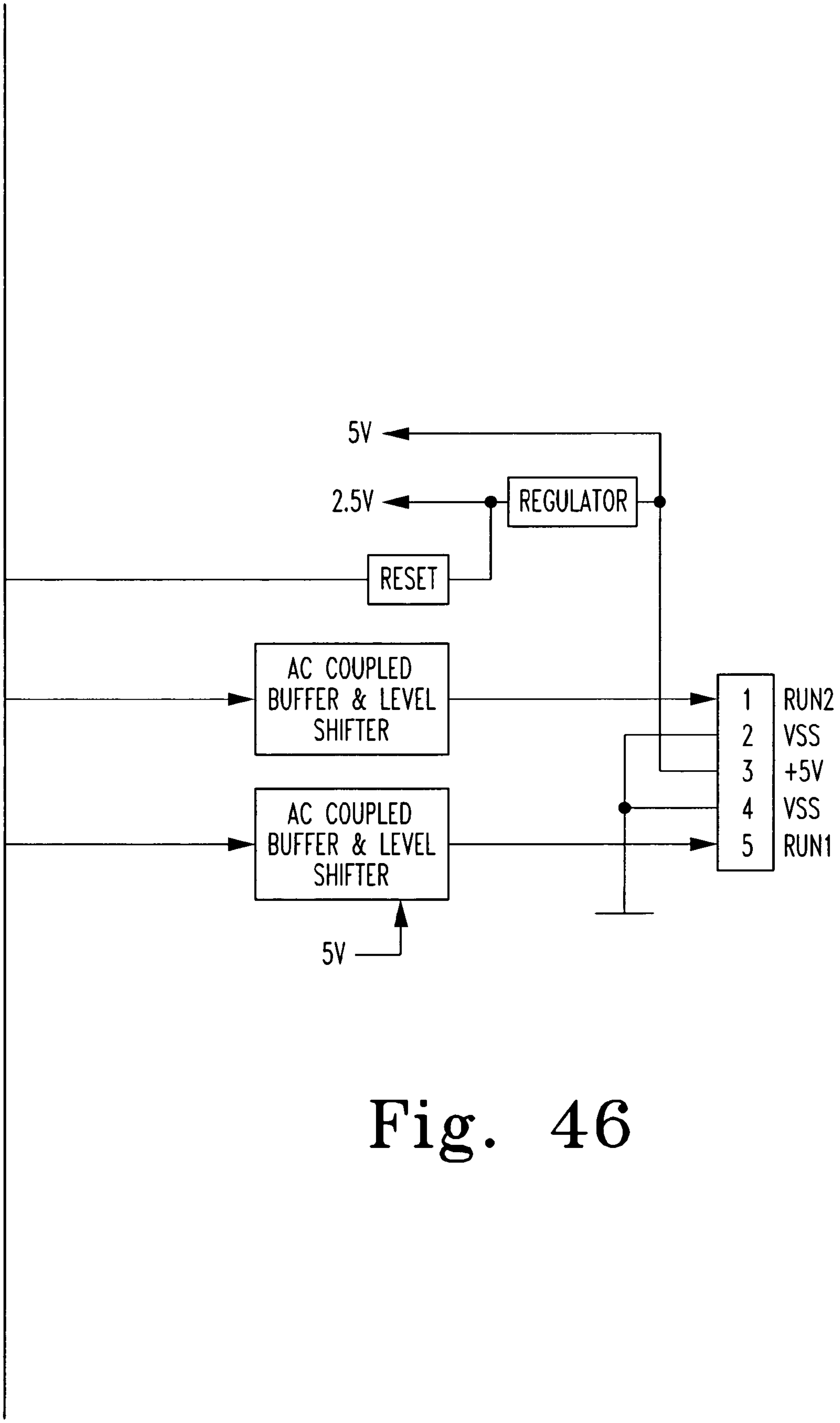

In one illustrative embodiment of circuitry shown in FIGS. 40-42, the transmitter assembly 346 may comprise a field programmable gate array (FPGA) 348 and two amplitude shift keying (ASK) transmitters 350 which are configured to repeatedly and sequentially emit a coded radio signal from two antennae 352 when a signal is received from the FPGA 348. The FPGA 348 is configured to receive a run signal from an enable switch 354 and subsequently a run switch 356 which thereby results in the transmission of the run signal from the ASK transmitters 350 by the FPGA 348.

Figure 47A:
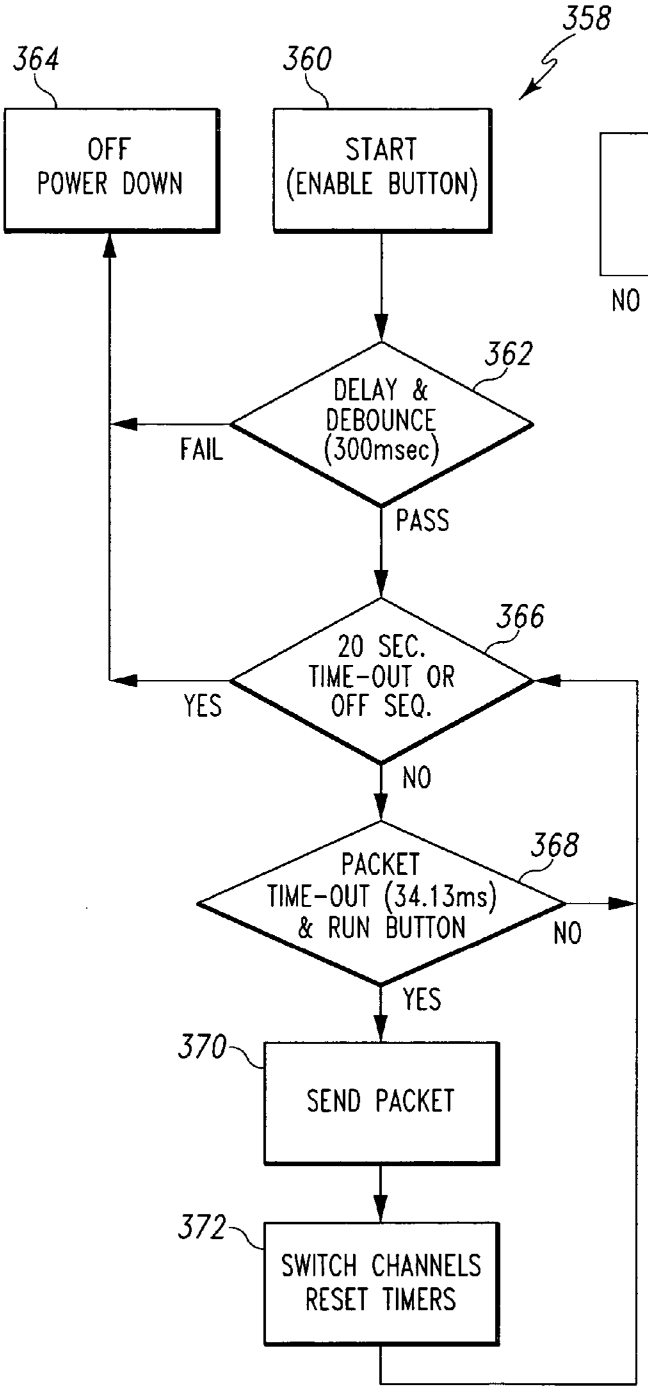
FIG. 47A is a flowchart of a control routine for the transmitter circuit.

Referring to FIG. 47A, a control routine 358 for the transmitter assembly 338 which is conducted by the FPGA 348 is commenced when the enable switch 354 is activated as shown in a step 360. The FPGA 348 processes the signal from the enable switch 354 in a decision step 362 which confirms that the enable switch 354 has been activated properly by waiting for a period of time to confirm that the circuit has been powered properly and that there is not a transient signal. This is accomplished by checking the signal after a delay of 300 milliseconds, for example. If the signal fails the test at the decision step 362, the control routine 358 advances to a process step 364 which results in a power down condition of the transmitter assembly 346. If the signal passes the test at the decision step 362, the FPGA 348 illuminates two indicator light emitting diodes (LED's) 384 and the control routine advances to a decision step 366 where the control routine 358 determines if one of two test conditions is met. The first test condition is a determination of the time since the enable switch 354 was activated. If this time exceeds 20 seconds, the control routine advances to the process step 364 and powers down the transmitter assembly 346. The second test condition is a check of the status of the enable switch 354 and the run switch 356. If both switches are active, then the control routine 358 processes this as an off condition and advances to the process step 364 and powers down the transmitter assembly 346. If neither of the test conditions is met in the step 366, then the control routine 358 advances to a decision step 368.

In the decision step 368, the control routine 358 monitors the status of the run switch 356. If the run switch 356 and a timer delay of 34. 13 milliseconds, for example, has been achieved, the control routine advances to a process step 370. If the conditions of the decision step 368 have not been met, then the control routine 358 returns to the decision step 366. At the process step 370 the FPGA 348 sends a packet of data to an ASK transmitter 350 which results in a first channel transmission of the run signal. The control routine 358 then advances to the next step which is a processing step 372. In the processing step 372, the control routine 358 switches channels to the ASK transmitter 350 opposite the previous channel transmission and resets the timers. The control routine 358 then returns to the decision step 366 to begin another loop. Each of the two ASK transmitters 350 operate at different frequencies, one at 315 MHz and the other at 916 MHz, for example. The transmitter assembly 346 transmits signals at two different frequencies having differing susceptibility to external interference such that if one frequency is disrupted, the other may be transmitted properly. While the illustrative embodiment utilizes two frequencies, 315 MHz and 916 MHz, for example, it should be understood that any of a number frequencies may be utilized redundantly to provide overcome potential external interferences.

Figure 47B:
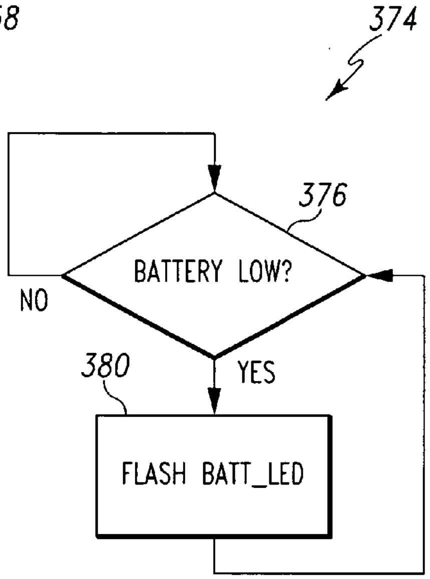
FIG. 47 B is a flowchart for a battery monitoring routine for the transmitter circuit.

A second control routine 374 shown in FIG. 47B comprises a two step loop wherein a decision step 376 monitors a charge level of a battery 378 on the transmitter assembly 346. If the battery charge level is low, the loop proceeds to step 380 wherein a light-emitting diode 382 is flashed and the loop returns to decision step 376. If the battery charge level is not low, the decision step 376 loops back upon itself and repeat the analysis.

Referring now to FIGS. 43-46, a properly transmitted signal from the transmitter assembly 346 is received by the receiver assembly 338 which comprises an on-board antenna 418, an off-board antenna 422, two antenna switches 422, two surface acoustic wave bandpass filters (SAW) 424, 426, a high frequency receiver 428, a low frequency receiver 430, and a FPGA 432. The on-board antennae 418 comprise a trace within a circuit board (not shown) which supports portions of the receiver assembly 338. The off-board antenna 422 comprises an external wire which is electrically coupled to the circuit board. Two different configurations of antennae are utilized redundantly to provide for improved probability of receiving one of the ASK transmitter 350 signals. Each of the antennae 418, 420 receive signals in both frequencies and each of the antennae 418, 420 are coupled to each of the antenna switches 422. The antenna switches 422 are configured to selectively transmit the signals from the antennae 418, 420 to a dedicated SAW. The switching of the antenna switches 422 from one antenna to the other antenna is controlled by a control routine 434 within the FPGA 432 and shown in FIGS. 48-50. The operation of control routine 434 will be discussed in more detail below.

Each signal is filtered by the associated SAW 424, 426 and is passed from the respective SAW to the appropriate receiver 428 or 430. The SAW 424 is dedicated to the 315 MHz frequency and is coupled to the receiver 430. Similarly, the SAW 426 is dedicated to the 916 MHz frequency and is coupled to the receiver 428. The receivers 428, 430 process the radio frequency signal at their respective frequencies and pass the converted signal to the FPGA 432 which processes the signal according to the control routine 434 of FIGS. 48-50.

The receiver assembly 338 further comprises a hi electrically erasable programmable read-only memory (EEPROM) 464, a lo EEPROM 466, a learn switch 468, a learn light emitting diode (LED) 470, a hi done LED 472, and a lo done LED 474. The EEPROMs 464, 466 are used to store a serial number transmitted in the signals from the ASK transmitters 350 with the hi EEPROM 464 storing the serial number at the 916 MHz frequency and the lo EEPROM 466 storing the serial number at the 315 MHz frequency. The learn switch 468 is moveable between a first position wherein the receiver assembly 338 is configured to learn the serial numbers of the respective ASK transmitters 350 and a second position wherein the receiver assembly 338 is configured to process signals from the ASK transmitters. The learn LED 470 provides a visual indication that the transmitter has completed learning the serial numbers. The hi done LED 472 and lo done LED 474 provide visual indications that the serial number has been learned at the respective frequencies. The process for learning the serial number is also part of control routine 434 discussed below.

Figure 48:
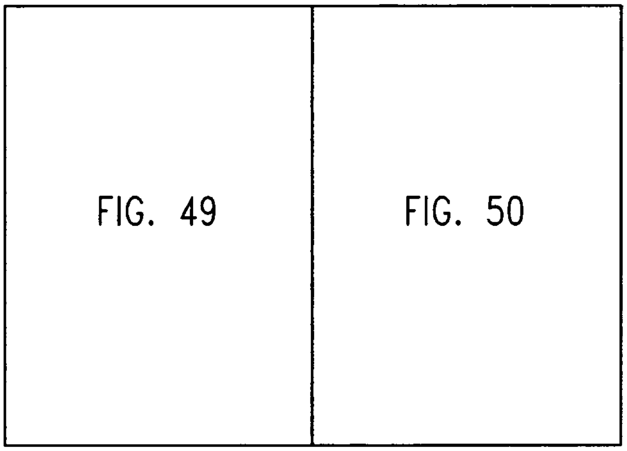
FIG. 48 is a map showing how to lay out FIGS. 49-50 to form a flowchart of a control routine of the wireless receiver circuit.
Figure 49:
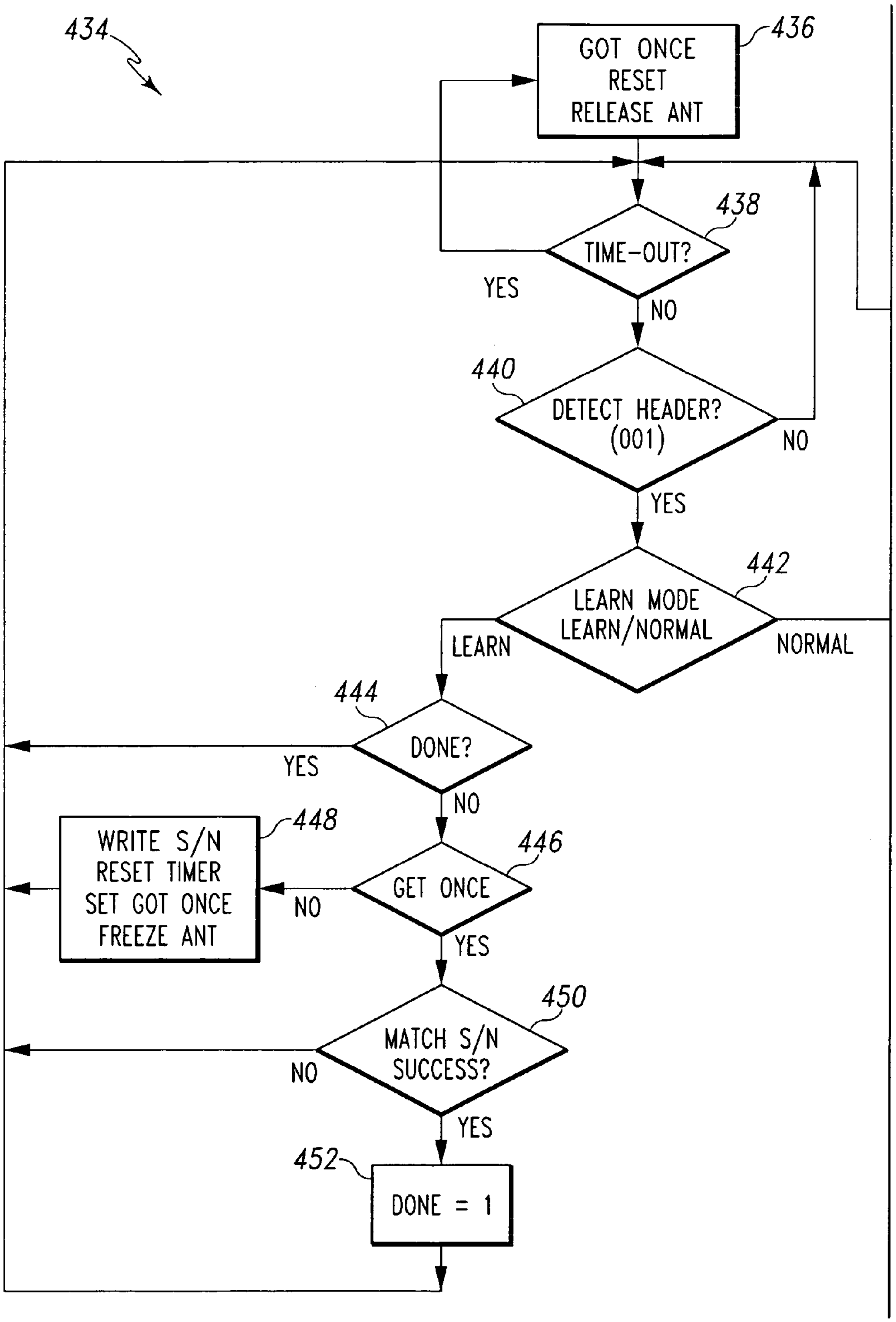
Figure 50:
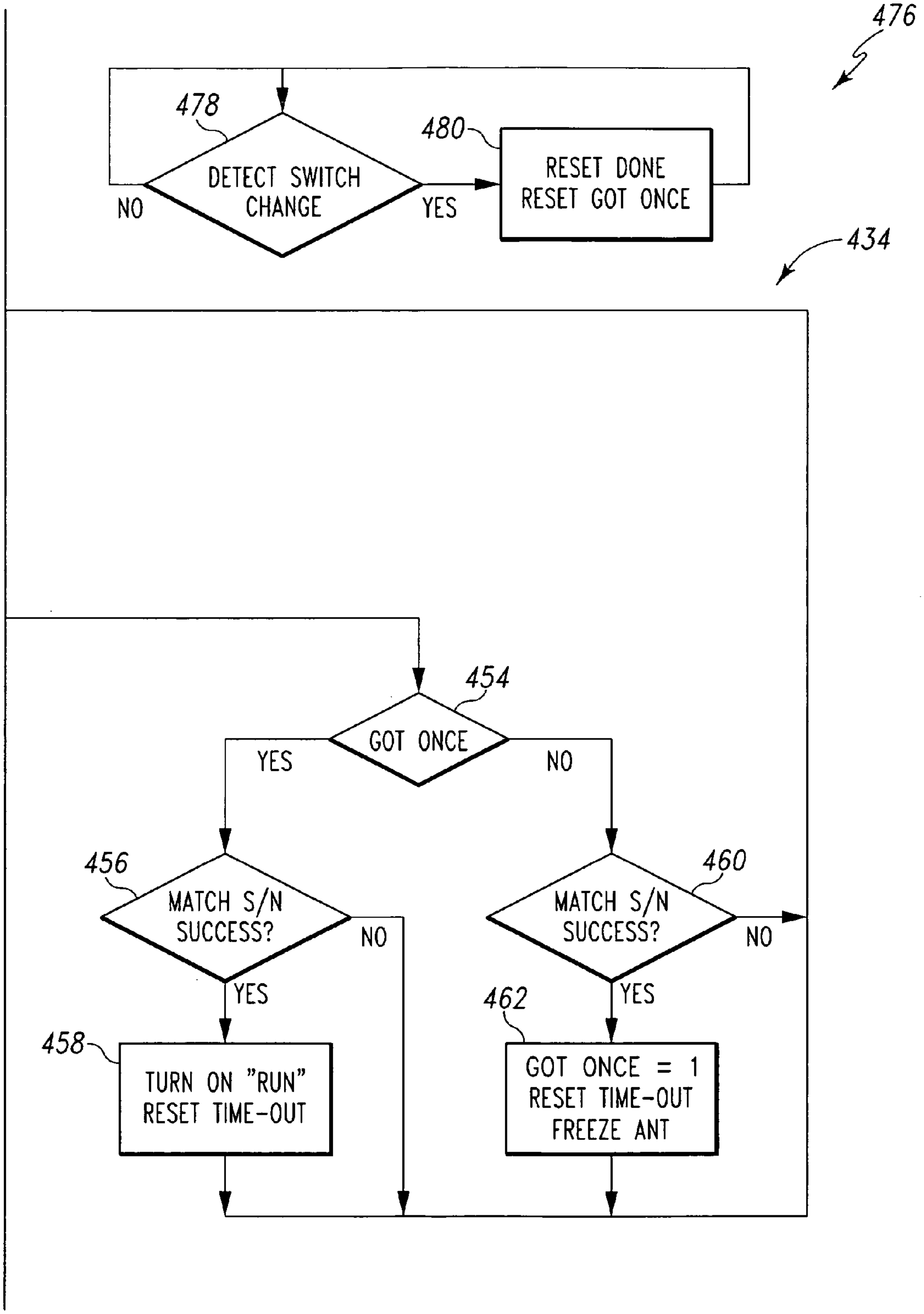

Referring now to FIGS. 48-50, the control routine 434 utilizes a variable "got once", which is binary, to track the signal status. At the start of control routine 434, a process step 436 resets the "got once" variable to null, releases the antenna switches 422 and begins a timer. At a decision step 438, a decision is made by the control routine 434 to determine the status of the timer. If the timer has exceeded a pre-determined time limit, the control routine loops back to the process step 436 and resets. If the timer has not expired, the control routine 434 proceeds to a decision step 440 where it is determined if a header has been detected in the signal. The header includes the serial number of the transmitter assembly 338. If no header is detected, the control routine 434 loops back to the decision step 438 to check the timer status. If a header is detected, the control routine 434 advances to a decision step 442 where the status of the learn switch 468 is analyzed. If the learn switch 468 is in learn mode, the control routine 434 branches down the learn branch of the control routine 434 to a decision step 444. If the learn switch is in normal mode which corresponds to the second position, then the control routine 434 branches down the normal branch to a decision step 454.

At the decision step 444 the control routine 434 determines if the learn mode is complete by checking a binary variable "done". If "done" is set, the control routine 434 branches back to step 438 and continues to loop until a status change such as the learn switch 468 being transitioned from the first position to the second position is detected. If the learn process is not complete and "done" is null, the control routine 434 proceeds to a decision step 446 wherein the status of the "got once" variable is analyzed. If the "got once" variable has not been set, then the control routine 434 proceeds to a process step 448 wherein the serial number is written to the EEPROMs 464, 466, the timer is reset, the "got once" variable is set, and a signal is sent to freeze the antenna switches 422, 422. The control routine 434 then proceeds to the decision step 438. If the "got once" variable is determined to be set at the decision step 446, then the control routine 434 proceeds to decision step 450 to determine if the serial number in the header matches a stored serial number. If it does not, then the control routine 434 loops back to the decision step 438. If the serial does match on this second pass, the control routine 434 proceeds to a process step 452 where the "done" variable is set and the control routine 434 returns to the decision step 438.

If the control routine 434 determined at the step 442 that the learn switch 468 was in the second position corresponding to a normal mode, then the control routine 434 advances to the decision step 454 where the "got once" variable is analyzed as shown in FIG. 50. If the "got once" variable is set, then the control routine 434 proceeds to a decision step 456 where the serial number in the header is matched against the serial number stored. If the match is successful, the control routine 434 proceeds to a process step 458 where a run signal is generated and the timer is reset. If the serial number match fails, then the control routine returns to the decision step 438. If the "got once" variable is determined not to be set at the decision step 454, then the control routine 434 proceeds to a decision step 460 where the serial number in the header is matched against the stored serial number. If the match is successful, then the control routine proceeds to a process step 462 where the "got once" variable is set, timer is reset, and the antenna switches 422 are frozen and the control routine loops back to the decision step 438. If the serial number match at decision step 460 is unsuccessful, then the control routine 434 loops directly back to the decision step 438.

Another control routine 476 runs continuously checking the status of the learn switch 468. At a decision step 478 the current status of the switch is compared against the previous status. If the switch status has not changed, then the control routine 476 loops back to step 478. If the current status of the switch has changed from the previous status, the control routine 476 proceeds to a process step 480 where the "done"

and "got once" variables are reset. The control routine 476 then loops back to decision step 478.

The FPGA 432 contains unification logic (not shown) which maintains the antenna switch 422 configuration locked as long as one of the antennae 418, 420 signals are active. If neither signal is active, the antenna switches 422 are shifted and the FPGA 432 checks for an active signal again. This allows the rotation of the frequencies across both the antennae 418, 420 to optimize the antennae/frequency configuration. The system constantly checks for an appropriate signal to forward to the controller 246.

Similarly, the FPGA 432 will forward the run signal to the controller 246 if either one or both of the receivers 428, 430 has received two sequential matching serial numbers from a corresponding transmitter 350. Otherwise, the run signal is not transmitted.

Figure 51:
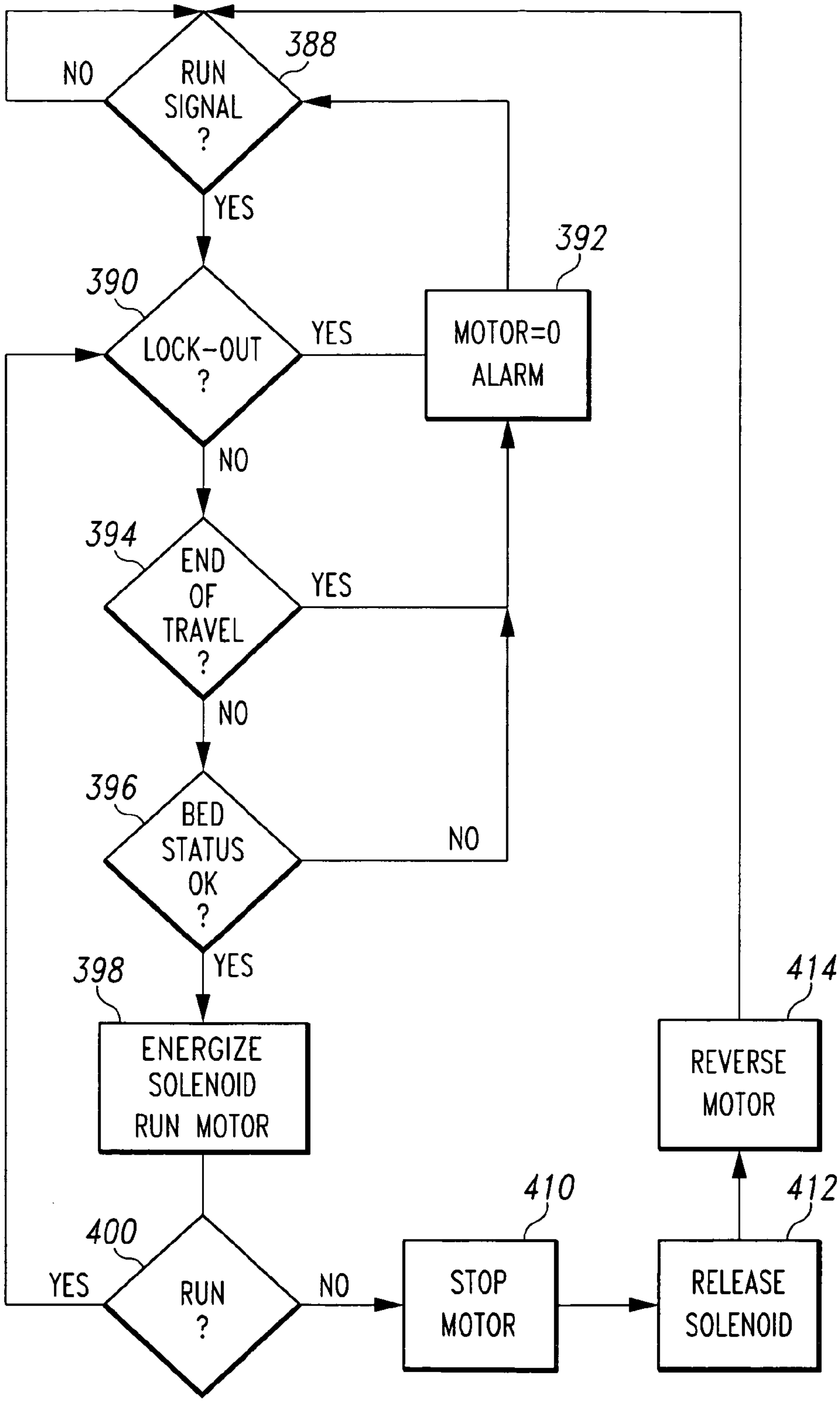
FIG. 51 is a flowchart of a control routine for the controller of FIG. 12.
Figure 52:
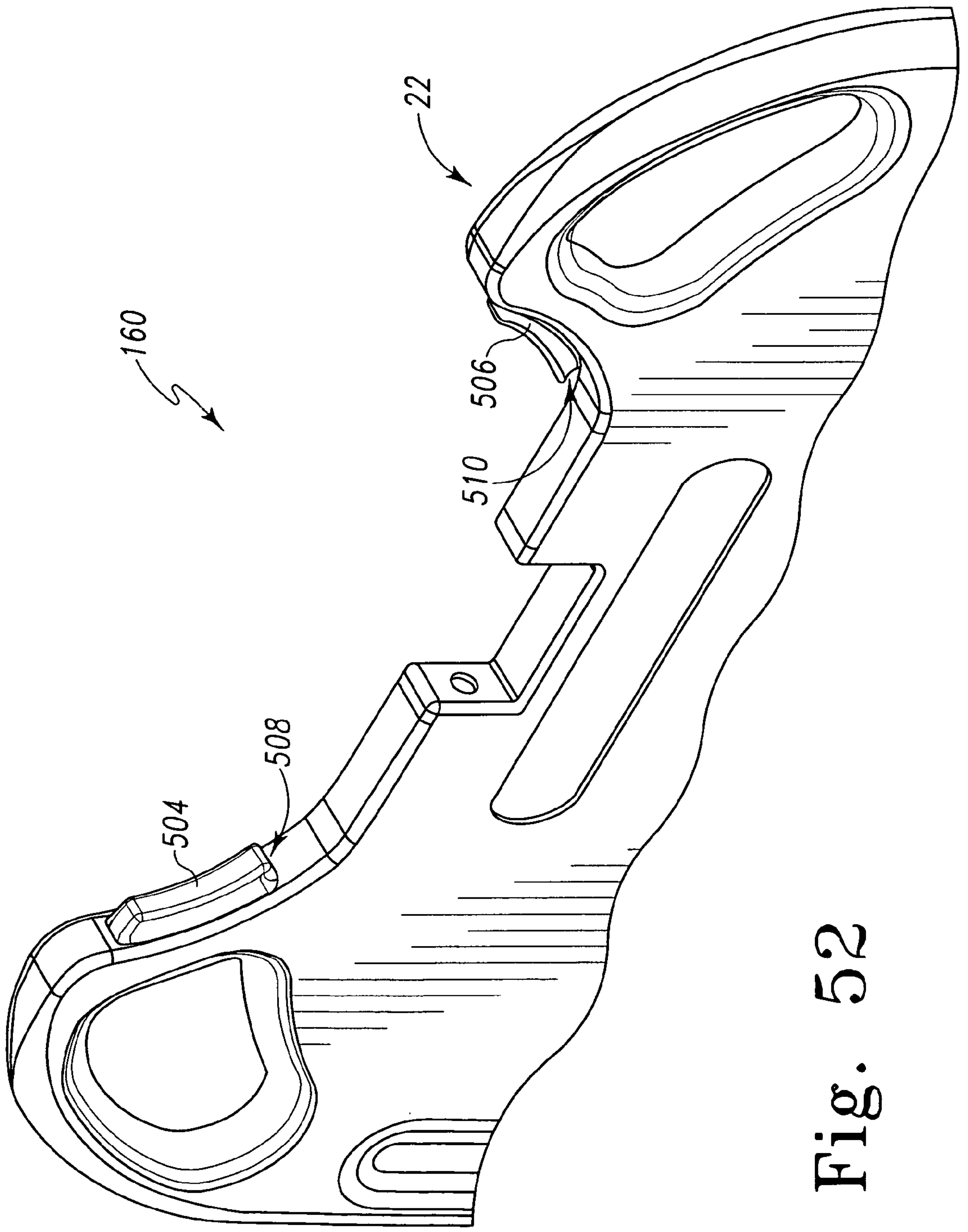
FIG. 52 is a fragmented perspective view of a headboard of the patient support apparatus.

Once the receiver assembly 338 determines that a valid run signal has been transmitted, the receiver assembly 338 signals the controller 246 to run the retractor 30. The controller 246 processes this signal according to the control routine 386 shown in FIG. 51. At a decision step 388, the control routine 386 determines if a run signal is present. If no run signal is present, the control routine 386 continues to loop through the decision step 388. If a run signal is present, control routine 386 progresses to a decision step 390 where the status of the lock-out switch 340 is analyzed. If the lock-out switch 390 is active, the control routine 386 progresses to a process step 392 where an audible alarm 342 is activated and the run signal to the motor is set to null. If the lock-out switch 390 is not active, then the control routine 386 progresses to a decision step 394 where the status of the end-of-travel switch 320 is analyzed. If the end-of-travel switch 320 is active, then the control routine 386 advances to the step 392 described above. If the end-of-travel switch 320 is not active, then the control routine 386 progresses to a decision step 396 where the bed status indicator 344 is analyzed. If the bed status indicator 344 is active, this indicates that the patient support apparatus 10 is not positioned appropriately for use of the pull-up-in-bed system 28. If the bed status indicator is active, the control routine 386 progresses to the step 392. These multiple checks at the decision steps 390, 394, 396 are safety steps to assure that the pull-up-in-bed system 28 is not activated in an unwanted operating condition.

If the bed status indicator 344 is not active, the control routine 386 progresses to a process step 398 where the solenoid 222 is energized to disengage the engagement arm 226 from the clutch 186 and the motor 182 is activated to provide output torque 194. The control routine 386 then advances to a decision step 400 where the run signal is again analyzed. If the run signal is still active, the control routine loops back to step 390 to perform another series of checks. If no run signal is present, the control routine progresses to a process step 410 where the signal to the motor 182 is set to null. Then the control routine 386 progresses to a process step 412 where the solenoid 222 is de-energized allowing the engagement arm 226 to engage the engagement surface portion 242 of the outer housing 198 of the clutch 186. The control routine 386 then progresses to a process step 414 where the motor 182 is signaled to run in reverse for a period of time sufficient to disengage the clutch 186 thereby releasing slack in the system and freeing the retraction mechanism from the prime mover 180

While the present invention discloses the use of a wireless signal to operate a pull-up-in bed function of the patient support apparatus, it should be understood that the wireless functionality may operate any of a number of functions of the patient support apparatus. In some embodiments, for example, articulation functions of a patient support apparatus such as head elevation, apparatus height, leg section articulation or other articulation functions may be activate by use of the system. In some embodiments, the wireless system operate other functions such as patient controlled devices including television channel up, channel down, channel select volume up, volume down, radio, audio, direct lighting, or indirect lighting or to activate or operate a nurse call system.

Although certain illustrative embodiments have been described in detail above, variations and modifications exist within the scope and spirit of this disclosure as described and as defined in the following claims.

The invention claimed is:

1. A control system for a patient support apparatus, the control system comprising:

a device including an enable key and a function key, the function key operable to send a command via a wireless signal such that the function key controls at least one function of the patient support apparatus only if the function key is pressed within a predetermined period of time of the enable key being pressed, wherein the device does not send any wireless signal in response to only the enable key being pressed, a wireless receiver coupled to the patient support apparatus and configured to receive the wireless signal, and a circuit operatively coupled to the wireless receiver, the circuit having a user input device operable to change the circuit between a first mode of operation in which the circuit associates the device with the patient support apparatus and a second mode of operation in which the circuit controls the at least one function of the patient support apparatus in response to the wireless signal.

2. The control system of claim 1, further comprising a visual indicator operatively coupled to the circuit and configured to provide an indication that the device has been successfully associated with the patient support apparatus.

3. The control system of claim 1, wherein the circuit comprises a memory device configured to store an association parameter transmitted wirelessly by the device.

4. The control system of claim 3, wherein the device transmits the wireless signal at a plurality of frequencies.

5. The control system of claim 4, wherein the memory device comprises a plurality of memory devices, each memory device storing an association parameter for each of the plurality of frequencies at which the device transmits.

6. The control system of claim 5, further comprising a plurality of visual indicators operatively coupled to the circuit, each visual indicator being associated with a respective one of the plurality of frequencies at which the wireless control device transmits, and each visual indicator being operable to provide an indication that the device has been successfully associated with the circuit at a particular frequency.

7. A control system for a patient support apparatus, the control system comprising:

a plurality of wireless receivers including a first wireless receiver having a first antenna and a second wireless receiver having a second antenna, each wireless receiver configured to receive a signal transmitted at a plurality of wireless frequencies, and a circuit operatively coupled to the wireless receivers, the circuit having a user input device operable to change the circuit between a first mode of operation in which the circuit associates the device with the patient support apparatus and a second mode of operation in which the circuit controls the at least one function of the patient support apparatus in response to the wireless signal, the circuit configured to sequentially poll combinations of each wireless receiver and each frequency until a signal is detected and to maintain the receiver and frequency combination at which the signal is detected until the signal is lost, wherein the second antenna is structurally different from the first antenna and the first and the second antenna are operated redundantly, and wherein the circuit analyzes the wireless signal to determine if the signal includes a signal source identifier that is recognized by the circuit to determine that the wireless signal is of suitable quality, and the circuit determines that the signal source identifier is received in a first signal transmission and a second signal transmission immediately following the first signal transmission to determine that the wireless signal is of suitable quality.

8. The control system of claim 7, wherein the wireless receivers each comprise an antenna that tends to be immune to a particular interference source.

9. The control system of claim 7, wherein the circuit comprises a printed circuit board, the first antenna is a trace of the printed circuit board, and the second antenna is an external wire coupled to the printed circuit board.

10. The control system of claim 7, further comprising a device that transmits the signal to control a function of the patient support apparatus.

11. The control system of claim 10, wherein the device is configured to operate a motor on the patient support apparatus.

12. The control system of claim 11, wherein the motor is a portion of a pull-up-in-bed system.

13. A control system for a patient support apparatus, the control system comprising:

a device including an enable input and a function input, the function input operable to send a command via a wireless signal such that the function key is configured to operate a function of the patient support apparatus only if the function input is activated within a predetermined period of time of the enable input being activated and wherein the device abstains from sending any wireless signals between the time the enable input is activated and the function input is activated, a wireless receiver coupled to the patient support apparatus and configured to receive the wireless signal, and a circuit operatively coupled to the wireless receiver the circuit having a user input device operable to change the circuit between a first mode in which the device identification is associated with the patient support apparatus, and a separate second mode in which the circuit is configured to process the wireless signal to determine if the device has been associated with the circuit and if the device has been associated with the circuit, process the command from the device to operate the function of the patient support apparatus.

14. The control system of claim 13, further comprising a memory device operatively coupled to the circuit, the memory device storing an association variable that identifies the associated remote wireless control device.

15. The control system of claim 14, wherein the device comprises a transmitter and the association variable stored in the memory device comprises a serial number of the transmitter.

16. The control system of claim 13, wherein the device redundantly transmits the wireless signal over a plurality of frequencies.

17. The control system of claim 16, wherein the wireless signal is a radio frequency signal.

18. The control system of claim 13, wherein the device transmits a signal to control a motor of the patient support apparatus.

19. The control system of claim 18, wherein the motor comprises part of a pull-up-in-bed system.

20. The control system of claim 19, wherein the pull-up-in-bed system includes a retractor coupled to a first frame of the patient support apparatus, a sheet attachment unit coupled to a second frame of the patient support apparatus, the second frame of the patient support apparatus moveable relative to the first frame of the patient support apparatus, and a tether having a first end coupled to the sheet attachment unit and a second end coupled to the retractor, the tether being tensioned to remain taut when the second frame moves relative to the first frame of the patient support apparatus.

21. The control system of claim 20, wherein the sheet attachment unit includes a compression molded housing and the device is coupled to the sheet attachment unit.

22. A patient support apparatus comprising:

a frame, a patient support platform supported on the frame, articulable relative to the frame, a sheet attachment device including a frame, a roller rotatably coupled to the frame, a locking mechanism coupled to the frame and the roller, the locking mechanism being lockable to prevent rotation of the roller relative to the frame, a retractor coupled to the frame, a tether having a first end coupled to the frame of the sheet attachment device and a second end configured to be retracted by the retractor, a controller electrically coupled to the retractor the controller having a wireless receiver and a circuit operatively coupled to the wireless receiver, the circuit having a user input device operable to change the circuit between a first mode of operation in which the circuit associates the device with the controller and a second mode of operation in which the circuit controls the retractor in response to the wireless signal, and a user interface coupled to the sheet attachment device and configured to communicate a signal which results in the controller operating the retractor, the user interface including a run key and an enable key with the user interface configured not to send any signal unless the enable key is first activated and the run key is activated within a predetermined time after the enable key is activated, the run key transmitting a signal to the controller to cause the controller to operate the retractor.

23. The patient support apparatus of claim 22, wherein the signal from the user interface to the controller is wireless.

24. The patient support apparatus of claim 23, wherein the wireless signal comprises radio frequency signals.

25. The patient support apparatus of claim 23, wherein the wireless signal comprises infra red signals.

26. The patient support apparatus of claim 23, wherein the controller includes a wireless receiver which is configured to be matched to a single user interface so that the wireless receiver will not be activated by unmatched user interfaces.

27. The patient support apparatus of claim 25, wherein the wireless receiver is configured to be programmed to match the user interface.

28. The patient support apparatus of claim 22, wherein the controller is configured to receive a signal from the user interface to operate the retractor and the controller is configured to reverse the direction of the retractor to release tension on the tether at the end of winch operation.

29. The patient support apparatus of claim 22, further comprising an optical sensor coupled to the retractor and in communication with the controller and wherein the tether further includes an end-of-travel aperture which is detected by the optical sensor which thereby signals the controller to stop the retractor.

30. The patient support apparatus of claim 22, wherein the retractor further includes a torque sensor to stop the operation of the retractor if the force applied by the retractor to the tether exceeds a predetermined level.

31. The patient support apparatus of claim 22, wherein the sheet attachment device further includes retaining pins and a release handle, which retaining pins are biased to extend from the frame of the sheet attachment device until retracted by activating the release handle.

32. The patient support apparatus of claim 22, wherein the locking mechanism comprises a toothed ring coupled to the roller and a retracting pawl coupled to the frame, the pawl biased to engage the toothed ring.

33. A control system for a patient support apparatus, the control system comprising:

a remote control device, a plurality of wireless receivers including a first wireless receiver having a first antenna and a second wireless receiver having a second antenna, each wireless receiver configured to receive a signal transmitted at a plurality of wireless frequencies, and a circuit operatively coupled to the wireless receivers, the circuit having a user input device operable to change the circuit between a first mode of operation in which the circuit associates the remote control device with the patient support apparatus, and a second mode of operation in which the circuit controls the at least one function of the patient support apparatus in response to a wireless signal from the remote control device, the circuit configured to sequentially poll combinations of each wireless receiver and each frequency until a signal is detected and to maintain the receiver and frequency combination at which the signal is detected until the signal is lost, wherein the second antenna is structurally different from the first antenna and the first and the second antenna are operated redundantly, and wherein the circuit analyzes the wireless signal to determine if the signal includes a signal source identifier that is recognized by the circuit to determine that the wireless signal is acceptable, and the circuit determines that the signal source identifier is received in a first signal transmission and a second signal transmission immediately following the first signal transmission to determine that the wireless signal is acceptable.

34. The control system of claim 33, wherein the wireless receivers each comprise an antenna that tends to be immune to a particular interference source.

35. The control system of claim 34, wherein the circuit comprises a printed circuit board, at least one of the antennae is a trace of the printed circuit board, and at least one of the antennae is an external wire coupled to the printed circuit board.

36. The control system of claim 33, further comprising a device that transmits the signal to control a function of the patient support apparatus.

37. The control system of claim 36, wherein the device is configured to operate a motor on the patient support apparatus.

38. The control system of claim 37, wherein the motor is a portion of a pull-up-in-bed system.

* * * * *